(12) United States Patent
Mennell et al.

(10) Patent No.: US 11,932,814 B2
(45) Date of Patent: Mar. 19, 2024

(54) BIOCARBON BLENDS WITH OPTIMIZED FIXED CARBON CONTENT, AND METHODS FOR MAKING AND USING THE SAME

(71) Applicant: Carbon Technology Holdings, LLC, Oakdale, MN (US)

(72) Inventors: James A. Mennell, Brighton, UT (US); Dustin Slack, Gwinn, MI (US); Daren Daugaard, Newburg, MO (US)

(73) Assignee: CARBON TECHNOLOGY HOLDINGS, LLC, Oakdale, MN (US)

( * ) Notice: Subject to any disclaimer, the term of this patent is extended or adjusted under 35 U.S.C. 154(b) by 0 days.

(21) Appl. No.: 17/731,202

(22) Filed: Apr. 27, 2022

(65) Prior Publication Data

US 2022/0340818 A1   Oct. 27, 2022

Related U.S. Application Data

(60) Provisional application No. 63/180,240, filed on Apr. 27, 2021.

(51) Int. Cl.
*C10B 53/02* (2006.01)
*C04B 35/532* (2006.01)
(Continued)

(52) U.S. Cl.
CPC ............ *C10B 53/02* (2013.01); *C04B 35/532* (2013.01); *C04B 35/62204* (2013.01);
(Continued)

(58) Field of Classification Search
CPC ................................ C10B 53/02; C10B 57/02
See application file for complete search history.

(56) References Cited

U.S. PATENT DOCUMENTS 1,609,097 A   11/1926   Stafford
1,662,357 A   3/1928   Barton et al.
(Continued)

FOREIGN PATENT DOCUMENTS

CA   2740225   5/2010
CN   101693848 A   4/2010
(Continued)

OTHER PUBLICATIONS

Andi Supangat et al., "Method for producing activated carbon from combustion of e.g. bamboo, involves naturally removing and cooling furnace material which is separate module of furnace fuel, but closing exhaust holes, when burning process is not sufficient," ID 20121099A (publication date: Mar. 1, 2012).
(Continued)

*Primary Examiner* — Ellen M McAvoy
*Assistant Examiner* — Ming Cheung Po
(74) *Attorney, Agent, or Firm* — Perkins Coie LLP

(57) ABSTRACT

In some variations, the invention provides a biocarbon composition comprising a low fixed carbon material with a fixed carbon concentration from 20 wt % to 55 wt %; a high fixed carbon material with a fixed carbon concentration from 50 wt % to 100 wt % (and higher than the fixed carbon concentration of the low fixed carbon material; from 0 to 30 wt % moisture; from 0 to 15 wt % ash; and from 0 to 20 wt % of one or more additives (such as a binder). Some variations provide a process for producing a biocarbon composition, the process comprising: pyrolyzing a first biomass-containing feedstock to generate a low fixed carbon material; separately pyrolyzing a second biomass-containing feedstock to generate a high fixed carbon material; blending the low fixed carbon material with the high fixed carbon material, thereby generating an intermediate material; optionally, blending one or more additives into the interme-
(Continued)

diate material; optionally, drying the intermediate material; and recovering a biocarbon composition containing the intermediate material or a thermally treated form thereof.

4 Claims, 3 Drawing Sheets

(51) Int. Cl.
  *C04B 35/622* (2006.01)
  *C04B 35/626* (2006.01)
  *C04B 35/636* (2006.01)
  *C10B 57/02* (2006.01)
  *C10B 57/06* (2006.01)
  *C10B 57/10* (2006.01)

(52) U.S. Cl.
  CPC ...... *C04B 35/62695* (2013.01); *C04B 35/636* (2013.01); *C10B 57/02* (2013.01); *C10B 57/06* (2013.01); *C10B 57/10* (2013.01); *C04B 2235/422* (2013.01); *C04B 2235/48* (2013.01)

(56) References Cited

U.S. PATENT DOCUMENTS

| | | |
|---|---|---|
| 2,289,917 A | 7/1942 | Lambiotte |
| 2,448,223 A | 8/1948 | Lantz |
| 2,475,767 A | 7/1949 | Williams et al. |
| 2,577,730 A | 12/1951 | Benedict et al. |
| 3,088,983 A | 5/1963 | Rosenthal |
| 3,235,374 A | 2/1966 | Mahony |
| 3,290,894 A | 12/1966 | Tsao |
| 3,298,928 A | 1/1967 | Esterer |
| 3,650,711 A | 3/1972 | Unick et al. |
| 3,852,048 A | 12/1974 | Pyle |
| 3,853,498 A | 12/1974 | Bailie |
| 3,928,023 A | 12/1975 | Claflin |
| 4,002,565 A | 1/1977 | Farrell et al. |
| 4,011,129 A | 3/1977 | Tomlinson |
| 4,015,951 A | 4/1977 | Gunnetman |
| 4,026,678 A | 5/1977 | Livingston |
| 4,082,694 A | 4/1978 | Wennerberg |
| 4,102,653 A | 7/1978 | Simmons et al. |
| 4,149,994 A | 4/1979 | Murty |
| 4,152,119 A | 5/1979 | Schulz |
| 4,158,643 A | 6/1979 | Sinha |
| 4,201,831 A | 5/1980 | Slusarczuk et al. |
| 4,210,423 A | 7/1980 | Yan |
| 4,236,897 A | 12/1980 | Johnston |
| 4,246,024 A | 1/1981 | Price-Falcon et al. |
| 4,248,839 A | 2/1981 | Toomey |
| 4,255,129 A | 3/1981 | Reed et al. |
| 4,308,033 A | 12/1981 | Gunnennan |
| 4,317,703 A | 3/1982 | Bowen et al. |
| 4,322,222 A | 3/1982 | Sass |
| 4,324,561 A | 4/1982 | Dean et al. |
| 4,385,905 A | 5/1983 | Tucker |
| 4,395,265 A | 7/1983 | Reilly et al. |
| 4,398,917 A | 8/1983 | Reilly |
| 4,405,331 A | 9/1983 | Blaustein et al. |
| 4,494,962 A | 1/1985 | Christie et al. |
| 4,500,327 A | 2/1985 | Nishino |
| 4,529,407 A | 7/1985 | Johnston et al. |
| 4,532,227 A | 7/1985 | Suggitt |
| 4,553,978 A | 11/1985 | Yvar |
| 4,561,860 A | 12/1985 | Gulley et al. |
| 4,632,731 A | 12/1986 | Bodle et al. |
| 4,652,433 A | 3/1987 | Ashworth et al. |
| 4,679,268 A | 7/1987 | Gurries et al. |
| 4,810,255 A | 3/1989 | Fay, III et al. |
| 4,810,446 A | 3/1989 | Sylvest |
| 4,828,573 A | 5/1989 | Jelks |
| 4,834,777 A | 5/1989 | Endebrock |
| 4,855,276 A | 8/1989 | Osborne et al. |
| 4,886,519 A | 12/1989 | Hayes et al. |
| 4,891,459 A | 1/1990 | Knight et al. |
| 4,935,099 A | 6/1990 | Weiss et al. |
| 5,132,259 A | 7/1992 | Curnutt |
| 5,141,526 A | 8/1992 | Chu |
| 5,153,242 A | 10/1992 | Timm et al. |
| 5,167,797 A | 12/1992 | Ou |
| 5,187,141 A | 2/1993 | Jha et al. |
| 5,231,063 A | 7/1993 | Fukumoto et al. |
| 5,248,413 A | 9/1993 | Stencel et al. |
| 5,336,835 A | 8/1994 | McNamara |
| 5,338,441 A | 8/1994 | LeViness |
| 5,342,418 A | 8/1994 | Jesse |
| 5,346,876 A | 9/1994 | Ichimura et al. |
| 5,352,252 A | 10/1994 | Tolmie |
| 5,403,548 A | 4/1995 | Aibe et al. |
| 5,431,702 A | 7/1995 | Schulz |
| 5,458,803 A | 10/1995 | Oehr |
| 5,513,755 A | 5/1996 | Heavilon et al. |
| 5,584,970 A | 12/1996 | Schmalfeld et al. |
| 5,643,342 A | 7/1997 | Andrews |
| 5,725,738 A | 3/1998 | Brioni et al. |
| 5,910,440 A | 6/1999 | Grossman et al. |
| 5,916,826 A | 6/1999 | White |
| 5,976,373 A | 11/1999 | Trocciola et al. |
| 5,980,595 A | 11/1999 | Andrews |
| 6,039,774 A | 3/2000 | McMullen et al. |
| 6,057,262 A | 5/2000 | Derbyshire et al. |
| 6,114,280 A | 9/2000 | Stephens |
| 6,342,129 B1 | 1/2002 | Vaughn et al. |
| 6,395,926 B1 | 5/2002 | Holtzapple et al. |
| 6,402,813 B2 | 6/2002 | Monereau et al. |
| 6,447,437 B1 | 9/2002 | Lee et al. |
| 6,506,223 B2 | 1/2003 | White |
| 6,524,354 B2 | 2/2003 | Sinha et al. |
| 6,698,724 B1 | 3/2004 | Traeger et al. |
| 6,712,606 B2 | 3/2004 | Hagstrom et al. |
| 6,719,816 B2 | 4/2004 | Barford |
| 6,797,034 B2 | 9/2004 | Sugitatsu et al. |
| 6,818,027 B2 | 11/2004 | Murcia |
| 6,843,831 B2 | 1/2005 | Kleut et al. |
| 6,901,868 B2 | 6/2005 | Hornung et al. |
| 7,241,321 B2 | 7/2007 | Murcia |
| 7,282,072 B2 | 10/2007 | Taulbee |
| 7,314,002 B2 | 1/2008 | Dupuis |
| 7,326,263 B2 | 2/2008 | Andersen |
| 7,332,002 B2 | 2/2008 | Johnson et al. |
| 7,354,566 B2 | 4/2008 | Okada et al. |
| 7,357,903 B2 | 4/2008 | Zhou et al. |
| 7,378,372 B2 | 5/2008 | Sylvester |
| 7,404,262 B2 | 7/2008 | Jurkovich et al. |
| 7,435,286 B2 | 10/2008 | Olson et al. |
| 7,438,785 B2 | 10/2008 | Meier et al. |
| 7,455,704 B2 | 11/2008 | Garwood |
| 7,468,170 B2 | 12/2008 | Comrie |
| 7,691,182 B1 | 4/2010 | Muradov |
| 7,708,806 B2 | 5/2010 | Wright et al. |
| 7,749,359 B2 | 7/2010 | Flottvik |
| 7,785,379 B2 | 8/2010 | Drisedelle et al. |
| 7,799,544 B2 | 9/2010 | Schorken et al. |
| 7,811,339 B2 | 10/2010 | Werner |
| 7,879,136 B2 | 2/2011 | Mazyck |
| 7,905,990 B2 | 3/2011 | Freel |
| 7,931,783 B2 | 4/2011 | Dam-Johansen |
| 7,932,065 B2 | 4/2011 | Medoff |
| 7,942,942 B2 | 5/2011 | Paoluccio |
| 7,943,014 B2 | 5/2011 | Berruti et al. |
| 7,960,325 B2 | 6/2011 | Kluko |
| 7,981,835 B2 | 7/2011 | Srinivasachar et al. |
| 8,048,528 B2 | 11/2011 | Matviya |
| 8,080,088 B1 | 12/2011 | Srinivasachar |
| 8,105,400 B2 | 1/2012 | Bergman |
| 8,150,776 B2 | 4/2012 | Comrie |
| 8,237,006 B2 | 8/2012 | Stone et al. |
| 8,308,911 B2 | 11/2012 | Cheiky |
| 8,309,052 B2 | 11/2012 | Jones |
| 8,328,887 B2 | 12/2012 | Yang et al. |
| 8,361,186 B1 | 1/2013 | Shearer et al. |
| 8,383,071 B2 | 2/2013 | Dillon et al. |

(56) References Cited

U.S. PATENT DOCUMENTS

| | | |
|---|---|---|
| 8,404,384 B2 | 3/2013 | Feaver et al. |
| 8,404,909 B2 | 3/2013 | Jadhav |
| 8,425,633 B2 | 4/2013 | Banasiak |
| 8,436,120 B2 | 5/2013 | Piskorz et al. |
| 8,449,724 B2 | 5/2013 | Stromberg et al. |
| 8,476,480 B1 | 7/2013 | Brown et al. |
| 8,519,205 B2 | 8/2013 | Frey |
| 8,541,637 B2 | 9/2013 | Babicki et al. |
| 8,563,467 B2 | 10/2013 | Hashisho et al. |
| 8,637,055 B2 | 1/2014 | Maor |
| 8,669,404 B2 | 3/2014 | Shulenberger et al. |
| 8,685,136 B2 | 4/2014 | Metius et al. |
| 8,801,936 B2 | 8/2014 | Grass et al. |
| 8,920,525 B2 | 12/2014 | Despen et al. |
| 8,920,609 B2 | 12/2014 | Steele et al. |
| 8,926,932 B2 | 1/2015 | Pfeifer et al. |
| 8,993,478 B2 | 3/2015 | Fujii et al. |
| 8,999,885 B2 | 4/2015 | Majmudar et al. |
| 9,108,186 B2 | 8/2015 | Satterfield |
| 9,121,606 B2 | 9/2015 | Srinivasachar |
| 9,281,135 B2 | 3/2016 | Soneda et al. |
| 9,388,046 B2 | 7/2016 | Mennell et al. |
| 9,388,355 B2 | 7/2016 | Mennell et al. |
| 9,475,031 B2 | 10/2016 | Mennell et al. |
| 9,527,780 B2 | 12/2016 | Wilson et al. |
| 9,724,667 B2 | 8/2017 | Mennell et al. |
| 9,725,371 B2 | 8/2017 | Shearer et al. |
| 9,752,090 B2 | 9/2017 | Despen et al. |
| 9,845,440 B2 | 12/2017 | Mennell et al. |
| 10,167,437 B2 | 1/2019 | Mennell et al. |
| 10,174,267 B2 | 1/2019 | Mennell et al. |
| 10,332,226 B2 | 6/2019 | Block et al. |
| 10,611,977 B2 | 4/2020 | Mennell et al. |
| 10,961,459 B2 | 3/2021 | Seidner |
| 10,982,161 B2 | 4/2021 | Mennell et al. |
| 10,995,274 B2 | 5/2021 | Marsh |
| 11,091,716 B2 | 8/2021 | Despen et al. |
| 11,286,440 B2 | 3/2022 | Mennell et al. |
| 2002/0048144 A1 | 4/2002 | Sugo et al. |
| 2003/0154858 A1 | 8/2003 | Kleut et al. |
| 2003/0221363 A1 | 12/2003 | Reed |
| 2004/0045215 A1 | 3/2004 | Guilfoyle |
| 2004/0178052 A1 | 9/2004 | Antal |
| 2005/0095183 A1 | 5/2005 | Rehmat et al. |
| 2005/0258093 A1 | 11/2005 | Cueman et al. |
| 2005/0274068 A1 | 12/2005 | Morton et al. |
| 2005/0279696 A1 | 12/2005 | Bahm et al. |
| 2006/0048646 A1 | 3/2006 | Olson et al. |
| 2006/0120934 A1 | 6/2006 | Lanier et al. |
| 2006/0280669 A1 | 12/2006 | Jones |
| 2007/0006526 A1 | 1/2007 | Cullen |
| 2007/0034126 A1 | 2/2007 | Chen et al. |
| 2007/0125228 A1 | 6/2007 | Alizadeh-Khiavi et al. |
| 2007/0220805 A1 | 9/2007 | Leveson et al. |
| 2007/0261295 A1 | 11/2007 | Tolmie |
| 2008/0281673 A1 | 11/2008 | Davis et al. |
| 2009/0031616 A1 | 2/2009 | Agblevor |
| 2009/0056205 A1 | 3/2009 | Gauthier et al. |
| 2009/0151251 A1 | 6/2009 | Manzer et al. |
| 2009/0188160 A1 | 7/2009 | Liu |
| 2009/0205546 A1 | 8/2009 | Kluko |
| 2009/0314185 A1 | 12/2009 | Whellock |
| 2010/0139155 A1 | 6/2010 | Mennell et al. |
| 2010/0228062 A1 | 9/2010 | Babicki et al. |
| 2010/0273899 A1 | 10/2010 | Winter |
| 2010/0289270 A1 | 11/2010 | Behrens et al. |
| 2010/0300866 A1 | 12/2010 | van Aardt et al. |
| 2011/0002086 A1 | 1/2011 | Feaver et al. |
| 2011/0011721 A1 | 1/2011 | Champagne |
| 2011/0071022 A1 | 3/2011 | Bandosz et al. |
| 2011/0099887 A1 | 5/2011 | Stinson et al. |
| 2011/0099890 A1 | 5/2011 | Bohlig et al. |
| 2011/0219679 A1 | 9/2011 | Budarin et al. |
| 2011/0287999 A1 | 11/2011 | Mahaffey et al. |
| 2011/0296745 A1 | 12/2011 | Hilten et al. |
| 2012/0021123 A1 | 1/2012 | Leveson et al. |
| 2012/0023809 A1 | 2/2012 | Koch et al. |
| 2012/0125064 A1 | 5/2012 | Joseph et al. |
| 2012/0172216 A1 | 7/2012 | Böhringer et al. |
| 2012/0174475 A1 | 7/2012 | Mennell et al. |
| 2012/0174476 A1 | 7/2012 | Mennell et al. |
| 2012/0282465 A1 | 11/2012 | Kadam et al. |
| 2012/0285080 A1 | 11/2012 | Despen et al. |
| 2012/0286211 A1 | 11/2012 | Cheiky et al. |
| 2012/0289752 A1 | 11/2012 | Gosselink et al. |
| 2013/0022771 A1 | 1/2013 | Malet et al. |
| 2013/0145684 A1 | 6/2013 | Mennell et al. |
| 2013/0152461 A1 | 6/2013 | Mennell et al. |
| 2013/0295628 A1 | 11/2013 | Retsina et al. |
| 2013/0326935 A1 | 12/2013 | Kimball |
| 2014/0075832 A1 | 3/2014 | Mennell et al. |
| 2014/0075834 A1* | 3/2014 | Mennell .............. C10L 5/366 44/589 |
| 2014/0332363 A1 | 11/2014 | Durand et al. |
| 2014/0338576 A1 | 11/2014 | Mennell et al. |
| 2015/0114908 A1 | 4/2015 | Traxler et al. |
| 2015/0126362 A1 | 5/2015 | Mennell et al. |
| 2015/0144831 A1 | 5/2015 | Mennell et al. |
| 2015/0196896 A1 | 7/2015 | Mennell et al. |
| 2016/0068759 A1 | 3/2016 | Ellens et al. |
| 2016/0114308 A1 | 4/2016 | Despen et al. |
| 2016/0145519 A1 | 5/2016 | Walter et al. |
| 2016/0244686 A1 | 8/2016 | Dickinson |
| 2016/0280554 A1 | 9/2016 | Despen et al. |
| 2016/0304787 A1 | 10/2016 | Aelion et al. |
| 2017/0137294 A1 | 5/2017 | Marker et al. |
| 2017/0145444 A1 | 5/2017 | Hill et al. |
| 2017/0152440 A1 | 6/2017 | Wilson et al. |
| 2017/0197192 A1 | 7/2017 | Malyala et al. |
| 2017/0321139 A1 | 11/2017 | Despen et al. |
| 2018/0119040 A1 | 5/2018 | Waanders et al. |
| 2018/0127672 A1 | 5/2018 | Mennell et al. |
| 2018/0208852 A1 | 7/2018 | Marsh |
| 2018/0291276 A1 | 10/2018 | Gangwal et al. |
| 2018/0327329 A1 | 11/2018 | Bontchev et al. |
| 2019/0002323 A1 | 1/2019 | Benedek et al. |
| 2019/0264121 A1 | 8/2019 | China |
| 2020/0055736 A1 | 2/2020 | Mennell et al. |
| 2020/0056098 A1 | 2/2020 | Seidner |
| 2020/0140901 A1 | 5/2020 | Foody et al. |
| 2020/0255660 A1 | 8/2020 | McGolden |
| 2020/0318018 A1 | 10/2020 | Germanaud et al. |
| 2020/0381732 A1 | 12/2020 | Wagner et al. |
| 2021/0155481 A1 | 5/2021 | Kim et al. |
| 2021/0214617 A1 | 7/2021 | Seidner |
| 2021/0220801 A1 | 7/2021 | Mennell et al. |
| 2022/0098700 A1 | 3/2022 | Mennell et al. |
| 2022/0098701 A1 | 3/2022 | Mennell et al. |
| 2022/0228080 A1 | 7/2022 | Mennell et al. |
| 2022/0228082 A1 | 7/2022 | Mennell et al. |
| 2022/0267869 A1 | 8/2022 | Mennell et al. |
| 2022/0340818 A1 | 10/2022 | Mennell et al. |
| 2022/0396529 A1 | 12/2022 | Mennell et al. |
| 2023/0015387 A1 | 1/2023 | Slack et al. |
| 2023/0020752 A1 | 1/2023 | Slack et al. |
| 2023/0045385 A1 | 2/2023 | Mennell et al. |

FOREIGN PATENT DOCUMENTS

| | | |
|---|---|---|
| CN | 101775301 | 7/2010 |
| CN | 101805626 A | 8/2010 |
| CN | 108865195 | 11/2018 |
| CN | 110438335 | 8/2020 |
| DE | 202009010612 | 10/2009 |
| EP | 0930091 | 7/1999 |
| EP | 2199365 | 6/2010 |
| GB | 1412407 | 11/1975 |
| GB | 2460064 | 11/2009 |
| JP | S47-013408 | 4/1972 |
| JP | S54135666 | 10/1972 |
| JP | S55136116 | 10/1980 |
| JP | BS58-28203 | 6/1983 |
| JP | S60-238144 | 11/1985 |
| JP | H0564789 | 3/1993 |

(56) References Cited

FOREIGN PATENT DOCUMENTS

| | | |
|---|---|---|
| JP | 06-88077 | 3/1994 |
| JP | AH9-29236 | 2/1997 |
| JP | 10-208985 | 8/1998 |
| JP | 2000157832 | 6/2000 |
| JP | 2000-212568 | 8/2000 |
| JP | 2000-265186 | 9/2000 |
| JP | 2001-239122 | 9/2001 |
| JP | 2001-300497 | 10/2001 |
| JP | 2002-211911 | 7/2002 |
| JP | 2002-226865 | 8/2002 |
| JP | 2002-255796 | 9/2002 |
| JP | 2002-289683 | 10/2002 |
| JP | 2003-038941 | 2/2003 |
| JP | 2003-213273 | 7/2003 |
| JP | 2003-238136 | 8/2003 |
| JP | 2003-251398 | 9/2003 |
| JP | 2003-286021 | 10/2003 |
| JP | 2004-912 | 1/2004 |
| JP | 2004534641 | 11/2004 |
| JP | 2005-263547 | 9/2005 |
| JP | 2005230810 | 9/2005 |
| JP | 2005-298602 | 10/2005 |
| JP | 2005-334737 | 12/2005 |
| JP | 2006-188366 | 7/2006 |
| JP | 2006263513 | 10/2006 |
| JP | 2006-315899 | 11/2006 |
| JP | 2008-037931 | 2/2008 |
| JP | 2008-136558 | 6/2008 |
| JP | 2008-222901 | 9/2008 |
| JP | 2008-284520 | 11/2008 |
| JP | 2009-125070 | 6/2009 |
| JP | 2010-194502 | 9/2010 |
| JP | 2010-202298 | 9/2010 |
| JP | 2010-222474 | 10/2010 |
| JP | 2011516263 | 5/2011 |
| JP | 2011161330 | 8/2011 |
| JP | 2011-230038 | 11/2011 |
| JP | 2011-240329 | 12/2011 |
| JP | 2006-96615 | 12/2012 |
| JP | 2013082588 | 5/2013 |
| RU | 2729810 | 8/2020 |
| TW | 501939 | 9/2002 |
| WO | WO 1990/01529 | 2/1990 |
| WO | WO 2000/071936 | 11/2000 |
| WO | WO 2002/069351 | 9/2002 |
| WO | WO 2005/049530 | 6/2005 |
| WO | WO 2006/122405 | 11/2006 |
| WO | WO 2007/147244 | 12/2007 |
| WO | WO 2008/022461 | 2/2008 |
| WO | WO 2008/076944 | 6/2008 |
| WO | WO 2008/144416 | 11/2008 |
| WO | WO 2009/018469 | 2/2009 |
| WO | WO 2009/105441 | 8/2009 |
| WO | WO 2010/110470 | 9/2010 |
| WO | WO 2010/128055 | 11/2010 |
| WO | WO 2010/129996 | 11/2010 |
| WO | WO 2010/132970 | 11/2010 |
| WO | WO 2011/045473 | 4/2011 |
| WO | WO 2011/053668 | 5/2011 |
| WO | WO 2011/065484 | 6/2011 |
| WO | WO 2011/081086 | 7/2011 |
| WO | WO 2011/093294 | 8/2011 |
| WO | WO 2011/119961 | 9/2011 |
| WO | WO 2011/162727 | 12/2011 |
| WO | WO 2012/142486 | 10/2012 |
| WO | WO 2012/142488 | 10/2012 |
| WO | WO 2012/142489 | 10/2012 |
| WO | WO 2012/142491 | 10/2012 |
| WO | WO 2013/169803 | 11/2013 |
| WO | WO 2013/169806 | 11/2013 |
| WO | WO 2013/169811 | 11/2013 |
| WO | WO 2013/172705 | 11/2013 |
| WO | WO 2013/187940 | 12/2013 |
| WO | WO 2015/061701 | 4/2015 |
| WO | WO 2015/109206 | 7/2015 |
| WO | WO 2015/127460 | 8/2015 |
| WO | WO 2016/065357 | 4/2016 |
| WO | WO 2017/002096 | 1/2017 |
| WO | WO 2019200424 | 10/2019 |
| WO | WO 2020/219635 | 10/2020 |

OTHER PUBLICATIONS

Antal et al., "The Art, Science and Technology of Charcoal Production," Ind. Eng. Chem. Res., 42:1619-1640 (publication date: Mar. 14, 2003).

Ayanda et al., "Activated Carbon-Fly Ash-Nanometal Oxide Composite Materials: Preparation, Characterization, and Tributyltin Removal Efficiency," Journal of Chemistry. vol. 2013 (2013).

Baldock, "Chemical composition and bioavailability of thermally altered *Pinus resinosa* (Red pine) wood," Org. Geochem., vol. 33(9), pp. 1093-1109 (publication date: Sep. 2002).

Brodowski, "Morphological and Chemical Properties of Black Carbon in Physical Soil Fractionsas Revealed by Scanning Electron Microscopy and Energy-Dispersive X-ray Spectroscopy," Geoderma, vol. 128, pp. 116-129 (publication date: Sep. 2005).

Cheng et al., "Oxidatin of black carbon by biotic and abiotic processes," Organic Geochemistry 37:1477-1488 (publication date: Nov. 2006).

Demirbas, "Effects of Temperature and Particle Size on Bio-Char Yield from Pyrolysis of Agricultural Residues," J. Anal. Appl. Pyrolysis, vol. 72, pp. 243-248 (publication date: Nov. 2004).

Di Felice et al., "Biomass Gasification with Catalytic Tar Reforming: A Model Study into Activity Enhancement of Calcium—and Magnesium-Oxide-Based Catalytic Materials by Incorporation of Iron," Energy Fuels vol. 24, pp. 4034-4045 (publication date: Jun. 25, 2010).

Du, "Some Thoughts on the Chemical Compositions of Fly Ash: ICAR's 17th Annual Symposium. The University of Texas at Austin," (2009).

Edgehill et al. "Adsorption Characteristics of Carbonized Bark for Phenol and Pentachlorophenol," (publication date: Mar. 26, 1999).

Freese et al. "Powdered Activated Carbon: Can This be Effectively Assessed in the Laboratory," (publication date: May 28-Jun. 1, 2000).

Gupta et al., "Utilisation of bagasse fly ash (a sugar industry waste) for the removal of copperand zinc from wasterwater," Separation and Purification Technology Journal. vol. 18, Issue 2, pp. 131-140 (publication date: Mar. 2000).

Hamer, "Interactive Priming of Black Carbon and Glucose Mineralisation," Org. Geochem., vol. 35, Issue 7, pp. 823-830 (publication date: Jul. 2004).

Hardman et al., "Studies of Spontaneous Combustion in Beds of Activated Carbon," Fuel, IPC Science and Technology Press, vol. 59, No. 3, pp. 151-156 (publication date: Mar. 1980).

Horst-Gunter Brocksiepe et al., "Charcoal," Ullmann, 8:93-98 (epublication date: Jun. 15, 2000).

Hung, "The Production of Activated Carbon from Coconut Shells Using Pyrolysis and Fluidized Bed Reactors. A Thesis Submitted to the Honors College," The University of Arizona, May 2012, [retrieved on May 4, 2015] [retrieved from the internet] <URL: http://arizona/openrepository.com/arizona/bitstream/10150/243968/1/azuetdmr_2012_0079_sip 1_m.pdf> Abstract, pp. 8, 9, 12, 31-33.

Hwang et al., "Characterization of char derived from various types of solid wastes from thestandpoint of fuel recovery and pretreatment before landfilling," Waste Management 27(9):1155-1166 (epublication date: Aug. 22, 2006).

International Search Report and Written Opinion dated Apr. 1, 2022 for International Application No. PCT/US2022/013151.

International Search Report and Written Opinion dated Apr. 1, 2022 for International Application No. PCT/US2022/013156.

International Search Report and Written Opinion dated Feb. 8, 2022 for International Application No. PCT/US2021/60071.

International Search Report and Written Opinion dated Feb. 8, 2022 for International Application No. PCT/US21/60053.

(56) References Cited

OTHER PUBLICATIONS

Iqbaldin et al., "Properties of coconut shell activated carbon," Journ. Tropical Forest Science, 25(4):497-503 (publication date: Oct. 2013).
Jha et al., "Sorption properties of the activated carbon-zeolite composite prepared from coal fly ash for Ni(2+), Cu(2+), Cd(2+) and Pb(2+)," Journal of Hazardous Materials. vol. 160, Issue 1 pp. 148-153 (publication date: Dec. 15, 2008, epublication date: Mar. 6, 2008).
Khan et al., "Removal of trace elements from Thar coal to minimize its hazardous effect on the environment," Journal of Himalayan Earth Sciences 49(1):50-57 (2016).
Kuzyakov, "Black Carbon Decomposition and Incorporation into Soil Microbial BiomassEstimated by 14C Labeling," Soil Bio & Biochem., vol. 4, pp. 210-219 (publication date: Feb. 2009).
Lakdawala et al., "The effect of low cost material Bagasse Fly ash to the removal of COD Contributing component of combined waste water of Sugar Industry," Scholars Research Library (publication date: Apr. 2012).
Lehmann, "Bio-energy in the black," Front. Ecol. Enviorn., vol. 5(7), pp. 381-387 (publication date: Sep. 1, 2007).
Mackay, "The Dependence of Char and Carbon Yield on Lignocellulosic Precursor Composition," Carbon, col. 20(2), pp. 87-94 (1982).
Martin et al., "Gasification and Production of Biochar from Wastewater Grown Algae," Water New Zealand Annual Conference, Sep. 22-24, 2010, XP055337229, Retrieved from the Internet: URL: https://www.waternz.org.nz/Attachment?Action=Download&Attachment_id=1127 [retrieved on Jan. 20, 2017].
Novack, "Impact of Biochar Amendment on Fertility of a Southeastern Coastal Plain Soil," Soil Sci., vol. 174(2), pp. 105-112 (publication date: Feb. 2009).
PCT/US2009/069133 International Search Report and Written Opinion dated Jul. 26, 2011.
PCT/US2009/069403 International Search Report and Written Opinion dated Jul. 26, 2011.
PCT/US2012/033624 International Search Report dated Sep. 17, 2012.
PCT/US2012/033627 International Search Report dated Jul. 13, 2012.
PCT/US2012/033628 International Search Report dated Jul. 6, 2012.
PCT/US2012/033630 International Search Report dated Aug. 21, 2012.
PCT/US2012/033630 Written Opinion dated Aug. 21, 2012.
PCT/US2013/039981 International Search Report dated Oct. 22, 2013.
PCT/US2013/039986 International Search Report dated Oct. 26, 2013.
PCT/US2013/039991 International Search Report dated Dec. 16, 2013.
PCT/US2014/062202 International Search Report and Written Opinion dated Feb. 3, 2015.
PCT/US2015/011787 International Search Report dated Jun. 11, 2015.
PCT/US2015/017351 International Search Report dated May 15, 2015.
PCT/US2015/57370 International Search Report dated Jan. 8, 2016.
Purnomo et al., "Preparation and characterization of activated carbon from bagasse fly ash," Journal of Analytical and Applied Pyrolysis. vol. 91, Issue 1, pp. 257-262 (publication date: May 2011).
Saravanakumar et al., "Experimental investigations of long stick wood gasification in a bottom lit updraft fixed bed gasifier," Fuel Processing Technology, 88(6):617-622 (publication date: Jun. 2007).
Shinogi et al., "Pyrolysis of plant, animal and human waste: physical and chemicalcharacterization of the pyrolytic products," Bioresource Technology 90:241-247 (publication date: Dec. 2003).

Tay et al., "Preparation and characterization of activated carbon from waste biomass," Journal of Hazardous Materials ND 165(1-3):481-485 (publication date: Jun. 15, 2009).
Ueda, Shigeru et al., "Improvement of Reactivity of Carbon Iron Ore Composite with Biomass Char for Blast Furnace," ISIJ International (2009) 49(10):1505-1512.
Yan et al., "Thermal Pretreatment of Lignocellulosic Biomass," Environmental Progress and Sustainable Energy, vol. 28, No. 3, pp. 435-440 (epublication date: Aug. 5, 2009).
Biermann et al., "Carbon Allocation in Multi-Product Steel Mills That Co-process Biogenic and Fossil Feedstocks and Adopt Carbon Capture Utilization and Storage Technologies," Frontiers in Chemical Engineering (publication date: Dec. 9, 2020).
Bronson, Benjamin, "The Effects of Feedstock Pre-treatment on the Fluidized Bed Gasificationof Biomass," Thesis submitted to the Faculty of Graduate and Postdoctoral Studies in partial fulfilment of the requirements for M.A.Sc. in Chemical Engineering, University of Ottawa (2014).
Cleveland, Cutler J. and Morris, Christopher. Dictionary of Energy (Expanded Edition)—passive solar cooling (pp. 373). Elsevier. (2009).
De Mattos Carneiro-Junior et al., "Valorization of Prosopis juliflora Woody Biomass in Northeast Brazilian through Dry Torrefaction," Energies, Energies Jun. 11, 2021, 14, 3465.
Demirbas et al., "Estimating the Calorific Values of Lignocellulosic Fuels," Energy Exploration & Exploitation 22(2):135-143 (publication date: Apr. 1, 2004).
Gonzalez et al., "Pyrolysis of various biomass residues and char utilization for the production of activated carbons," J. Anal. Appl. Pyrolysis, 85:134-141 (epublication date: Dec. 3, 2008).
Gudka et al., A review of the mitigation of deposition and emission problems during biomasscombustion through washing pre-treatment, Journal of the Energy Institute (Published May 2016), vol. 89, Issue 2, May 2016, pp. 159-171.
International Search Report and Written Opinion dated Jul. 15, 2022 for International Application No. PCT/US2022/026591.
International Search Report and Written Opinion dated Jul. 19, 2022 for International Application No. PCT/US2022/026597.
International Search Report and Written Opinion dated Mar. 20, 2023 for International Application No. PCT/US2022/049237.
International Search Report and Written Opinion dated Mar. 29, 2023 for International Application No. PCT/US2022/049240.
International Search Report and Written Opinion dated Nov. 17, 2022 for International Application No. PCT/US2022/039119.
International Search Report and Written Opinion dated Oct. 11, 2022 for International Application No. PCT/US2022/036282.
International Search Report and Written Opinion dated Oct. 11, 2022 for International Application No. PCT/US2022/036292.
International Search Report and Written Opinion dated Oct. 19, 2022 for International Application No. PCT/US2022/039116.
International Search Report and Written Opinion dated Oct. 6, 2022 for International Application No. PCT/US2022/036294.
Keiluweit et al., "Dynamic Molecular Structure of Plant Biomass-Derived Black Carbon (Biochar)," Environ. Sci. Technol. 44:1247-1253 (epublication date: Jan. 25, 2010).
Phasee et al., "An investigation on mechanical property of MSW-derived fuel pellet producedfrom hydronthermal treatement," Journal of Material Cycles and Waste Management, 20:2028-2040 (publication date: Jun. 15, 2018).
Phyllis Database Phyllis2—ECN Phyllis classification https://phylis.nl/Browse/Standard/ECN-Phyllis#pyrolisis (2015).
Ruksathamcharoen et al., "Effects of hydrothermal treatment and pelletizing temperature on the mechanical properties of empty fruit bunch pellets," Applied Energy, 113385 (epublication date: May 18, 2019).
Tanzer et al., "Can bioenergy with carbon capture and storage result in carbon negative steel?" 100:1-15, International Journal of Greenhouse Gas Control (publication date: Jul. 24, 2020) (Abstract only).
Warnecke, "Gasification of biomass: comparison of fixed bed and fluidized bed gasifier," Biomass & Bioenergy, 18:489-497 (2000).
Yang et al., "Harmonized comparison of virgin steel production using biomass with carboncapture and storage for negative emis-

(56) References Cited

OTHER PUBLICATIONS sions," 112:1-33, International Journal of Greenhouse Gas Control (publication date: Nov. 23, 2021).

Ikuo Abe, "Sumino Kyuchaku no Himitsu" (Secret of Adsorption of Charoal), Rinsan Shi Dayori, p. 5-9 (Dec. 1995) with English summary.

Kumar et al., "Effects of Carbonisation conditions on the Yield and Chemical Composition of *Acacia* and *Eucalyptus* Wood Chars," Biomass and Bioenergy 3(6):411-417 (1992).

Wretborn, "Pyrolysis of Wood Chips: Influence of Pyrolysis Conditions on Charcoal Yield and Charcoal Reactivity," Degree Project, Energy Engineering, masters level 2016.

\* cited by examiner

BIOCARBON BLENDS WITH OPTIMIZED FIXED CARBON CONTENT, AND METHODS FOR MAKING AND USING THE SAME

CROSS-REFERENCE TO RELATED APPLICATION(S)

This application claims the benefit of U.S. Provisional Patent Application No. 63/180,240, filed on Apr. 27, 2021, which is incorporated herein by reference in its entirety.

TECHNICAL FIELD

The present invention generally relates to biocarbon compositions that are optimized for various chemical and physical properties, and processes of making and using such biocarbon compositions.

BACKGROUND

Carbon is a platform element in a wide variety of industries and has a vast number of chemical, material, and fuel uses. Carbon is a good fuel to produce energy, including electricity. Carbon also has tremendous chemical value for various commodities and advanced materials, including metals, metal alloys, composites, carbon fibers, electrodes, and catalyst supports. For metal making, carbon is useful as a reactant, for reducing metal oxides to metals during processing; as a fuel, to provide heat for processing; and as a component of a metal alloy.

Carbonaceous materials commonly include fossil resources, such as natural gas, petroleum, coal, and lignite. There is interest in increased use of lignocellulosic biomass and various carbon-rich waste materials.

Various technologies exist to convert feedstocks into carbon materials for industrial use. Pyrolysis is a process for thermal conversion of solid materials in the complete absence of oxidizing agent (air or oxygen), or with such limited supply that oxidation does not occur to any appreciable extent. Depending on process conditions and additives, biomass pyrolysis can be adjusted to produce widely varying amounts of gas, liquid, and solid. Lower process temperatures and longer vapor residence times favor the production of solids. Higher temperatures and longer residence times increase the feedstock conversion to syngas, while moderate temperatures and short vapor residence times are generally optimum for producing liquids. Historically, slow pyrolysis of wood has been performed in large piles, in a simple batch process, with no emissions control. Traditional charcoal-making technologies are energy-inefficient as well as highly polluting.

There is a desire for improved or optimized biocarbon compositions, and processes for making biocarbon compositions, that can improve or optimize stability, reactivity (e.g., thermal reactivity and self-heating), hydrophobicity, energy content, overall yield, and final composition including fixed carbon, ash, moisture.

SUMMARY OF THE INVENTION

Disclosed herein are biocarbon compositions. The biocarbon compositions of the present disclosure can comprise: at least about 1 wt % to at most about 99 wt % of a low fixed carbon material, wherein the low fixed carbon material comprises a first fixed carbon concentration of at least about 20 wt % to at most about 55 wt % fixed carbon on an absolute basis; at least about 1 wt % to at most about 99 wt % of a high fixed carbon material, wherein the high fixed carbon material comprises a second fixed carbon concentration of at least about 50 wt % to at most about 100 wt % fixed carbon on an absolute basis, and wherein the second fixed carbon concentration is greater than the first fixed carbon concentration; at least about 0 wt % to at most about 30 wt % moisture; at least about 0 wt % to at most about 15 wt % ash; and at least about 0 wt % to at most about 20 wt % of an additive; wherein a total wt %, calculated as a sum of the low fixed carbon material, the high fixed carbon material, moisture, ash, and the additive, is at most 100 wt %.

In some embodiments, the biocarbon composition comprises a homogeneous physical blend of the low fixed carbon material and the high fixed carbon material. In some embodiments, the low fixed carbon material is uniformly dispersed throughout the biocarbon composition. In some embodiments, the high fixed carbon material is uniformly dispersed throughout the biocarbon composition. In some embodiments, the low fixed carbon material and the high fixed carbon material are uniformly dispersed throughout the biocarbon composition. In some embodiments, the biocarbon composition comprises a heterogeneous physical blend of the low fixed carbon material and the high fixed carbon material. In some embodiments, the biocarbon composition comprises distinct layers of the low fixed carbon material and the high fixed carbon material. In some embodiments, the biocarbon composition comprises a core and a shell, wherein the core is comprised within the shell, wherein the core comprises the high fixed carbon material, and wherein the shell comprises the low fixed carbon material. In some embodiments, the biocarbon composition comprises a core and a shell, wherein the core is comprised within the shell, wherein the core comprises the low fixed carbon material, and wherein the shell comprises the high fixed carbon material. In some embodiments, the high fixed carbon material is in the form of particulates in a continuous phase of the low fixed carbon material. In some embodiments, the low fixed carbon material is in the form of particulates in a continuous phase of the high fixed carbon material.

In some embodiments, the biocarbon composition comprises at least about 10 wt % to at most about 90 wt % of the low fixed carbon material. In some embodiments, the biocarbon composition comprises at least about 10 wt % to at most about 90 wt % of the high fixed carbon material. In some embodiments, a weight ratio of the low fixed carbon material to the high fixed carbon material is at least about 0.1 to at most about 10. In some embodiments, a weight ratio of the low fixed carbon material to the high fixed carbon material is at least about 0.2 to at most about 5. In some embodiments, a weight ratio of the low fixed carbon material to the high fixed carbon material is at least about 0.5 to at most about 2. In some embodiments, a weight ratio of the low fixed carbon material to the high fixed carbon material is at least about 0.8 to at most about 1.2. In some embodiments, the first fixed carbon concentration is at least about 20 wt % to at most about 40 wt %. In some embodiments, the first fixed carbon concentration is at least about 25 wt % to at most about 50 wt %. In some embodiments, the first fixed carbon concentration is at least about 30 wt % to at most about 55 wt %. In some embodiments, the second fixed carbon concentration is at least about 80 wt % to at most about 100 wt %. In some embodiments, the second fixed carbon concentration is at least about 70 wt % to at most about 95 wt %. In some embodiments, the second fixed carbon concentration is at least about 60 wt % to at most about 90 wt %.

In some embodiments, an unweighted average of the first fixed carbon concentration and the second fixed carbon concentration is at least about 30 wt % to at most about 90 wt %. In some embodiments, an unweighted average of the first fixed carbon concentration and the second fixed carbon concentration is at least about 40 wt % to at most about 80 wt %. In some embodiments, the biocarbon composition comprises a total fixed carbon concentration of at least about 25 wt % to at most about 95 wt %, on an absolute basis. In some embodiments, the biocarbon composition comprises a total fixed carbon concentration of at least about 35 wt % to at most about 85 wt % on an absolute basis. In some embodiments, the low fixed carbon material comprises at least about 45 wt % to at most about 80 wt % volatile carbon, on an absolute basis. In some embodiments, the high fixed carbon material comprises at least about 0 wt % to at most about 50 wt % volatile carbon, on an absolute basis. In some embodiments, the biocarbon composition comprises at least about 0.1 wt % to at most about 20 wt % moisture. The biocarbon composition may be completely dry, with less than 0.1 wt % moisture, less than 0.01 wt % moisture, or essentially no moisture. In some embodiments, the biocarbon composition comprises at least about 0.1 wt % to at most about 10 wt % ash.

In some embodiments, the biocarbon composition comprises at least about 0.1 wt % to at most about 10 wt % of the additive. In some embodiments, the biocarbon composition comprises at least about 1 wt % to at most about 15 wt % of the additive. In some embodiments, the biocarbon composition comprises at least about 3 wt % to at most about 18 wt % of the additive. In some embodiments, the additive comprises an organic additive. In some embodiments, the additive comprises an inorganic additive. In some embodiments, the additive comprises a renewable material. In some embodiments, the additive comprises a material that is capable of being oxidized or combusted. In some embodiments, the additive comprises a binder. In some embodiments, the binder comprises starch, thermoplastic starch, crosslinked starch, starch polymers, cellulose, cellulose ethers, hemicellulose, methylcellulose, chitosan, lignin, lactose, sucrose, dextrose, maltodextrin, banana flour, wheat flour, wheat starch, soy flour, corn flour, wood flour, coal tars, coal fines, met coke, asphalt, coal-tar pitch, petroleum pitch, bitumen, pyrolysis tars, gilsonite, bentonite clay, borax, limestone, lime, waxes, vegetable waxes, baking soda, baking powder, sodium hydroxide, potassium hydroxide, iron ore concentrate, silica fume, gypsum, Portland cement, guar gum, xanthan gum, polyvidones, polyacrylamides, polylactides, phenol-formaldehyde resins, vegetable resins, recycled shingles, recycled tires, or a derivative thereof, or a combination thereof.

In some embodiments, the binder comprises starch, thermoplastic starch, crosslinked starch, starch polymers, a derivative thereof, or a combination thereof. In some embodiments, the binder comprises a thermoplastic starch. In some embodiments, the thermoplastic starch is crosslinked. In some embodiments, the thermoplastic starch is a reaction product of starch and a polyol. In some embodiments, the polyol of the reaction to produce the starch can be ethylene glycol, propylene glycol, glycerol, butanediols, butanetriols, erythritol, xylitol, sorbitol, or a combination thereof. In some embodiments, the thermoplastic starch is formed from a reaction that is catalyzed by an acid. In some embodiments, the acid comprises formic acid, acetic acid, lactic acid, citric acid, oxalic acid, uronic acids, glucuronic acids, or a combination thereof. In some embodiments, the thermoplastic starch is formed from a reaction that is catalyzed by a base.

The stability of the biocarbon composition can be increased by the addition of an additive. In some embodiments, the additive reduces the reactivity of the biocarbon composition compared to an otherwise-equivalent biocarbon composition without the additive. In some embodiments, the reactivity is thermal reactivity. In some embodiments, the biocarbon composition comprises lower self-heating compared to the otherwise-equivalent biocarbon composition without the additive. In some embodiments, the reactivity is chemical reactivity with oxygen. In some embodiments, the reactivity is chemical reactivity with water. In some embodiments, the reactivity is chemical reactivity with hydrogen. In some embodiments, the reactivity is chemical reactivity with carbon monoxide. In some embodiments, the reactivity is chemical reactivity with a metal. In some embodiments, the metal comprises iron.

In some embodiments, the biocarbon composition comprises greater than 0 wt % of the additive. In other words, there are embodiments in which the additive is present in the composition. The low fixed carbon material can comprise a pore, and the pore can comprise the additive. In some embodiments, the high fixed carbon material comprises pores comprising the additive, and the low fixed carbon material comprise pores comprising the additive. In some embodiments, the additive is on the surface of the biocarbon composition.

In some embodiments, the biocarbon composition is in the form of powder. In some embodiments, the biocarbon composition is in the form of a pellet. In some embodiments, the biocarbon composition is in the form of a pellet and comprises the additive, wherein the additive comprises a binder. In some embodiments, the binder is the low fixed carbon material. In some embodiments, the biocarbon composition comprises the additive, wherein the low fixed carbon material comprises the additive or the high fixed carbon material comprises the additive.

In some embodiments, the biocarbon composition is characterized as non-self-heating when subjected to a self-heating test according to *Manual of Tests and Criteria*, Seventh revised edition 2019, United Nations, Page 375, 33.4.6 Test N.4: "Test method for self-heating substances".

In some embodiments, the first fixed carbon concentration, the second fixed carbon concentration, or the additive type or concentration, is selected to optimize energy content associated with the biocarbon composition. In some embodiments, the first fixed carbon concentration, the second fixed carbon concentration, or the additive type or concentration, is selected to optimize bulk density associated with the biocarbon composition. In some embodiments, the first fixed carbon concentration, the second fixed carbon concentration, or the additive type or concentration, is selected to optimize hydrophobicity associated with the biocarbon composition. In some embodiments, the first fixed carbon concentration, the second fixed carbon concentration, or the additive type or concentration, is selected to optimize pore sizes associated with the biocarbon composition. In some embodiments, the first fixed carbon concentration, the second fixed carbon concentration, or the additive type or concentration, is selected to optimize ratios of pore sizes associated with the biocarbon composition. In some embodiments, the first fixed carbon concentration, the second fixed carbon concentration, or the additive type or concentration, are selected to optimize surface area associated with the biocarbon composition. In some embodiments, the first fixed carbon concentration, the second fixed carbon concentration, or the additive type or concentration, are selected to optimize reactivity associated with the biocarbon composition. In some embodiments, the first fixed carbon concentration, the second fixed carbon concentration, or the additive type or concentration, are selected to optimize ion-exchange capacity associated with the biocarbon composition.

In some embodiments, the first fixed carbon concentration, the second fixed carbon concentration, and optionally the additive type and/or concentration, are selected to optimize Hardgrove Grindability Index associated with the pellets. In some embodiments, the first fixed carbon concentration, the second fixed carbon concentration, or the additive type or concentration, are selected to optimize Pellet Durability Index associated with the pellets.

In some embodiments, the biocarbon composition is in the form of pellets, and the first fixed-carbon concentration, the second fixed-carbon concentration, and optionally the additive type or\ concentration are selected to optimize Pellet Durability Index associated with the pellets.

The biocarbon compositions of the present disclosure can comprise: at least about 1 wt % to at most about 99 wt % of a low fixed carbon material, wherein the low fixed carbon material comprises a first fixed carbon concentration of at least about 10 wt % to at most about 55 wt % fixed carbon on an absolute basis; at least about 1 wt % to at most about 99 wt % of a high fixed carbon material, wherein the high fixed carbon material comprises a second fixed carbon concentration of at least about 50 wt % to at most about 100 wt % fixed carbon on an absolute basis, wherein the second fixed carbon concentration is greater than the first fixed carbon concentration; at least about 0 wt % to at most about 30 wt % moisture; at least about 0 wt % to at most about 15 wt % ash; and at least about 0 wt % to at most about 20 wt % of an additive; wherein the low fixed carbon material or the high fixed carbon material comprises biogenic carbon; and wherein a total wt %, calculated as a sum of the low fixed carbon material, the high fixed carbon material, moisture, ash, and the additive, is at most 100 wt %.

In some embodiments, the low fixed carbon material comprises unpyrolyzed biomass, pyrolyzed biomass, unpyrolyzed polymers, pyrolyzed polymers, coal, pyrolyzed coal, or a combination thereof. In some embodiments, the high fixed carbon material comprises pyrolyzed biomass, coal, pyrolyzed coal, coke, petroleum coke, metallurgical coke, activated carbon, carbon black, graphite, graphene, pyrolyzed polymers, or a combination thereof.

In all embodiments of the present disclosure, of compositions and processes for making compositions, the biocarbon composition can comprise a total carbon. In some embodiments, at least 50% of the total carbon consists essentially of biogenic carbon as determined from a measurement of the $^{14}C/^{12}C$ isotopic ratio of the total carbon. In some embodiments, at least 50% of the total carbon consists essentially of biogenic carbon as determined from a measurement of the $^{14}C/^{12}C$ isotopic ratio of the total carbon. In some embodiments, at least 90% of the total carbon consists essentially of biogenic carbon as determined from a measurement of the $^{14}C/^{12}C$ isotopic ratio of the total carbon. In some embodiments, the total carbon consists essentially of biogenic carbon as determined from a measurement of the $^{14}C/^{12}C$ isotopic ratio of the total carbon.

Disclosed herein are processes for producing biocarbon compositions. The processes of the present disclosure can comprise: pyrolyzing a first feedstock, wherein the first feedstock comprises biomass, thereby generating a low fixed carbon material and a first pyrolysis off-gas, wherein the low fixed carbon material comprises a first fixed carbon concentration of at least about 20 wt % to at most about 55 wt % fixed carbon on an absolute basis; pyrolyzing a second feedstock, wherein the second feedstock comprises biomass, thereby generating a high fixed carbon material and a second pyrolysis off-gas, wherein the high fixed carbon material comprises a second fixed carbon concentration of at least about 50 wt % to at most about 100 wt % fixed carbon on an absolute basis, and wherein the second fixed carbon concentration is greater than the first fixed carbon concentration; blending the low fixed carbon material with the high fixed carbon material, thereby generating an intermediate material; and recovering a biocarbon composition comprising the intermediate material or a thermally treated derivative of the intermediate material.

In some embodiments, the process comprises drying the intermediate material.

In some embodiments, the process comprises blending the intermediate material with an additive, thereby generating a blended intermediate material. In some embodiments, the process comprises drying the blended intermediate material. In some embodiments, pyrolyzing the second feedstock is independent from pyrolyzing the first feedstock. In some embodiments, the first feedstock and the second feedstock are the same type of feedstock. In some embodiments, the first feedstock and the second feedstock are not the same type of feedstock.

In some embodiments, the first feedstock comprises softwood chips, hardwood chips, timber harvesting residues, tree branches, tree stumps, leaves, bark, sawdust, corn, corn stover, wheat, wheat straw, rice, rice straw, sugarcane, sugarcane bagasse, sugarcane straw, energy cane, sugar beets, sugar beet pulp, sunflowers, sorghum, canola, algae, miscanthus, alfalfa, switchgrass, fruits, fruit shells, fruit stalks, fruit peels, fruit pits, vegetables, vegetable shells, vegetable stalks, vegetable peels, vegetable pits, grape pumice, almond shells, pecan shells, coconut shells, coffee grounds, food waste, commercial waste, grass pellets, hay pellets, wood pellets, cardboard, paper, paper pulp, paper packaging, paper trimmings, food packaging, construction and/or demolition waste, railroad ties, lignin, animal manure, municipal solid waste, municipal sewage, or a combination thereof.

In some embodiments, the second feedstock comprises softwood chips, hardwood chips, timber harvesting residues, tree branches, tree stumps, leaves, bark, sawdust, corn, corn stover, wheat, wheat straw, rice, rice straw, sugarcane, sugarcane bagasse, sugarcane straw, energy cane, sugar beets, sugar beet pulp, sunflowers, sorghum, canola, algae, miscanthus, alfalfa, switchgrass, fruits, fruit shells, fruit stalks, fruit peels, fruit pits, vegetables, vegetable shells, vegetable stalks, vegetable peels, vegetable pits, grape pumice, almond shells, pecan shells, coconut shells, coffee grounds, food waste, commercial waste, grass pellets, hay pellets, wood pellets, cardboard, paper, paper pulp, paper packaging, paper trimmings, food packaging, construction and/or demolition waste, railroad ties, lignin, animal manure, municipal solid waste, municipal sewage, or a combination thereof.

In some embodiments, pyrolyzing the first feedstock and pyrolyzing the second feedstock are performed in distinct pyrolysis reactors. In some embodiments, pyrolyzing the first feedstock and pyrolyzing the second feedstock are performed in a common pyrolysis reactor at distinct instances. The pyrolysis reactors are typically all conducted continuously or all conducted in batch, but in principle, a mixture of reaction modes can be used. Also, when distinct pyrolysis reactors are employed, they can be at a common site or at different sites.

In some embodiments, the blending comprises blending essentially all of the low fixed carbon material with the high fixed carbon material. In some embodiments, the blending comprises blending essentially all of the high fixed carbon material with the low fixed carbon material. In some embodiments, the blending of the low fixed carbon material with the high fixed carbon material comprises blending the low fixed carbon material and the high fixed carbon material with an additive. In some embodiments, the process comprises drying simultaneous with the blending. In some embodiments, the process comprises blending an additive with the intermediate material, thereby generating a blended intermediate material, then drying the intermediate material.

In some embodiments, the process comprises recovering the biocarbon composition comprising at least about 1 wt % to at most about 99 wt % of the low fixed carbon material; at least about 1 wt % to at most about 99 wt % of the high fixed carbon material; at least about 0 wt % to at most about 30 wt % moisture; at least about 0 wt % to at most about 15 wt % ash; and at least about 0 wt % to at most about 20 wt % of an additive.

In some embodiments, pyrolyzing the first feedstock comprises pyrolyzing at a first pyrolysis temperature, wherein the first pyrolysis temperature is at least about 250° C. to at most about 1250° C. In some embodiments, pyrolyzing the first feedstock comprises pyrolyzing at a first pyrolysis temperature, wherein the first pyrolysis temperature wherein the first pyrolysis temperature is at least about 300° C. to at most about 700° C. In some embodiments, pyrolyzing the second feedstock comprises pyrolyzing at a second pyrolysis temperature, wherein the second pyrolysis temperature is at least about 250° C. to at most about 1250° C. In some embodiments, pyrolyzing the second feedstock comprises pyrolyzing at a second pyrolysis temperature, wherein the second pyrolysis temperature is at least about 300° C. to at most about 700° C.

In some embodiments, pyrolyzing the first feedstock comprises pyrolyzing for at least about 10 seconds to at most about 24 hours. In some embodiments, pyrolyzing the second feedstock comprises pyrolyzing for at least about 10 seconds to at most about 24 hours.

In some embodiments, the first pyrolysis off-gas is oxidized, thereby generating heat. In some embodiments, the second pyrolysis off-gas is oxidized, thereby generating heat. In some embodiments, the first pyrolysis off-gas is oxidized, thereby generating a reducing gas comprising hydrogen or carbon monoxide. In some embodiments, the second pyrolysis off-gas is oxidized, thereby generating a reducing gas comprising hydrogen or carbon monoxide.

In some embodiments, the process comprises a first milling, before the blending, of the low fixed carbon material, wherein the first milling comprises using a mechanical-treatment apparatus comprising a hammer mill, an extruder, an attrition mill, a disc mill, a pin mill, a ball mill, a cone crusher, a jaw crusher, or a combination thereof. In some embodiments, the process comprises a second milling, before the blending, of the high fixed carbon material, wherein the second milling comprises using a mechanical-treatment apparatus comprising a hammer mill, an extruder, an attrition mill, a disc mill, a pin mill, a ball mill, a cone crusher, a jaw crusher, or a combination thereof. In some embodiments, the blending comprises using a mechanical-treatment apparatus comprising a hammer mill, an extruder, an attrition mill, a disc mill, a pin mill, a ball mill, a cone crusher, a jaw crusher, or a combination thereof.

In some embodiments of the process, the biocarbon composition comprises a homogeneous physical blend of the low fixed carbon material and the high fixed carbon material. In some embodiments, the low fixed carbon material is uniformly dispersed throughout the biocarbon composition. In some embodiments, the high fixed carbon material is uniformly dispersed throughout the biocarbon composition. In some embodiments, the low fixed carbon material and the high fixed carbon material are uniformly dispersed throughout the biocarbon composition. In some embodiments, the biocarbon composition comprises a heterogeneous physical blend of the low fixed carbon material and the high fixed carbon material. In some embodiments, the biocarbon composition comprises distinct layers of the low fixed carbon material and the high fixed carbon material. In some embodiments, the biocarbon composition comprises a core and a shell, wherein the core is comprised within the shell, wherein the core comprises the high fixed carbon material, and wherein the shell comprises the low fixed carbon material. In some embodiments, the biocarbon composition comprises a core and a shell, wherein the core is comprised within the shell, wherein the core comprises the low fixed carbon material, and wherein the shell comprises the high fixed carbon material. In some embodiments, the high fixed carbon material is in the form of particulates in a continuous phase of the low fixed carbon material. In some embodiments, the low fixed carbon material is in the form of particulates in a continuous phase of the high fixed carbon material.

In some embodiments of the process, the biocarbon composition comprises at least about 10 wt % to at most about 90 wt % of the low fixed carbon material. In some embodiments, the biocarbon composition comprises at least about 10 wt % to at most about 90 wt % of the high fixed carbon material. In some embodiments, the biocarbon composition comprises a weight ratio of the low fixed carbon material to the high fixed carbon material, and wherein the ratio is at least about 0.1 to at most about 10.

In some embodiments of the process, the biocarbon composition comprises a weight ratio of the low fixed carbon material to the high fixed carbon material, and wherein the ratio is at least about 0.2 to at most about 5. In some embodiments, the biocarbon composition comprises a weight ratio of the low fixed carbon material to the high fixed carbon material, and wherein the ratio is at least about 0.5 to at most about 2. In some embodiments, the biocarbon composition comprises a weight ratio of the low fixed carbon material to the high fixed carbon material, and wherein the ratio is at least about 0.8 to at most about 1.2.

In some embodiments, the first fixed carbon concentration is at least about 20 wt % to at most about 40 wt %. In some embodiments, the first fixed carbon concentration is at least about 25 wt % to at most about 50 wt %. In some embodiments, the first fixed carbon concentration is at least about 30 wt % to at most about 55 wt %. In some embodiments, the second fixed carbon concentration is at least about 80 wt % to at most about 100 wt %. In some embodiments, the second fixed carbon concentration is at least about 70 wt % to at most about 95 wt %. In some embodiments, the second fixed carbon concentration is at least about 60 wt % to at most about 90 wt %. In some embodiments, the unweighted average of the first fixed carbon concentration and the second fixed carbon concentration is at least about 30 wt % to at most about 90 wt %. In some embodiments, the unweighted average of the first fixed carbon concentration and the second fixed carbon concentration is at least about 40 wt % to at most about 80 wt %.

In some embodiments of the process, the biocarbon composition comprises a total fixed carbon concentration of at least about 25 wt % to at most about 95 wt %, on an absolute basis. In some embodiments, the biocarbon composition comprises a total fixed carbon concentration of at least about 35 wt % to at most 85 wt %, on an absolute basis. In some embodiments, the low fixed carbon material comprises at least about 45 wt % to at most about 80 wt % volatile carbon, on an absolute basis. In some embodiments, the high fixed carbon material comprises at least about 0 to at most about 50 wt % volatile carbon, on an absolute basis.

In some embodiments of the process, the biocarbon composition comprises at least about 0.1 wt % to at most about 20 wt % moisture. In some embodiments, the biocarbon composition comprises at least about 0.1 wt % to at most about 10 wt % ash. In some embodiments, the biocarbon composition comprises at least about 0.1 wt % to at most about 10 wt % of an additive. In some embodiments, the biocarbon composition comprises at least about 1 wt % to at most about 15 wt % of an additive. In some embodiments, the biocarbon composition comprises at least about 3 wt % to at most about 18 wt % of an additive.

In some embodiments of the process, the biocarbon composition comprises an additive, and the additive comprises an organic additive. In some embodiments, the additive comprises an inorganic additive. In some embodiments, the additive comprises a renewable material. In some embodiments, the additive comprises a material that is capable of being oxidized or combusted. In some embodiments, the additive comprises a binder.

In some embodiments, the process comprises pelletizing. The pelletizing can be achieved using an extruder, a ring die pellet mill, a flat die pellet mill, a roll compactor, a roll briquetter, a wet agglomeration mill, a dry agglomeration mill, or a combination thereof.

In some embodiments of the process, the biocarbon composition comprises a binder. The binder can comprise starch, thermoplastic starch, crosslinked starch, starch polymers, cellulose, cellulose ethers, hemicellulose, methylcellulose, chitosan, lignin, lactose, sucrose, dextrose, maltodextrin, banana flour, wheat flour, wheat starch, soy flour, corn flour, wood flour, coal tars, coal fines, met coke, asphalt, coal-tar pitch, petroleum pitch, bitumen, pyrolysis tars, gilsonite, bentonite clay, borax, limestone, lime, waxes, vegetable waxes, baking soda, baking powder, sodium hydroxide, potassium hydroxide, iron ore concentrate, silica fume, gypsum, Portland cement, guar gum, xanthan gum, polyvidones, polyacrylamides, polylactides, phenol-formaldehyde resins, vegetable resins, recycled shingles, recycled tires, a derivative thereof, or a combination thereof.

In some embodiments of the process, the biocarbon composition comprises a binder, and wherein the binder comprises starch, thermoplastic starch, crosslinked starch, starch polymers, a derivative thereof, or a combination thereof.

In some embodiments of the process, the biocarbon composition comprises a binder, and the binder comprises a thermoplastic starch. The thermoplastic starch can be a reaction product of starch and a polyol. The polyol can be ethylene glycol, propylene glycol, glycerol, butanediols, butanetriols, erythritol, xylitol, sorbitol, or a combination thereof. The thermoplastic starch can be formed from a reaction that is catalyzed by an acid. The acid can comprise formic acid, acetic acid, lactic acid, citric acid, oxalic acid, uronic acids, glucuronic acids, or a combination thereof. The thermoplastic starch can be formed from a reaction that is catalyzed by a base.

In some embodiments of the process, the additive reduces the reactivity of the biocarbon composition compared to an otherwise-equivalent biocarbon composition without the additive. In some embodiments, the reactivity is thermal reactivity. In some embodiments, the biocarbon composition comprises a lower self-heating compared to the otherwise-equivalent biocarbon composition without the additive. In some embodiments, the reactivity is chemical reactivity with oxygen. In some embodiments, the reactivity is chemical reactivity with water. In some embodiments, the reactivity is chemical reactivity with hydrogen. In some embodiments, the reactivity is chemical reactivity with carbon monoxide. In some embodiments, the reactivity is chemical reactivity with a metal. In some embodiments, the metal comprises iron.

In some embodiments, the process comprises blending an additive with the intermediate material, thereby introducing the additive into a pore of the low fixed carbon material. In some embodiments, the process comprises blending an additive with the intermediate material, thereby introducing the additive into a pore of the high fixed carbon material. In some embodiments, the process comprises blending an additive with the intermediate material, thereby introducing the additive into a pore of the low fixed carbon material and introducing the additive into a pore of the high fixed carbon material. In some embodiments, the process comprises blending an additive with the intermediate material, thereby disposing the additive on an outer surface of the biocarbon composition.

In some embodiments, the process comprises forming the biocarbon composition into a powder. In some embodiments, the process comprises pelletizing the biocarbon composition.

In some embodiments, the process comprises blending an additive with the intermediate material, wherein the additive comprises a binder. In some embodiments, the binder comprises the low fixed carbon material. In some embodiments, the process comprises blending an additive with the intermediate material, wherein the low fixed carbon material comprises the additive or the high fixed carbon material comprises the additive.

In some embodiments of the process, the biocarbon composition is characterized as non-self-heating when subjected to a self-heating test according to *Manual of Tests and Criteria*, Seventh revised edition 2019, United Nations, Page 375, 33.4.6 Test N.4: "Test method for self-heating substances". In some embodiments, the first fixed carbon concentration, the second fixed carbon concentration, or the additive type or concentration, is selected to optimize energy content associated with the biocarbon composition.

In some embodiments of the process, the process comprises selecting the first fixed carbon concentration, the second fixed carbon concentration, or the type or concentration of the additive, thereby optimizing the bulk density of the biocarbon. In some embodiments of the process, the process comprises selecting the first fixed carbon concentration, the second fixed carbon concentration, or the type or concentration of the additive, thereby optimizing the hydrophobicity of the biocarbon. In some embodiments of the process, the process comprises selecting the first fixed carbon concentration, the second fixed carbon concentration, or the type or concentration of the additive, thereby optimizing the pore sizes of the biocarbon. In some embodiments of the process, the process comprises selecting the first fixed carbon concentration, the second fixed carbon concentration, or the type or concentration of the additive, thereby optimizing the pore size ratios of the biocarbon. In some embodiments of the process, the process comprises selecting the first fixed carbon concentration, the second fixed carbon concentration, or the type or concentration of the additive, thereby optimizing the surface area of the biocarbon. In some embodiments of the process, the process comprises selecting the first fixed carbon concentration, the second fixed carbon concentration, or the type or concentration of the additive, thereby optimizing the reactivity of the biocarbon. In some embodiments of the process, the process comprises selecting the first fixed carbon concentration, the second fixed carbon concentration, or the type or concentration of the additive, thereby optimizing the ion exchange capacity (IEC) of the biocarbon.

In some embodiments of the process, the process comprises selecting the first fixed carbon concentration, the second fixed carbon concentration, or the type or concentration of the additive, thereby optimizing the Hardgrove Grindability Index of the biocarbon. In some embodiments of the process, the process comprises selecting the first fixed carbon concentration, the second fixed carbon concentration, or the type or concentration of the additive, thereby optimizing the Pellet Durability Index of the biocarbon.

In some embodiments of the process, the biocarbon composition comprises a total carbon, wherein at least 50% of the total carbon consists essentially of biogenic carbon as determined from a measurement of the $^{14}C/^{12}C$ isotopic ratio of the total carbon. In some embodiments of the process, the biocarbon composition comprises a total carbon, wherein at least 90% of the total carbon consists essentially of biogenic carbon as determined from a measurement of the $^{14}C/^{12}C$ isotopic ratio of the total carbon. In some embodiments of the process, the biocarbon composition comprises a total carbon, wherein the total carbon consists essentially of biogenic carbon as determined from a measurement of the $^{14}C/^{12}C$ isotopic ratio of the total carbon.

The processes of the present disclosure can comprise: pyrolyzing a first feedstock, wherein the first feedstock comprises biomass, thereby generating a low fixed carbon material and a first pyrolysis off-gas, wherein the low fixed carbon material comprises a first fixed carbon concentration of at least about 20 wt % to at most about 55 wt % fixed carbon on an absolute basis; providing a high fixed carbon material, wherein the high fixed carbon material comprises a second fixed carbon concentration of at least about 50 wt % to at most about 100 wt % fixed carbon on an absolute basis, and wherein the second fixed carbon concentration is greater than the first fixed carbon concentration; blending the low fixed carbon material with the high fixed carbon material, thereby generating an intermediate material; optionally, blending one or more additives into the intermediate material; optionally, drying the intermediate material; and recovering a biocarbon composition comprising the intermediate material or a thermally treated derivative thereof.

In some embodiments of the process, the high fixed carbon material comprises pyrolyzed biomass, coal, pyrolyzed coal, coke, petroleum coke, metallurgical coke, activated carbon, carbon black, graphite, graphene, pyrolyzed polymers, or a combination thereof.

The processes of the present disclosure can comprise: providing a low fixed carbon material, wherein the low fixed carbon material comprises a first fixed carbon concentration of at least about 10 wt % to at most about 55 wt % fixed carbon on an absolute basis; pyrolyzing a feedstock, wherein the feedstock comprises biomass, thereby generating a high fixed carbon material and a pyrolysis off-gas, wherein the high fixed carbon material comprises a second fixed carbon concentration of at least about 50 wt % to at most about 100 wt % fixed carbon on an absolute basis, and wherein the second fixed carbon concentration is greater than the first fixed carbon concentration; blending the low fixed carbon material with the high fixed carbon material, thereby generating an intermediate material; optionally, blending an additive with the intermediate material; optionally, drying the intermediate material; and recovering a biocarbon composition comprising the intermediate material or a thermally treated derivative thereof.

In some embodiments of the process, the low fixed carbon material comprises unpyrolyzed biomass, pyrolyzed biomass, unpyrolyzed polymers, pyrolyzed polymers, or a combination thereof.

The processes of the present disclosure can comprise: providing a low fixed carbon material, wherein the low fixed carbon material comprises a first fixed carbon concentration of at least about 10 wt % to at most about 55 wt % fixed carbon on an absolute basis; providing a high fixed carbon material, wherein the high fixed carbon material comprises a second fixed carbon concentration of at least about 50 wt % to at most about 100 wt % fixed carbon on an absolute basis, and wherein the second fixed carbon concentration is greater than the first fixed carbon concentration; blending the low fixed carbon material with the high fixed carbon material, thereby generating an intermediate material; optionally, blending an additive with the intermediate material; optionally, drying the intermediate material; and recovering a biocarbon composition comprising the intermediate material or a thermally treated derivative thereof.

In some embodiments of the process, the low fixed carbon material comprises unpyrolyzed biomass, pyrolyzed biomass, unpyrolyzed polymers, pyrolyzed polymers, or a combination thereof. In some embodiments of the process, the high fixed carbon material comprises pyrolyzed biomass, coal, pyrolyzed coal, coke, petroleum coke, metallurgical coke, activated carbon, carbon black, graphite, graphene, pyrolyzed polymers, or a combination thereof.

DETAILED DESCRIPTION

Figure 1:
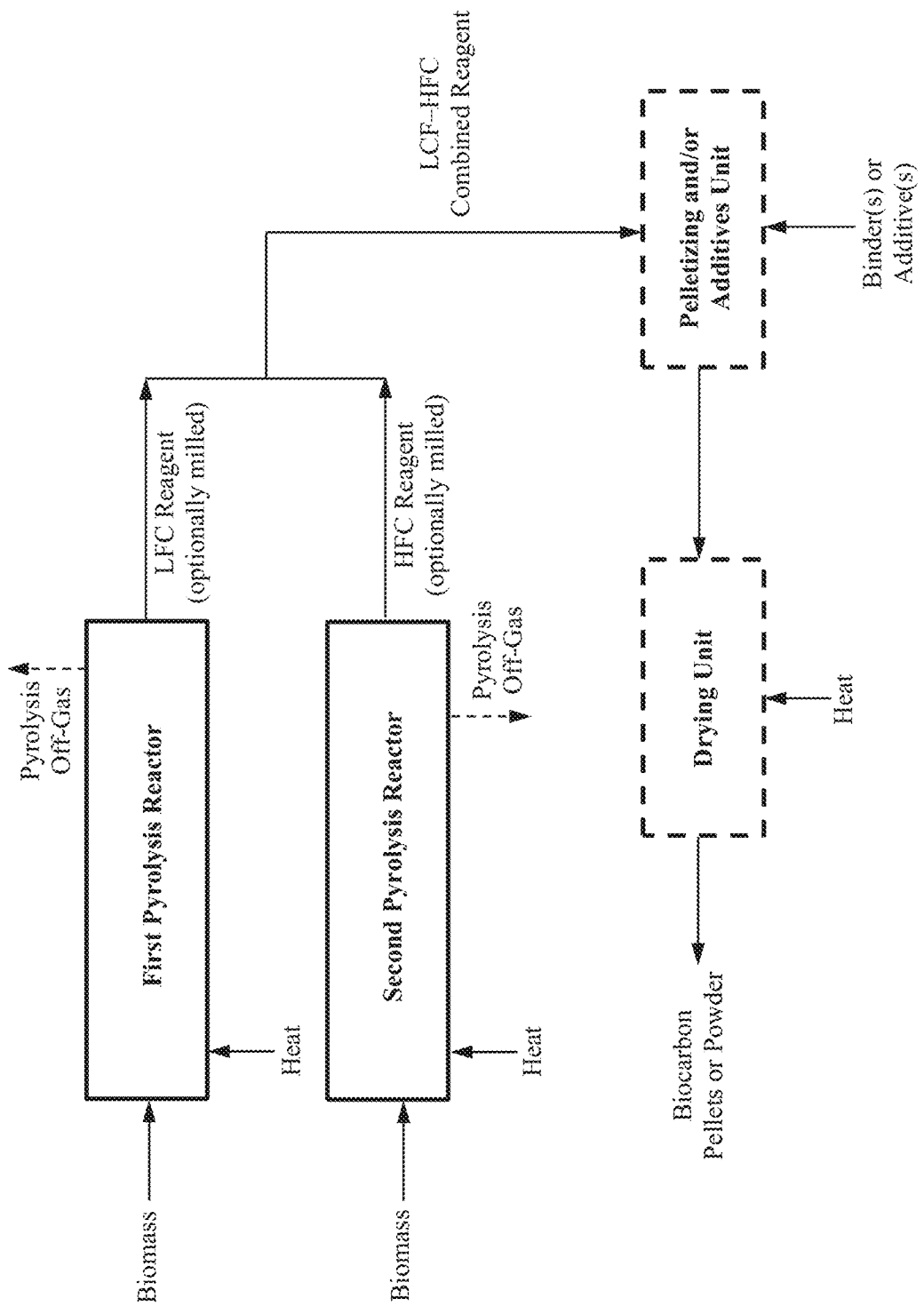
FIG. 1 is a simplified block-flow diagram of a process for producing a biocarbon composition having a low fixed carbon material blended with a high fixed carbon material, optionally with additives (such as binders to make pellets), in some embodiments. Dotted boxes and lines denote optional units and streams, respectively.

While the present disclosure is capable of being embodied in various forms, the description below of several embodiments is made with the understanding that the present disclosure is to be considered as an exemplification of the invention and is not intended to limit the invention to the specific embodiments illustrated. Headings are provided for convenience only and are not to be construed to limit the invention in any manner. Embodiments illustrated under any heading may be combined with embodiments illustrated under any other heading.

The use of numerical values in the various quantitative values specified in this application, unless expressly indicated otherwise, are stated as approximations as though the minimum and maximum values within the stated ranges were both preceded by the word "about." It is to be understood, although not always explicitly stated, that all numerical designations are preceded by the term "about." It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth. It also is to be understood, although not always explicitly stated, that the reagents described herein are merely exemplary and that equivalents of such are known in the art.

The term "about," as used herein when referring to a measurable value such as an amount or concentration and the like, is meant to encompass variations of 20%, 10%, 5%, 1%, 0.5%, or even 0.1% of the specified amount.

Also, the disclosure of ranges is intended as a continuous range, including every value between the minimum and maximum values recited, as well as any ranges that can be formed by such values. Also disclosed herein are any and all ratios (and ranges of any such ratios) that can be formed by dividing a disclosed numeric value into any other disclosed numeric value. Accordingly, the skilled person will appreciate that many such ratios, ranges, and ranges of ratios can be unambiguously derived from the numerical values presented herein and in all instances, such ratios, ranges, and ranges of ratios represent various embodiments of the present disclosure. Where a lower bound is not provided, the lower bound is 0 or trace amounts. For example, where there is "at most about 90%," the lower bound is "about 0%" or trace amounts. Where an upper bound of a percentage is not provided, the upper bound is 100%. For example, where there is "at least about 5%," the upper bound is "about 100%."

"Comprising" or "comprises" is intended to mean that the compositions and methods include the recited elements, but not excluding others. "Consisting essentially of" when used to define compositions and methods, shall mean excluding other elements of any essential significance to the combination for the stated purpose. Thus, a composition consisting essentially of the elements as defined herein would not exclude other materials or steps that do not materially affect the basic and novel characteristic(s) of the claimed invention. "Consisting of" shall mean excluding more than trace elements of other ingredients and substantial method steps. Embodiments defined by each of these transition terms are within the scope of this invention.

As used herein, where the indefinite article "a" or "an" is used with respect to a statement or description of the presence of a step in a process disclosed herein, unless the statement or description explicitly provides to the contrary, the use of such indefinite article does not limit the presence of the step in the process to one in number. As used herein, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed.

For present purposes, "biogenic" is intended to mean a material (whether a feedstock, product, or intermediate) that contains an element, such as carbon, that is renewable on time scales of months, years, or decades. Non-biogenic materials can be non-renewable, or can be renewable on time scales of centuries, thousands of years, millions of years, or even longer geologic time scales. Note that a biogenic material may include a mixture of biogenic and non-biogenic sources.

For present purposes, "reagent" is intended to mean a material in its broadest sense; a reagent can be a fuel, a chemical, a material, a molecule, an additive, a blend component, a solvent, and so on. A reagent is not necessarily a chemical reagent that causes or participates in a chemical reaction. A reagent may or may not be a chemical reactant; it may or may not be consumed in a reaction. A reagent can be a chemical catalyst for a particular reaction. A reagent may cause or participate in adjusting a mechanical, physical, or hydrodynamic property of a material to which the reagent can be added. For example, a reagent can be introduced to a metal to impart certain strength properties to the metal. A reagent can be a substance of sufficient purity (which, in the current context, is typically carbon purity) for use in chemical analysis or physical testing.

The terms "low fixed carbon" and "high fixed carbon" are used herein for practical purposes to describe materials that can be produced by processes and systems as disclosed, in various embodiments. Limitations as to carbon content, or any other concentrations, shall not be imputed from the term itself but rather only by reference to particular embodiments and equivalents thereof.

"Ash" refers to non-carbon components that do not vaporize during pyrolysis. Ash content can be measured by ASTM D3175 or other techniques. Ash composition can be analyzed by ASTM D4326 or other techniques. Ash can contain $Fe_2O_3$, $CaO$, $MgO$, $K_2O$, $Na_2O$, $SiO_2$, $Al_2O_3$, and $TiO_2$, for example. Silica ($SiO_2$) is typically the most significant component of ash derived from biomass.

Biocarbon Compositions

The carbon-based reagents herein are derived, at least in part, from renewable resources. Such reagents are particularly useful, at least in part, due to the rising economic, environmental, and social costs associated with fossil resources.

As used herein, "biomass" is a term used to describe biologically produced matter, or biogenic matter. The chemical energy contained in biomass is derived from solar energy using the natural process of photosynthesis. Photosynthesis is the process by which plants take in carbon dioxide and water from their surroundings and, using energy from sunlight, convert them into sugars, starches, cellulose, hemicellulose, and lignin. Of all the renewable energy sources, biomass is unique in that it is, effectively, stored solar energy. Furthermore, biomass is the only renewable source of carbon.

Disclosed herein are biocarbon compositions. The biocarbon compositions of the present disclosure can comprise: at least about 1 wt % to at most about 99 wt % of a low fixed carbon material, wherein the low fixed carbon material comprises a first fixed carbon concentration of at least about 20 wt % to at most about 55 wt % fixed carbon on an absolute basis; at least about 1 wt % to at most about 99 wt % of a high fixed carbon material, wherein the high fixed carbon material comprises a second fixed carbon concentration of at least about 50 wt % to at most about 100 wt % fixed carbon on an absolute basis, and wherein the second fixed carbon concentration is greater than the first fixed carbon concentration; at least about 0 wt % to at most about 30 wt % moisture; at least about 0 wt % to at most about 15 wt % ash; and at least about 0 wt % to at most about 20 wt % of an additive; wherein a total wt %, calculated as a sum of the low fixed carbon material, the high fixed carbon material, moisture, ash, and the additive, is at most 100 wt %. As used herein, "absolute basis" includes ash and moisture.

In some embodiments, the biocarbon composition comprises a homogeneous physical blend of the low fixed carbon material and the high fixed carbon material. In other words, the low fixed carbon material and the high fixed carbon material can be present in the biocarbon composition as a homogenous physical blend. In some embodiments, the low fixed carbon material is uniformly dispersed throughout the biocarbon composition. In some embodiments, the high fixed carbon material is uniformly dispersed throughout the biocarbon composition. In some embodiments, the low fixed carbon material and the high fixed carbon material are uniformly dispersed throughout the biocarbon composition.

In some embodiments, the biocarbon composition comprises a heterogeneous physical blend of the low fixed carbon material and the high fixed carbon material. In other words, the low fixed carbon material and the high fixed carbon material can be present in the biocarbon composition as a heterogeneous physical blend. In some embodiments, the biocarbon composition comprises distinct layers of the low fixed carbon material and the high fixed carbon material. In some embodiments, the biocarbon composition comprises a core and a shell, or a core and a coating, wherein the core is comprised within the shell, wherein the core comprises the high fixed carbon material, and wherein the shell comprises the low fixed carbon material. In some embodiments, the biocarbon composition comprises a core and a shell, or a core and a coating, wherein the core is comprised within the shell, wherein the core comprises the low fixed carbon material, and wherein the shell comprises the high fixed carbon material. In some embodiments, the high fixed carbon material is in the form of particulates in a continuous phase of the low fixed carbon material. In some embodiments, the low fixed carbon material is in the form of particulates in a continuous phase of the high fixed carbon material.

The low fixed carbon material and the high fixed carbon material may form distinct phases that do not dissolve into each other at equilibrium and at relatively low temperatures. In some embodiments, the low fixed carbon material and the high fixed carbon material may have high equilibrium (thermodynamic) solubilities in each other, but nevertheless remain kinetically frozen in the composition such that distinct materials are observable. The distinct materials can be observable by measuring compositions, densities, particle sizes, reactivities, or other physical or chemical properties. During final use of the biocarbon composition, it is possible (e.g., at elevated temperatures or during carbon oxidation) for the material distinction to be lost.

In one technique to demonstrate that a given biocarbon composition contains both a low fixed carbon material and a distinct high fixed carbon material, thermogravimetric analysis (TGA) of combustion of a biocarbon composition test sample is performed. In some embodiments, the resulting TGA thermal curve has two peaks characteristic of distinct mass-loss events that correlate with the low fixed carbon material and the high fixed carbon material. This can be compared against a control sample of a biocarbon composition that contains a single material having a uniform fixed carbon concentration, to show a TGA thermal curve with a single peak characteristic of one mass-loss event for the material. In similar embodiments, the TGA thermal curve for the test sample has three or more peaks, while the TGA thermal curve for the control sample has at least one less peak than for the test sample.

Another technique to demonstrate that a given biocarbon composition contains both a low fixed carbon material and a distinct high fixed carbon material is a particle-size analysis. This is a viable approach when the particle sizes associated with the low fixed carbon material and the high fixed carbon material are different, or when the particle-size distributions associated with the low fixed carbon material and the high fixed carbon material are different. For example, the high fixed carbon material tends to have larger particles compared to the low fixed carbon material. In some embodiments, a bimodal particle-size distribution arising from the presence of both a low fixed carbon material and a high fixed carbon material, in contrast to a control sample that has a unimodal particle-size distribution characteristic of a uniform material. In similar embodiments, the test sample may have a particle-size distribution with at least one more mode than the control-sample particle-size distribution. It is possible, for example, for each of the low fixed carbon material and the high fixed carbon material to have bimodal particle-size distributions (with peaks centered at different sizes) and the control sample to also have a bimodal particle-size distribution, depending on how the control sample was produced.

Particle sizes can be measured by a variety of techniques, including dynamic light scattering, laser diffraction, image analysis, or sieve separation, for example. Dynamic light scattering is a non-invasive, well-established technique for measuring the size and size distribution of particles typically in the submicron region, and with the latest technology down to 1 nanometer. Laser diffraction is a widely used particle-sizing technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images. Finally, sieving is a conventional technique of separating particles by size.

Imaging techniques may alternatively, or additionally, be utilized to demonstrate that a given biocarbon composition contains both a low fixed carbon material and a distinct high fixed carbon material. Imaging techniques include, but are not limited to, optical microscopy; dark-field microscopy; scanning electron microscopy (SEM); transmission electron microscopy (TEM); and X-ray tomography (XRT), for example. An imaging technique can be used to demonstrate distinct materials in a blend, rather than a homogeneous material, for example. Or, an imaging technique can be used to select subsamples for further analysis. Further analysis can be compositional analysis to show three-dimensional variations in fixed carbon content. Further analysis can be property analysis to show three-dimensional variations in chemical or physical properties, such as density, particle size, or reactivity, for example.

Spectroscopy techniques may alternatively, or additionally, be utilized to demonstrate that a given biocarbon composition contains both a low fixed carbon material and a distinct high fixed carbon material. Spectroscopy techniques include, but are not limited to, energy dispersive X-ray spectroscopy (EDS), X-ray fluorescence (XRF), infrared (IR) spectroscopy; and nuclear magnetic resonance (NMR) spectroscopy, for example.

The species and concentration ranges of various biocarbon compositions will now be further described.

In some embodiments, the biocarbon composition comprises at least about 10 wt % to at most about 90 wt % of the low fixed carbon material. In some embodiments, the biocarbon composition comprises at least about 10 wt % to at most about 90 wt % of the high fixed carbon material. In some embodiments, a weight ratio of the low fixed carbon material to the high fixed carbon material is at least about 0.1 to at most about 10. In some embodiments, a weight ratio of the low fixed carbon material to the high fixed carbon material is at least about 0.2 to at most about 5. In some embodiments, a weight ratio of the low fixed carbon material to the high fixed carbon material is at least about 0.5 to at most about 2. In some embodiments, a weight ratio of the low fixed carbon material to the high fixed carbon material is at least about 0.8 to at most about 1.2.

In some embodiments, the first fixed carbon concentration is at least about 20 wt % to at most about 40 wt %. In some embodiments, the first fixed carbon concentration is at least about 25 wt % to at most about 50 wt %. In some embodiments, the first fixed carbon concentration is at least about 30 wt % to at most about 55 wt %. In some embodiments, the second fixed carbon concentration is at least about 80 wt % to at most about 100 wt %. In some embodiments, the second fixed carbon concentration is at least about 70 wt % to at most about 95 wt %. In some embodiments, the second fixed carbon concentration is at least about 60 wt % to at most about 90 wt %.

In some embodiments, an unweighted average of the first fixed carbon concentration and the second fixed carbon concentration is at least about 30 wt % to at most about 90 wt %. In some embodiments, an unweighted average of the first fixed carbon concentration and the second fixed carbon concentration is at least about 40 wt % to at most about 80 wt %. In some embodiments, the biocarbon composition comprises a total fixed carbon concentration of at least about 25 wt % to at most about 95 wt %, on an absolute basis. In some embodiments, the biocarbon composition comprises a total fixed carbon concentration of at least about 35 wt % to at most about 85 wt % on an absolute basis. In some embodiments, the low fixed carbon material comprises at least about 45 wt % to at most about 80 wt % volatile carbon, on an absolute basis (i.e., including ash and moisture). In various embodiments, the low fixed carbon material may contain about, at least about, or at most about 45, 50, 55, 60, 65, 70, 75, or 80 wt % volatile carbon on an absolute basis. The low fixed carbon material may contain from about 1 wt % to about 20 wt % oxygen on an absolute basis, for example. The low fixed carbon material may contain from about 0.1 wt % to about 10 wt % hydrogen on an absolute basis, for example.

The high fixed carbon material may contain from about 0 to about 50 wt % volatile carbon on an absolute basis. In various embodiments, the high fixed carbon material may contain about, at least about, or at most about 1, 5, 10, 15, 20, 25, 30, 35, 40, 45, or 50 wt % volatile carbon on an absolute basis. The high fixed carbon material may contain from about 1 wt % to about 20 wt % oxygen on an absolute basis, for example. The high fixed carbon material may contain from about 0.1 wt % to about 10 wt % hydrogen on an absolute basis, for example.

In some embodiments, the biocarbon composition comprises from about 0.1 wt % to about 20 wt % moisture. In various embodiments, the biocarbon composition comprises about, at least about, or at most about 0, 0.1, 0.2, 0.5, 1, 2, 3, 4, 5, 6, 7, 8, 9, 10, 11, 12, 13, 14, 15, 16, 17, 18, 19, or 20 wt % moisture, including all intervening ranges. The low fixed carbon material may contain from 0 to about 50 wt % moisture, such as about, at least about, or at most about 0, 0.1, 0.2, 0.5, 1, 2, 3, 4, 5, 6, 7, 8, 9, 10, 11, 12, 13, 14, 15, 16, 17, 18, 19, or 20 wt % moisture, including all intervening ranges. Independently, the high fixed carbon material may contain from 0 to about 50 wt % moisture, such as about, at least about, or at most about 0, 0.1, 0.2, 0.5, 1, 2, 3, 4, 5, 6, 7, 8, 9, 10, 11, 12, 13, 14, 15, 16, 17, 18, 19, or 20 wt % moisture, including all intervening ranges.

In some embodiments, the biocarbon composition comprises from about 0.1 wt % to about 10 wt % ash. In various embodiments, the biocarbon composition comprises about, at least about, or at most about 0.1, 0.2, 0.5, 1, 2, 3, 4, 5, 6, 7, 8, 9, or 10 wt % ash, including all intervening ranges. The low fixed carbon material may contain from 0 to about 25 wt % ash, such as about, at least about, or at most about 0, 0.1, 0.2, 0.5, 1, 2, 3, 4, 5, 6, 7, 8, 9, 10, 11, 12, 13, 14, 15, 16, 17, 18, 19, 20, 21, 22, 23, 24, or 25 wt % ash, including all intervening ranges. Independently, the high fixed carbon material may contain from 0 to about 50 wt % ash, such as about, at least about, or at most about 0, 0.1, 0.2, 0.5, 1, 2, 3, 4, 5, 6, 7, 8, 9, 10, 11, 12, 13, 14, 15, 16, 17, 18, 19, 20, 21, 22, 23, 24, or 25 wt % ash, including all intervening ranges.

In some embodiments, the biocarbon composition comprises from about 0.1 wt % to about 10 wt % of one or more additives. In some embodiments, the biocarbon composition comprises from about 1 wt % to about 15 wt % of one or more additives. In some embodiments, the biocarbon composition comprises from about 3 wt % to about 18 wt % of one or more additives. In various embodiments, the biocarbon composition comprises about, at least about, or at most about 0, 0.1, 0.2, 0.5, 1, 2, 3, 4, 5, 6, 7, 8, 9, or 10 wt % additive(s), including all intervening ranges.

The low fixed carbon material may contain from 0 to about 20 wt % additives, such as about, at least about, or at most about 0, 0.1, 0.2, 0.5, 1, 2, 3, 4, 5, 6, 7, 8, 9, 10, 11, 12, 13, 14, 15, 16, 17, 18, 19, or 20 wt % additive(s), including all intervening ranges. Independently, the high fixed carbon material may contain from 0 to about 50 wt % additives, such as about, at least about, or at most about 0, 0.1, 0.2, 0.5, 1, 2, 3, 4, 5, 6, 7, 8, 9, 10, 11, 12, 13, 14, 15, 16, 17, 18, 19, or 20 wt % additive(s), including all intervening ranges.

The additives may include an organic additive and/or an inorganic additive. In some embodiments, one or more additives include a renewable material. In some embodiments, one or more additives include a material that is capable of being partially oxidized and/or combusted.

In some embodiments, one or more additives comprise a binder. In some embodiments, the binder comprises starch, thermoplastic starch, crosslinked starch, starch polymers, cellulose, cellulose ethers, hemicellulose, methylcellulose, chitosan, lignin, lactose, sucrose, dextrose, maltodextrin, banana flour, wheat flour, wheat starch, soy flour, corn flour, wood flour, coal tars, coal fines, met coke, asphalt, coal-tar pitch, petroleum pitch, bitumen, pyrolysis tars, gilsonite, bentonite clay, borax, limestone, lime, waxes, vegetable waxes, baking soda, baking powder, sodium hydroxide, potassium hydroxide, iron ore concentrate, silica fume, gypsum, Portland cement, guar gum, xanthan gum, polyvidones, polyacrylamides, polylactides, phenol-formaldehyde resins, vegetable resins, recycled shingles, recycled tires, or a derivative thereof, or a combination thereof.

In certain embodiments, a binder comprises starch, thermoplastic starch, crosslinked starch, starch polymers, derivatives thereof, or a combination thereof. In some embodiments, the binder comprises thermoplastic starch that is crosslinked. In some embodiments, the thermoplastic starch comprises a reaction product of starch and a polyol. In some embodiments, the polyol comprises ethylene glycol, propylene glycol, glycerol, butanediols, butanetriols, erythritol, xylitol, sorbitol, or a combination thereof. The reaction product can be formed from a reaction that is catalyzed by an acid. In some embodiments, the acid comprises formic acid, acetic acid, lactic acid, citric acid, oxalic acid, uronic acids, glucuronic acids, or a combination thereof. Alternatively, the reaction product can be formed from a reaction that is catalyzed by a base.

One or more additives may reduce the reactivity of the biocarbon composition compared to an otherwise-equivalent biocarbon composition without the one or more additives. The reactivity can be thermal reactivity. For example, the biocarbon composition with one or more additives may have a lower self-heating compared to the otherwise-equivalent biocarbon composition without the one or more additives. Alternatively, or additionally, the reactivity is chemical reactivity with oxygen, water, hydrogen, carbon monoxide, and/or metals (e.g., iron).

When additives are employed, the additives do not need to be uniformly distributed throughout the biomass composition. The additives can be preferentially present within one of the low fixed carbon material or high fixed carbon material, or even solely present within one of those materials. For example, a binder can be present in the overall biomass composition at 5 wt %, but of that amount, 4 percentage points are disposed within the low fixed carbon material and 1 percentage point is disposed within the high fixed carbon material (i.e., 80% of the binder is placed within the low fixed carbon material). In various embodiments, the percentage of total additives disposed within the low fixed carbon material can be about, at least about, or at most about 0, 5%, 10%, 20%, 30%, 40%, 50%, 60%, 70%, 80%, 90%, or 100%; the percentage of total additives disposed within the high fixed carbon material can be about, at least about, or at most about 0, 5%, 10%, 20%, 30%, 40%, 50%, 60%, 70%, 80%, 90% or 100%; and the percentage of total additives disposed within neither the low fixed carbon material nor the high fixed carbon material, but elsewhere within the biocarbon composition (e.g., as a separate additive phase) can be about, at least about, or at most about 0, 5%, 10%, 20%, 30%, 40%, 50%, 60%, 70%, 80%, 90%, or 100%.

When the one or more additives are present, some or all of the additives can be pore-filling within the low fixed carbon material. When the one or more additives are present, some or all of the additives can be pore-filling within the high fixed carbon material. In some embodiments, one or more additives are present and are pore-filling within both of the low fixed carbon material and the high fixed carbon material.

Alternatively, or additionally, one or more additives can be disposed on an outer surface of the biocarbon composition (e.g., an outer surface of pellets or powder particles).

In some embodiments, the biocarbon composition is in the form of powder.

In some embodiments of the invention, the biocarbon composition is in the form of pellets. When the form is pellets, one or more additives may include a binder for the pellets. Alternatively, or additionally, pellets may utilize the low fixed carbon material itself as a binder within the pellets.

In some embodiments, the high fixed carbon material comprises at least about 0 wt % to at most about 50 wt % volatile carbon, on an absolute basis. In some embodiments, the biocarbon composition comprises at least about 0.1 wt % to at most about 20 wt % moisture. In some embodiments, the biocarbon composition comprises at least about 0.1 wt % to at most about 10 wt % ash.

In some embodiments, the biocarbon composition comprises at least about 0.1 wt % to at most about 10 wt % of the additive. In some embodiments, the biocarbon composition comprises at least about 1 wt % to at most about 15 wt % of the additive. In some embodiments, the biocarbon composition comprises at least about 3 wt % to at most about 18 wt % of the additive. In some embodiments, the additive comprises an organic additive. In some embodiments, the additive comprises an inorganic additive. In some embodiments, the additive comprises a renewable material. In some embodiments, the additive comprises a material that is capable of being oxidized or combusted. In some embodiments, the additive comprises a binder. In some embodiments, the binder comprises starch, thermoplastic starch, crosslinked starch, starch polymers, cellulose, cellulose ethers, hemicellulose, methylcellulose, chitosan, lignin, lactose, sucrose, dextrose, maltodextrin, banana flour, wheat flour, wheat starch, soy flour, corn flour, wood flour, coal tars, coal fines, met coke, asphalt, coal-tar pitch, petroleum pitch, bitumen, pyrolysis tars, gilsonite, bentonite clay, borax, limestone, lime, waxes, vegetable waxes, baking soda, baking powder, sodium hydroxide, potassium hydroxide, iron ore concentrate, silica fume, gypsum, Portland cement, guar gum, xanthan gum, polyvidones, polyacrylamides, polylactides, phenol-formaldehyde resins, vegetable resins, recycled shingles, recycled tires, or a derivative thereof, or a combination thereof.

In some embodiments, the binder comprises starch, thermoplastic starch, crosslinked starch, starch polymers, a derivative thereof, or a combination thereof. In some embodiments, the binder comprises a thermoplastic starch. In some embodiments, the thermoplastic starch is crosslinked. In some embodiments, the thermoplastic starch is a reaction product of starch and a polyol. In some embodiments, the polyol of the reaction to produce the starch can be ethylene glycol, propylene glycol, glycerol, butanediols, butanetriols, erythritol, xylitol, sorbitol, or a combination thereof. In some embodiments, the thermoplastic starch is formed from a reaction that is catalyzed by an acid. In some embodiments, the acid comprises formic acid, acetic acid, lactic acid, citric acid, oxalic acid, uronic acids, glucuronic acids, or a combination thereof. In some embodiments, the thermoplastic starch is formed from a reaction that is catalyzed by a base.

The stability of the biocarbon composition can be increased by the addition of an additive. In some embodiments, the additive reduces the reactivity of the biocarbon composition compared to an otherwise-equivalent biocarbon composition without the additive. In some embodiments, the reactivity is thermal reactivity. In some embodiments, the biocarbon composition comprises lower self-heating compared to the otherwise-equivalent biocarbon composition without the additive. The reactivity can be chemical reactivity with oxygen, water, hydrogen, carbon monoxide, or a metal. In some embodiments, the metal comprises iron.

Where the chemical reactivity of the biocarbon composition, wherein the biocarbon composition comprises an additive, is decreased, the biocarbon composition is less likely to be oxidized. Oxidation can occur in the presence of oxygen, water, hydrogen, or carbon monoxide. Oxidation results in unwanted degradation of the beneficial capabilities of the biocarbon composition.

In some embodiments, the biocarbon composition comprises greater than 0 wt % of the additive. In other words, there are embodiments in which the additive is present in the composition. The low fixed carbon material can comprise a pore, and the pore can comprise the additive. In some embodiments, the additive is pore-filling of the low fixed carbon material pores. In some embodiments, the additive is pore-filling of the high fixed carbon material pores. In some embodiments, the high fixed carbon material comprises pores comprising the additive, and the low fixed carbon material comprise pores comprising the additive. In some embodiments, the additive is pore-filling of the high fixed carbon material pores and the low fixed carbon pores.

Alternatively, or additionally, the additive can be disposed on an outer surface of the biocarbon composition (e.g., an outer surface of pellets or powder particles). The process may include, for example, spray-coating of additives onto the biocarbon composition.

In some embodiments, the biocarbon composition is in the form of powder. Various particle sizes can be present in the powder. For example, the average particle diameter can be at least about 100 nanometers to at most about 500 microns, at least about 0.5 microns to at most about 500 microns, at least about 1 micron to at most about 500 microns, at least about 2 microns to at most about 500 microns, at least about 3 microns to at most about 500 microns, at least about 4 microns to at most about 500 microns, at least about 5 microns to at most about 500 microns, at least about 10 microns to at most about 500 microns, at least about 25 microns to at most about 500 microns, at least about 50 microns to at most about 500 microns, at least about 75 microns to at most about 500 microns, at least about 100 microns to at most about 500 microns, at least about 150 microns to at most about 500 microns, at least about 200 microns to at most about 500 microns, at least about 250 microns to at most about 500 microns, at least about 300 microns to at most about 500 microns, at least about 350 microns to at most about 500 microns, at least about 400 microns to at most about 500 microns, at least about 450 microns to at most about 500 microns, or about 500 microns.

In some embodiments, the biocarbon composition is in the form of a pellet. The average pellet diameter, or effective diameter, can be about 1, 2, 3, 4, 5, 6, 7, 8, 9, 10, 11, 12, 13, 14, 15, 20, or 25 millimeters. In some embodiments, the average pellet diameter is about 500, 1000, 1500, 2000, 2500, 3000, 3500, 4000, 4500, 5000, 5500, 6000, or 6500 microns. When the form of the composition is a pellet, one or more additives may include a binder for the pellet. In some embodiments, the pellet can utilize the low fixed carbon material itself as a binder within the pellets.

When an additive is present, the additive can be located within one of the low fixed carbon material or the high fixed carbon material. In some embodiments, the additive is be uniformly distributed such that the additive has the same average concentration within the low fixed carbon material and the high fixed carbon material.

In some embodiments, the biocarbon composition is characterized as non-self-heating when subjected to a self-heating test according to *Manual of Tests and Criteria*, Seventh revised edition 2019, United Nations, Page 375, 33.4.6 Test N.4: "Test method for self-heating substances". The energy content of the biocarbon composition can be changed by adjusting the first fixed carbon concentration, the second fixed carbon concentration, or the type or concentration of the additive. In some embodiments, the first fixed carbon concentration, the second fixed carbon concentration, or the additive type or concentration, is selected to optimize energy content associated with the biocarbon composition.

The bulk density of the biocarbon composition can be changed by adjusting the first fixed carbon concentration, the second fixed carbon concentration, or the type or concentration of the additive. In some embodiments, the first fixed carbon concentration, the second fixed carbon concentration, or the additive type or concentration, is selected to optimize bulk density associated with the biocarbon composition.

The hydrophobicity of the biocarbon composition can be changed by adjusting the first fixed carbon concentration, the second fixed carbon concentration, or the type or concentration of the additive. In some embodiments, the first fixed carbon concentration, the second fixed carbon concentration, or the additive type or concentration, is selected to optimize hydrophobicity associated with the biocarbon composition.

The hydrophobicity of the biocarbon composition can be characterized by the water uptake in a soaking test. For example, dried biocarbon pellets can be tested for hydrophobicity using a 24-hour soak at room temperature (about 25° C.) in excess water. After soaking, free water droplets are strained off using a sieve and then the sample is tested for total moisture by ASTM D3173. To calculate the net moisture uptake (also referred to herein as "water uptake"), the initial moisture content of the dried pellets is subtracted from the total moisture by ASTM D3173. For example, if the dried biocarbon pellets have 5% initial moisture and then the soaked pellets after 24 hours have 25% moisture, the water uptake is 25%−5%=20%. The same procedure can be used for biocarbon compositions that are not pellets, such as powders or granules.

The biocarbon composition can be characterized by less than 20 wt % water uptake at 25° C. after 24 hours of soaking in water (i.e., in excess liquid water relative to the mass of pellet). In some embodiments, the biocarbon composition is characterized by less than about 15 wt % water uptake at 25° C. after 24 hours of soaking in water. In certain embodiments, the biocarbon composition is characterized by less than about 10 wt % water uptake at 25° C. after 24 hours of soaking in water. In certain embodiments, the biocarbon composition is characterized by less than about 5 wt % water uptake at 25° C. after 24 hours of soaking in water, such as from about 2 wt % to about 4 wt % water uptake at 25° C. after 24 hours of soaking in water. In various embodiments, the biocarbon composition is characterized by about, or at most about 20, 19, 18, 17, 16, 15, 14, 13, 12, 11, 10, 9, 8, 7, 6, 5, 4, 3, 2, or 1 wt % water uptake at 25° C. after 24 hours of soaking in water.

The pore sizes of the biocarbon composition can be changed by adjusting the first fixed carbon concentration, the second fixed carbon concentration, or the type or concentration of the additive. In some embodiments, the first fixed carbon concentration, the second fixed carbon concentration, or the additive type or concentration, is selected to optimize pore sizes associated with the biocarbon composition.

The pore size ratios of the biocarbon composition can be changed by adjusting the first fixed carbon concentration, the second fixed carbon concentration, or the type or concentration of the additive. In some embodiments, the first fixed carbon concentration, the second fixed carbon concentration, or the additive type or concentration, is selected to optimize ratios of pore sizes associated with the biocarbon composition.

The surface area of the biocarbon composition can be changed by adjusting the first fixed carbon concentration, the second fixed carbon concentration, or the type or concentration of the additive. In some embodiments, the first fixed carbon concentration, the second fixed carbon concentration, or the additive type or concentration, are selected to optimize surface area associated with the biocarbon composition.

The reactivity of the biocarbon composition can be changed by adjusting the first fixed carbon concentration, the second fixed carbon concentration, or the type or concentration of the additive. In some embodiments, the first fixed carbon concentration, the second fixed carbon concentration, or the additive type or concentration, are selected to optimize reactivity associated with the biocarbon composition.

The ion exchange capacity of the biocarbon composition can be changed by adjusting the first fixed carbon concentration, the second fixed carbon concentration, or the type or concentration of the additive. In some embodiments, the first fixed carbon concentration, the second fixed carbon concentration, or the additive type or concentration, are selected to optimize ion-exchange capacity associated with the biocarbon composition.

The Hardgrove Grindability Index of the biocarbon composition can be changed by adjusting the first fixed carbon concentration, the second fixed carbon concentration, or the type or concentration of the additive. In some embodiments, the first fixed carbon concentration, the second fixed carbon concentration, and optionally the additive type and/or concentration, are selected to optimize Hardgrove Grindability Index associated with the pellets.

The Pellet Durability Index of the biocarbon composition can be changed by adjusting the first fixed carbon concentration, the second fixed carbon concentration, or the type or concentration of the additive. In some embodiments, the first fixed carbon concentration, the second fixed carbon concentration, or the additive type or concentration, are selected to optimize Pellet Durability Index associated with the pellets.

FIG. 1 is a simplified block-flow diagram of a process for producing a biocarbon composition having a low-fixed-carbon material blended with a high-fixed-carbon material, optionally with additives (such as binders to make pellets), in some embodiments. Dotted boxes and lines denote optional units and streams, respectively. In FIG. 1, biomass is fed to a first pyrolysis reactor operated at effective pyrolysis conditions that are described in this specification. The first pyrolysis reactor is configured to produce a low-fixed-carbon material, which is optionally milled to reduce particle size. Biomass is also fed to a second pyrolysis reactor operated at effective pyrolysis conditions that are described in this specification. The biomass fed to the second pyrolysis reactor can be the same as or different than the biomass fed to the first pyrolysis reactor. The second pyrolysis reactor is configured to produce a high-fixed-carbon material, which is optionally milled to reduce particle size. The milling of the low-fixed-carbon material or the high-fixed-carbon material, when employed, can be prior to combining the streams together, simultaneously with combining the streams together, or following the stream combination. The low-fixed-carbon material and the high-fixed-carbon material are combined (e.g., blended or co-milled) to generate a LCF-HFC combined reagent denoted in FIG. 1. The LCF-HFC combined reagent is optionally conveyed to a pelletizing unit or another unit into which an additive is fed. Alternatively, or additionally, the LCF-HFC combined reagent is fed to a drying unit operated to remove water from the LCF-HFC combined reagent. The final product is biocarbon pellets or powder.

Figure 2:
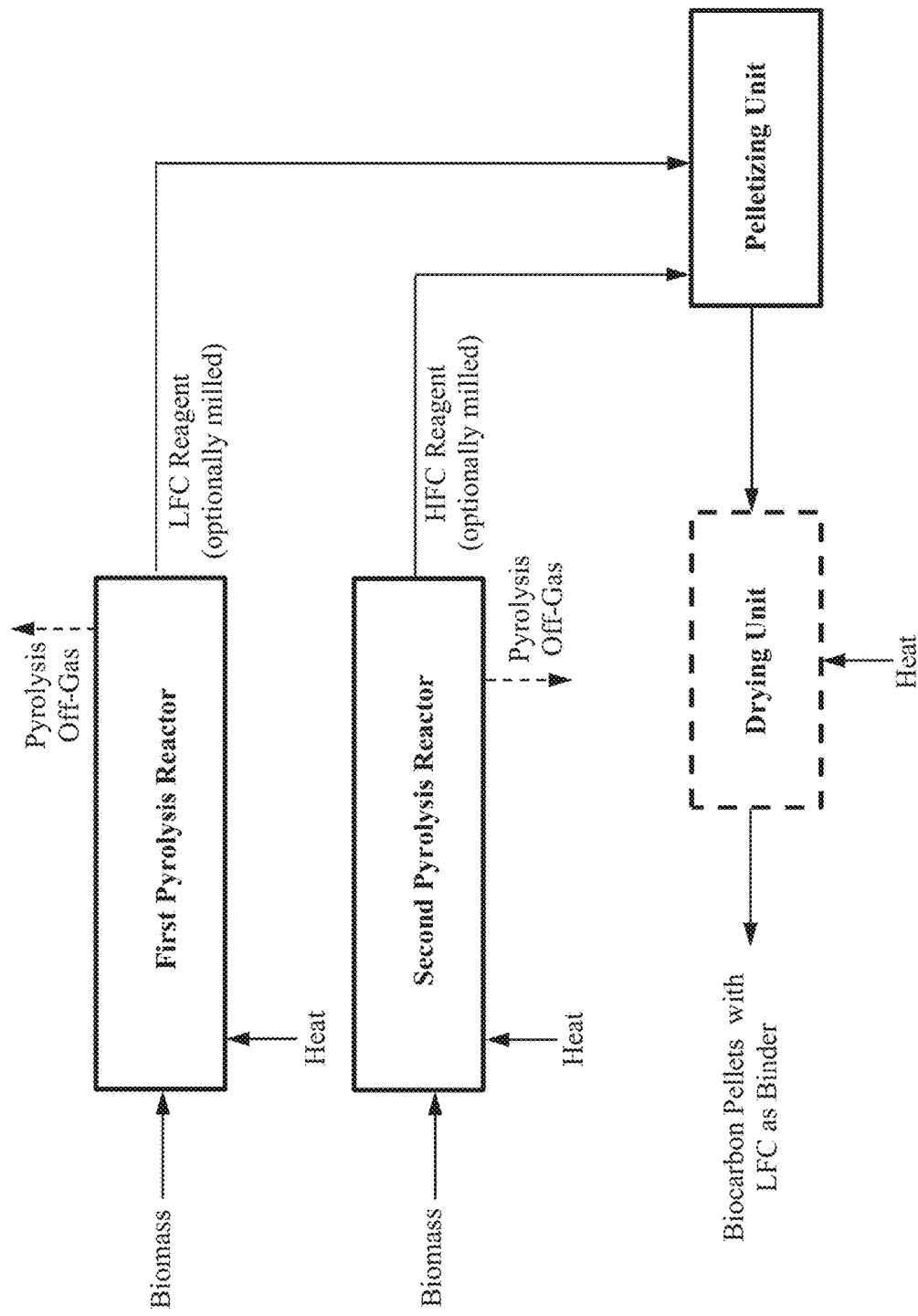
FIG. 2 is a simplified block-flow diagram of a process for producing a biocarbon composition having a low fixed carbon material blended with a high fixed carbon material, in which the low fixed carbon material functions as a pellet binder, in some embodiments. Dotted boxes and lines denote optional units and streams, respectively.

FIG. 2 is a simplified block-flow diagram of a process for producing a biocarbon composition having a low-fixed-carbon material blended with a high-fixed-carbon material, in which the low-fixed-carbon material functions as a pellet binder, in some embodiments. Dotted boxes and lines denote optional units and streams, respectively. In FIG. 2, biomass is fed to a first pyrolysis reactor operated at effective pyrolysis conditions that are described in this specification. The first pyrolysis reactor is configured to produce a low-fixed-carbon material, which is optionally milled to reduce particle size. Biomass is also fed to a second pyrolysis reactor operated at effective pyrolysis conditions that are described in this specification. The biomass fed to the second pyrolysis reactor can be the same as or different than the biomass fed to the first pyrolysis reactor. The second pyrolysis reactor is configured to produce a high-fixed-carbon material, which is optionally milled to reduce particle size. The milling of the low-fixed-carbon material or the high-fixed-carbon material, when employed, can be prior to combining the streams together, simultaneously with combining the streams together, or following the stream combination. The low-fixed-carbon material and the high-fixed-carbon material are both fed to a pelletizing unit. In the pelletizing unit, pellets are formed using the low-fixed-carbon material as a binder. A separate binder material can also be fed to the pelletizing unit, in other embodiments. Optionally, the pellets are fed to a drying unit operated to remove water from the pellets. The final product is biocarbon pellets with the low-fixed-carbon material functioning as a pellet binder.

Fixed carbon is a measure of the amount of non-volatile carbon remaining in a sample. It is a calculated value determined from other parameters measured in a proximate analysis, rather than through direct measurement (see ASTM method D3172-07a; American Society for Testing and Materials, 2013, p. 492-493). Fixed carbon is the calculated percentage of material that was lost during the testing for moisture, volatile matter, and ash:

Weight % fixed carbon=100−weight % moisture+
weight % volatile matter+weight % ash The total carbon is fixed carbon plus non-fixed carbon that is present in volatile matter. In some embodiments, component weight percentages are on an absolute basis, which is assumed unless stated otherwise. In other embodiments, component weight percentages are on a moisture-free and ash-free basis. Compositions of low-fixed carbon materials and high-fixed carbon materials have been addressed above.

The biocarbon compositions of the present disclosure can comprise: at least about 1 wt % to at most about 99 wt % of a low fixed carbon material, wherein the low fixed carbon material comprises a first fixed carbon concentration of at least about 10 wt % to at most about 55 wt % fixed carbon on an absolute basis; at least about 1 wt % to at most about 99 wt % of a high fixed carbon material, wherein the high fixed carbon material comprises a second fixed carbon concentration of at least about 50 wt % to at most about 100 wt % fixed carbon on an absolute basis, wherein the second fixed carbon concentration is greater than the first fixed carbon concentration; at least about 0 wt % to at most about 30 wt % moisture; at least about 0 wt % to at most about 15 wt % ash; and at least about 0 wt % to at most about 20 wt % of an additive; wherein the low fixed carbon material or the high fixed carbon material comprises biogenic carbon; and wherein a total wt %, calculated as a sum of the low fixed carbon material, the high fixed carbon material, moisture, ash, and the additive, is at most 100 wt %.

In some embodiments, the low fixed carbon material comprises unpyrolyzed biomass, pyrolyzed biomass, unpyrolyzed polymers, pyrolyzed polymers, coal, pyrolyzed coal, or a combination thereof. In some embodiments, the high fixed carbon material comprises pyrolyzed biomass, coal, pyrolyzed coal, coke, petroleum coke, metallurgical coke, activated carbon, carbon black, graphite, graphene, pyrolyzed polymers, or a combination thereof.

There are three naturally occurring isotopes of carbon, $^{12}C$, $^{13}C$, and $^{14}C$. $^{12}C$ and $^{13}C$ are stable, occurring in a natural proportion of approximately 93:1. $^{14}C$ is produced by thermal neutrons from cosmic radiation in the upper atmosphere, and is transported down to earth to be absorbed by living biological material. Isotopically, $^{14}C$ constitutes a negligible part; but, since it is radioactive with a half-life of 5,700 years, it is radiometrically detectable. Dead tissue does not absorb $^{14}C$, so the amount of $^{14}C$ is one of the methods used for radiometric dating of biological material.

Plants take up $^{14}C$ by fixing atmospheric carbon through photosynthesis. Animals then take $^{14}C$ into their bodies when they consume plants or consume other animals that consume plants. Accordingly, living plants and animals have the same ratio of $^{14}C$ to $^{12}C$ as the atmospheric $CO_2$. Once an organism dies, it stops exchanging carbon with the atmosphere, and thus no longer takes up new $^{14}C$. Radioactive decay then gradually depletes the $^{14}C$ in the organism. This effect is the basis of radiocarbon dating.

Fossil fuels, such as coal, are made primarily of plant material that was deposited millions of years ago. This period of time equates to thousands of half-lives of so essentially all of the $^{14}C$ in fossil fuels has decayed. Fossil fuels also are depleted in $^{13}C$ relative to the atmosphere, because they were originally formed from living organisms. Therefore, the carbon from fossil fuels is depleted in both $^{13}C$ and $^{14}C$ compared to biogenic carbon.

This difference between the carbon isotopes of recently deceased organic matter, such as that from renewable resources, and the carbon isotopes of fossil fuels, such as coal, allows for a determination of the source of carbon in a composition. Specifically, whether the carbon in the composition was derived from a renewable resource or from a fossil fuel; in other words, whether a renewable resource or a fossil fuel was used in the production of the composition.

In all embodiments of the present disclosure, of compositions and processes for making compositions, the biocarbon composition can comprise a total carbon. In some embodiments, at least 50% of the total carbon consists essentially of biogenic carbon as determined from a measurement of the $^{14}C/^{12}C$ isotopic ratio of the total carbon. In some embodiments, at least 50% of the total carbon consists essentially of biogenic carbon as determined from a measurement of the $^{14}C/^{12}C$ isotopic ratio of the total carbon. In some embodiments, at least 90% of the total carbon consists essentially of biogenic carbon as determined from a measurement of the $^{14}C/^{12}C$ isotopic ratio of the total carbon. In some embodiments, the total carbon consists essentially of biogenic carbon as determined from a measurement of the $^{14}C/^{12}C$ isotopic ratio of the total carbon. The measurement of the $^{14}C/^{12}C$ isotopic ratio of the carbon can be performed using ASTM D6866.

Processes for Producing Biocarbon Compositions

Disclosed herein are processes for producing biocarbon compositions. The processes of the present disclosure can comprise: pyrolyzing a first feedstock, wherein the first feedstock comprises biomass, thereby generating a low fixed carbon material and a first pyrolysis off-gas, wherein the low fixed carbon material comprises a first fixed carbon concentration of at least about 20 wt % to at most about 55 wt % fixed carbon on an absolute basis; pyrolyzing a second feedstock, wherein the second feedstock comprises biomass, thereby generating a high fixed carbon material and a second pyrolysis off-gas, wherein the high fixed carbon material comprises a second fixed carbon concentration of at least about 50 wt % to at most about 100 wt % fixed carbon on an absolute basis, and wherein the second fixed carbon concentration is greater than the first fixed carbon concentration; blending the low fixed carbon material with the high fixed carbon material, thereby generating an intermediate material; and recovering a biocarbon composition comprising the intermediate material or a thermally treated derivative of the intermediate material.

In some embodiments, the process comprises drying the intermediate material. Drying can be employed at one or more points in the process.

In some embodiments, the process comprises blending the intermediate material with an additive, thereby generating a blended intermediate material. In some embodiments, the process comprises drying the blended intermediate material. In some embodiments, pyrolyzing the second feedstock is independent from pyrolyzing the first feedstock. In some embodiments, the first feedstock and the second feedstock are the same type of feedstock. In some embodiments, the first feedstock and the second feedstock are not the same type of feedstock.

In some embodiments, the first feedstock comprises softwood chips, hardwood chips, timber harvesting residues, tree branches, tree stumps, leaves, bark, sawdust, corn, corn stover, wheat, wheat straw, rice, rice straw, sugarcane, sugarcane bagasse, sugarcane straw, energy cane, sugar beets, sugar beet pulp, sunflowers, sorghum, canola, algae, miscanthus, alfalfa, switchgrass, fruits, fruit shells, fruit stalks, fruit peels, fruit pits, vegetables, vegetable shells, vegetable stalks, vegetable peels, vegetable pits, grape pumice, almond shells, pecan shells, coconut shells, coffee grounds, food waste, commercial waste, grass pellets, hay pellets, wood pellets, cardboard, paper, paper pulp, paper packaging, paper trimmings, food packaging, construction and/or demolition waste, railroad ties, lignin, animal manure, municipal solid waste, municipal sewage, or a combination thereof.

In some embodiments, the second feedstock comprises softwood chips, hardwood chips, timber harvesting residues, tree branches, tree stumps, leaves, bark, sawdust, corn, corn stover, wheat, wheat straw, rice, rice straw, sugarcane, sugarcane bagasse, sugarcane straw, energy cane, sugar beets, sugar beet pulp, sunflowers, sorghum, canola, algae, miscanthus, alfalfa, switchgrass, fruits, fruit shells, fruit stalks, fruit peels, fruit pits, vegetables, vegetable shells, vegetable stalks, vegetable peels, vegetable pits, grape pumice, almond shells, pecan shells, coconut shells, coffee grounds, food waste, commercial waste, grass pellets, hay pellets, wood pellets, cardboard, paper, paper pulp, paper packaging, paper trimmings, food packaging, construction and/or demolition waste, railroad ties, lignin, animal manure, municipal solid waste, municipal sewage, or a combination thereof.

In some embodiments, a biomass-containing feedstock includes biomass (such as a biomass source listed above) as well as a non-renewable feedstock, such as coal. Thus, a biomass-coal mixture can be utilized for the first biomass-containing feedstock and/or the second biomass-containing feedstock.

In some embodiments, pyrolyzing the first feedstock and pyrolyzing the second feedstock are performed in distinct pyrolysis reactors. The pyrolysis reactors are typically all conducted continuously or all conducted in batch, but in principle, a mixture of reaction modes can be used. Also, when distinct pyrolysis reactors are employed, they can be at a common site or at different sites.

In some embodiments, pyrolyzing the first feedstock and pyrolyzing the second feedstock are performed in a common pyrolysis reactor at distinct instances. When a single pyrolysis reactor is used, it can be operated in batch mode with distinct batches of low fixed carbon material and high fixed carbon material. Alternatively, a single pyrolysis reactor can be operated continuously or semi-continuously, such that a low fixed carbon material is produced for a first period of time and then a high fixed carbon material is produced for a second period of time (after which the reactor can be switched back to producing the low fixed carbon material or something else).

In certain embodiments, a low fixed carbon material is produced and stored. At a later time and potentially a different place, a first portion of that low fixed carbon material may then be converted into a high fixed carbon material via additional pyrolysis—while a second portion of the initial low fixed carbon material is blended with the produced high fixed carbon material.

In some embodiments, the blending comprises blending essentially all of the low fixed carbon material with the high fixed carbon material. In some embodiments, the blending comprises blending essentially all of the high fixed carbon material with the low fixed carbon material. In some embodiments, the blending of the low fixed carbon material with the high fixed carbon material comprises blending the low fixed carbon material and the high fixed carbon material with an additive. In some embodiments, the process comprises drying simultaneous with the blending. In some embodiments, the process comprises blending an additive with the intermediate material, thereby generating a blended intermediate material, then drying the intermediate material.

Blending of the low fixed carbon material and the high fixed carbon material can be done immediately after each is produced in a batch or continuous process. The low fixed carbon material can be stored prior to blending, or treated (e.g., thermally treated, mechanically treated, or combined with an additive) prior to blending. Likewise, the high fixed carbon material can be stored prior to blending, or treated (e.g., thermally treated, mechanically treated, or combined with an additive) prior to blending.

In some embodiments, the process comprises recovering the biocarbon composition comprising at least about 1 wt % to at most about 99 wt % of the low fixed carbon material; at least about 1 wt % to at most about 99 wt % of the high fixed carbon material; at least about 0 wt % to at most about 30 wt % moisture; at least about 0 wt % to at most about 15 wt % ash; and at least about 0 wt % to at most about 20 wt % of an additive.

In some embodiments, pyrolyzing the first feedstock comprises pyrolyzing at a first pyrolysis temperature, wherein the first pyrolysis temperature is at least about 250° C. to at most about 1250° C. In some embodiments, pyrolyzing the first feedstock comprises pyrolyzing at a first pyrolysis temperature, wherein the first pyrolysis temperature wherein the first pyrolysis temperature is at least about 300° C. to at most about 700° C. In some embodiments, pyrolyzing the second feedstock comprises pyrolyzing at a second pyrolysis temperature, wherein the second pyrolysis temperature is at least about 250° C. to at most about 1250° C. In some embodiments, pyrolyzing the second feedstock comprises pyrolyzing at a second pyrolysis temperature, wherein the second pyrolysis temperature is at least about 300° C. to at most about 700° C. The second pyrolysis temperature is typically higher than the first pyrolysis temperature, but that is not necessarily the case, at least because the feedstocks for steps (a) and (b) can be different and because other pyrolysis conditions (e.g., time, catalysts, or water concentration) may vary.

In some embodiments, pyrolyzing the first feedstock comprises pyrolyzing for at least about 10 seconds to at most about 24 hours. In some embodiments, pyrolyzing the second feedstock comprises pyrolyzing for at least about 10 seconds to at most about 24 hours. The first pyrolysis time can be higher than the second pyrolysis time, but that is not necessarily the case, at least because the feedstocks for steps (a) and (b) can be different and because other pyrolysis conditions (e.g., temperature, catalysts, or water concentration) may vary.

In some embodiments, the first pyrolysis off-gas is oxidized, thereby generating heat. In some embodiments, the heat is used in the process, thereby recycling the heat. In some embodiments, the second pyrolysis off-gas is oxidized, thereby generating heat. In some embodiments, the heat is used within the process, thereby recycling the heat. In some embodiments, use of the heat within the process can be to provide heat for the pyrolysis reactors.

In some embodiments, the first pyrolysis off-gas is oxidized, thereby generating a reducing gas comprising hydrogen or carbon monoxide. In some embodiments, the second pyrolysis off-gas is oxidized, thereby generating a reducing gas comprising hydrogen or carbon monoxide.

In some embodiments, the process comprises a first milling, before the blending, of the low fixed carbon material, wherein the first milling comprises using a mechanical-treatment apparatus comprising a hammer mill, an extruder, an attrition mill, a disc mill, a pin mill, a ball mill, a cone crusher, a jaw crusher, or a combination thereof. In some embodiments, the process comprises a second milling, before the blending, of the high fixed carbon material, wherein the second milling comprises using a mechanical-treatment apparatus comprising a hammer mill, an extruder, an attrition mill, a disc mill, a pin mill, a ball mill, a cone crusher, a jaw crusher, or a combination thereof. In some embodiments, the blending comprises using a mechanical-treatment apparatus comprising a hammer mill, an extruder, an attrition mill, a disc mill, a pin mill, a ball mill, a cone crusher, a jaw crusher, or a combination thereof.

When the low fixed carbon material and the high fixed carbon material are both milled, they can be milled together in the same unit (during blending), or they can be separately milled in the same type of apparatus or a different type of apparatus.

In some embodiments of the process, the biocarbon composition comprises a homogeneous physical blend of the low fixed carbon material and the high fixed carbon material.

In some embodiments, the low fixed carbon material is uniformly dispersed throughout the biocarbon composition. In some embodiments, the high fixed carbon material is uniformly dispersed throughout the biocarbon composition. In some embodiments, the low fixed carbon material and the high fixed carbon material are uniformly dispersed throughout the biocarbon composition.

In some embodiments, the biocarbon composition comprises a heterogeneous physical blend of the low fixed carbon material and the high fixed carbon material. In some embodiments, the biocarbon composition comprises distinct layers of the low fixed carbon material and the high fixed carbon material. In some embodiments, the biocarbon composition comprises a core and a shell, wherein the core is comprised within the shell, wherein the core comprises the high fixed carbon material, and wherein the shell comprises the low fixed carbon material. In some embodiments, the biocarbon composition comprises a core and a shell, wherein the core is comprised within the shell, wherein the core comprises the low fixed carbon material, and wherein the shell comprises the high fixed carbon material. In some embodiments, the high fixed carbon material is in the form of particulates in a continuous phase of the low fixed carbon material. In some embodiments, the low fixed carbon material is in the form of particulates in a continuous phase of the high fixed carbon material.

In some embodiments of the process, the biocarbon composition comprises at least about 10 wt % to at most about 90 wt % of the low fixed carbon material. In some embodiments, the biocarbon composition comprises at least about 10 wt % to at most about 90 wt % of the high fixed carbon material. In some embodiments, the biocarbon composition comprises a weight ratio of the low fixed carbon material to the high fixed carbon material, and wherein the ratio is at least about 0.1 to at most about 10.

In some embodiments of the process, the biocarbon composition comprises a weight ratio of the low fixed carbon material to the high fixed carbon material, and wherein the ratio is at least about 0.2 to at most about 5. In some embodiments, the biocarbon composition comprises a weight ratio of the low fixed carbon material to the high fixed carbon material, and wherein the ratio is at least about 0.5 to at most about 2. In some embodiments, the biocarbon composition comprises a weight ratio of the low fixed carbon material to the high fixed carbon material, and wherein the ratio is at least about 0.8 to at most about 1.2.

In some embodiments, the first fixed carbon concentration is at least about 20 wt % to at most about 40 wt %. In some embodiments, the first fixed carbon concentration is at least about 25 wt % to at most about 50 wt %. In some embodiments, the first fixed carbon concentration is at least about 30 wt % to at most about 55 wt %. In some embodiments, the second fixed carbon concentration is at least about 80 wt % to at most about 100 wt %. In some embodiments, the second fixed carbon concentration is at least about 70 wt % to at most about 95 wt %. In some embodiments, the second fixed carbon concentration is at least about 60 wt % to at most about 90 wt %. In some embodiments, the unweighted average of the first fixed carbon concentration and the second fixed carbon concentration is at least about 30 wt % to at most about 90 wt %. In some embodiments, the unweighted average of the first fixed carbon concentration and the second fixed carbon concentration is at least about 40 wt % to at most about 80 wt %.

In some embodiments of the process, the biocarbon composition comprises a total fixed carbon concentration of at least about 25 wt % to at most about 95 wt %, on an absolute basis. In some embodiments, the biocarbon composition comprises a total fixed carbon concentration of at least about 35 wt % to at most 85 wt %, on an absolute basis. In some embodiments, the low fixed carbon material comprises at least about 45 wt % to at most about 80 wt % volatile carbon, on an absolute basis. In some embodiments, the high fixed carbon material comprises at least about 0 to at most about 50 wt % volatile carbon, on an absolute basis.

In some embodiments of the process, the biocarbon composition comprises at least about 0.1 wt % to at most about 20 wt % moisture. In some embodiments, the biocarbon composition comprises at least about 0.1 wt % to at most about 10 wt % ash. In some embodiments, the biocarbon composition comprises at least about 0.1 wt % to at most about 10 wt % of an additive. In some embodiments, the biocarbon composition comprises at least about 1 wt % to at most about 15 wt % of an additive. In some embodiments, the biocarbon composition comprises at least about 3 wt % to at most about 18 wt % of an additive.

In some embodiments of the process, the biocarbon composition comprises an additive, and the additive comprises an organic additive. In some embodiments, the additive comprises an inorganic additive. In some embodiments, the additive comprises a renewable material. In some embodiments, the additive comprises a material that is capable of being oxidized or combusted. In some embodiments, the additive comprises a binder.

In some embodiments, the process comprises pelletizing. The pelletizing can be achieved using an extruder, a ring die pellet mill, a flat die pellet mill, a roll compactor, a roll briquetter, a wet agglomeration mill, a dry agglomeration mill, or a combination thereof.

In some embodiments of the process, the biocarbon composition comprises a binder. The binder can comprise starch, thermoplastic starch, crosslinked starch, starch polymers, cellulose, cellulose ethers, hemicellulose, methylcellulose, chitosan, lignin, lactose, sucrose, dextrose, maltodextrin, banana flour, wheat flour, wheat starch, soy flour, corn flour, wood flour, coal tars, coal fines, met coke, asphalt, coal-tar pitch, petroleum pitch, bitumen, pyrolysis tars, gilsonite, bentonite clay, borax, limestone, lime, waxes, vegetable waxes, baking soda, baking powder, sodium hydroxide, potassium hydroxide, iron ore concentrate, silica fume, gypsum, Portland cement, guar gum, xanthan gum, polyvidones, polyacrylamides, polylactides, phenol-formaldehyde resins, vegetable resins, recycled shingles, recycled tires, a derivative thereof, or a combination thereof.

In some embodiments of the process, the biocarbon composition comprises a binder, and wherein the binder comprises starch, thermoplastic starch, crosslinked starch, starch polymers, a derivative thereof, or a combination thereof.

In some embodiments of the process, the biocarbon composition comprises a binder, and the binder comprises a thermoplastic starch. In some embodiments, the thermoplastic starch is crosslinked. The thermoplastic starch can be a reaction product of starch and a polyol. The polyol can be ethylene glycol, propylene glycol, glycerol, butanediols, butanetriols, erythritol, xylitol, sorbitol, or a combination thereof. The thermoplastic starch can be formed from a reaction that is catalyzed by an acid. The acid can comprise formic acid, acetic acid, lactic acid, citric acid, oxalic acid, uronic acids, glucuronic acids, or a combination thereof. Alternatively, or additionally, the thermoplastic starch can be formed from a reaction that is catalyzed by a base.

In some embodiments of the process, the additive reduces the reactivity of the biocarbon composition compared to an otherwise-equivalent biocarbon composition without the additive. In some embodiments, the reactivity is thermal reactivity. For example, the biocarbon composition can comprise a lower self-heating compared to the otherwise-equivalent biocarbon composition without the additive. In some embodiments, the reactivity is chemical reactivity with oxygen. In some embodiments, the reactivity is chemical reactivity with water. In some embodiments, the reactivity is chemical reactivity with hydrogen. In some embodiments, the reactivity is chemical reactivity with carbon monoxide. In some embodiments, the reactivity is chemical reactivity with a metal. In some embodiments, the metal comprises iron.

In some embodiments, the process comprises blending an additive with the intermediate material, thereby introducing the additive into a pore of the low fixed carbon material. In some embodiments, the process comprises blending an additive with the intermediate material, thereby introducing the additive into a pore of the high fixed carbon material. In some embodiments, the process comprises blending an additive with the intermediate material, thereby introducing the additive into a pore of the low fixed carbon material and introducing the additive into a pore of the high fixed carbon material.

In some embodiments, the process comprises blending an additive with the intermediate material, thereby disposing the additive on an outer surface of the biocarbon composition. composition (e.g., an outer surface of pellets or powder particles). The process may include, for example, spray-coating of additives onto the biocarbon composition.

In some embodiments, the process comprises forming the biocarbon composition into a powder.

In some embodiments, the process comprises pelletizing the biocarbon composition.

In some embodiments, the process comprises blending an additive with the intermediate material, wherein the additive comprises a binder. In some embodiments, the binder comprises the low fixed carbon material. In some embodiments, the process comprises blending an additive with the intermediate material, wherein the low fixed carbon material comprises the additive or the high fixed carbon material comprises the additive.

In some embodiments of the process, the biocarbon composition is characterized as non-self-heating when subjected to a self-heating test according to *Manual of Tests and Criteria*, Seventh revised edition 2019, United Nations, Page 375, 33.4.6 Test N.4: "Test method for self-heating substances". The energy content of the biocarbon composition can be changed by adjusting the first fixed carbon concentration, the second fixed carbon concentration, or the type or concentration of the additive. In some embodiments, the first fixed carbon concentration, the second fixed carbon concentration, or the additive type or concentration, is selected to optimize energy content associated with the biocarbon composition.

In some embodiments of the process, the process comprises selecting the first fixed carbon concentration, the second fixed carbon concentration, or the type or concentration of the additive, thereby optimizing the bulk density of the biocarbon.

In some embodiments of the process, the process comprises selecting the first fixed carbon concentration, the second fixed carbon concentration, or the type or concentration of the additive, thereby optimizing the hydrophobicity of the biocarbon.

In some embodiments of the process, the process comprises selecting the first fixed carbon concentration, the second fixed carbon concentration, or the type or concentration of the additive, thereby optimizing the pore sizes of the biocarbon.

In some embodiments of the process, the process comprises selecting the first fixed carbon concentration, the second fixed carbon concentration, or the type or concentration of the additive, thereby optimizing the pore size ratios of the biocarbon.

In some embodiments of the process, the process comprises selecting the first fixed carbon concentration, the second fixed carbon concentration, or the type or concentration of the additive, thereby optimizing the surface area of the biocarbon.

In some embodiments of the process, the process comprises selecting the first fixed carbon concentration, the second fixed carbon concentration, or the type or concentration of the additive, thereby optimizing the reactivity of the biocarbon.

In some embodiments of the process, the process comprises selecting the first fixed carbon concentration, the second fixed carbon concentration, or the type or concentration of the additive, thereby optimizing the ion exchange capacity (IEC) of the biocarbon.

In some embodiments of the process, the process comprises selecting the first fixed carbon concentration, the second fixed carbon concentration, or the type or concentration of the additive, thereby optimizing the Hardgrove Grindability Index of the biocarbon.

In some embodiments of the process, the process comprises selecting the first fixed carbon concentration, the second fixed carbon concentration, or the type or concentration of the additive, thereby optimizing the Pellet Durability Index of the biocarbon.

In some embodiments of the process, the biocarbon composition comprises a total carbon, wherein at least 50% of the total carbon consists essentially of biogenic carbon as determined from a measurement of the $^{14}C/^{12}C$ isotopic ratio of the total carbon. In some embodiments of the process, the biocarbon composition comprises a total carbon, wherein at least 90% of the total carbon consists essentially of biogenic carbon as determined from a measurement of the $^{14}C/^{12}C$ isotopic ratio of the total carbon. In some embodiments of the process, the biocarbon composition comprises a total carbon, wherein the total carbon consists essentially of biogenic carbon as determined from a measurement of the $^{14}C/^{12}C$ isotopic ratio of the total carbon.

It is important to note that while renewable biocarbon compositions are preferred, the principles of the invention can be applied to non-renewable materials.

The processes of the present disclosure can comprise: pyrolyzing a first feedstock, wherein the first feedstock comprises biomass, thereby generating a low fixed carbon material and a first pyrolysis off-gas, wherein the low fixed carbon material comprises a first fixed carbon concentration of at least about 20 wt % to at most about 55 wt % fixed carbon on an absolute basis; providing a high fixed carbon material, wherein the high fixed carbon material comprises a second fixed carbon concentration of at least about 50 wt % to at most about 100 wt % fixed carbon on an absolute basis, and wherein the second fixed carbon concentration is greater than the first fixed carbon concentration; blending the low fixed carbon material with the high fixed carbon material, thereby generating an intermediate material; optionally, blending one or more additives into the intermediate material; optionally, drying the intermediate material;

and recovering a biocarbon composition comprising the intermediate material or a thermally treated derivative thereof.

In some embodiments of the process, the high fixed carbon material comprises pyrolyzed biomass, coal, pyrolyzed coal, coke, petroleum coke, metallurgical coke, activated carbon, carbon black, graphite, graphene, pyrolyzed polymers, or a combination thereof.

The processes of the present disclosure can comprise: providing a low fixed carbon material, wherein the low fixed carbon material comprises a first fixed carbon concentration of at least about 10 wt % to at most about 55 wt % fixed carbon on an absolute basis; pyrolyzing a feedstock, wherein the feedstock comprises biomass, thereby generating a high fixed carbon material and a pyrolysis off-gas, wherein the high fixed carbon material comprises a second fixed carbon concentration of at least about 50 wt % to at most about 100 wt % fixed carbon on an absolute basis, and wherein the second fixed carbon concentration is greater than the first fixed carbon concentration; blending the low fixed carbon material with the high fixed carbon material, thereby generating an intermediate material; optionally, blending an additive with the intermediate material; optionally, drying the intermediate material; and recovering a biocarbon composition comprising the intermediate material or a thermally treated derivative thereof.

In some embodiments of the process, the low fixed carbon material comprises unpyrolyzed biomass, pyrolyzed biomass, unpyrolyzed polymers, pyrolyzed polymers, or a combination thereof.

The processes of the present disclosure can comprise: providing a low fixed carbon material, wherein the low fixed carbon material comprises a first fixed carbon concentration of at least about 10 wt % to at most about 55 wt % fixed carbon on an absolute basis; providing a high fixed carbon material, wherein the high fixed carbon material comprises a second fixed carbon concentration of at least about 50 wt % to at most about 100 wt % fixed carbon on an absolute basis, and wherein the second fixed carbon concentration is greater than the first fixed carbon concentration; blending the low fixed carbon material with the high fixed carbon material, thereby generating an intermediate material; optionally, blending an additive with the intermediate material; optionally, drying the intermediate material; and recovering a biocarbon composition comprising the intermediate material or a thermally treated derivative thereof.

In some embodiments of the process, the low fixed carbon material comprises unpyrolyzed biomass, pyrolyzed biomass, unpyrolyzed polymers, pyrolyzed polymers, or a combination thereof. In some embodiments of the process, the high fixed carbon material comprises pyrolyzed biomass, coal, pyrolyzed coal, coke, petroleum coke, metallurgical coke, activated carbon, carbon black, graphite, graphene, pyrolyzed polymers, or a combination thereof.

FIG. 1 is a simplified block-flow diagram of a process for producing a biocarbon composition having a low-fixed-carbon material blended with a high-fixed-carbon material, optionally with additives (such as binders to make pellets), in some embodiments. Dotted boxes and lines denote optional units and streams, respectively. In FIG. 1, biomass is fed to a first pyrolysis reactor operated at effective pyrolysis conditions that are described in this specification. The first pyrolysis reactor is configured to produce a low-fixed-carbon material, which is optionally milled to reduce particle size. Biomass is also fed to a second pyrolysis reactor operated at effective pyrolysis conditions that are described in this specification. The biomass fed to the second pyrolysis reactor can be the same as or different than the biomass fed to the first pyrolysis reactor. The second pyrolysis reactor is configured to produce a high-fixed-carbon material, which is optionally milled to reduce particle size. The milling of the low-fixed-carbon material or the high-fixed-carbon material, when employed, can be prior to combining the streams together, simultaneously with combining the streams together, or following the stream combination. The low-fixed-carbon material and the high-fixed-carbon material are combined (e.g., blended or co-milled) to generate a LCF-HFC combined reagent denoted in FIG. 1. The LCF-HFC combined reagent is optionally conveyed to a pelletizing unit or another unit into which an additive is fed. Alternatively, or additionally, the LCF-HFC combined reagent is fed to a drying unit operated to remove water from the LCF-HFC combined reagent. The final product is biocarbon pellets or powder.

FIG. 2 is a simplified block-flow diagram of a process for producing a biocarbon composition having a low-fixed-carbon material blended with a high-fixed-carbon material, in which the low-fixed-carbon material functions as a pellet binder, in some embodiments. Dotted boxes and lines denote optional units and streams, respectively. In FIG. 2, biomass is fed to a first pyrolysis reactor operated at effective pyrolysis conditions that are described in this specification. The first pyrolysis reactor is configured to produce a low-fixed-carbon material, which is optionally milled to reduce particle size. Biomass is also fed to a second pyrolysis reactor operated at effective pyrolysis conditions that are described in this specification. The biomass fed to the second pyrolysis reactor can be the same as or different than the biomass fed to the first pyrolysis reactor. The second pyrolysis reactor is configured to produce a high-fixed-carbon material, which is optionally milled to reduce particle size. The milling of the low-fixed-carbon material or the high-fixed-carbon material, when employed, can be prior to combining the streams together, simultaneously with combining the streams together, or following the stream combination. The low-fixed-carbon material and the high-fixed-carbon material are both fed to a pelletizing unit. In the pelletizing unit, pellets are formed using the low-fixed-carbon material as a binder. A separate binder material can also be fed to the pelletizing unit, in other embodiments. Optionally, the pellets are fed to a drying unit operated to remove water from the pellets. The final product is biocarbon pellets with the low-fixed-carbon material functioning as a pellet binder.

Following one or more processes as disclosed herein, either for quality-control or as evidence of practice of the invention, for example, a variety of potential techniques can be utilized to demonstrate that a given biocarbon composition contains both a low fixed carbon material and a distinct high fixed carbon material, rather than a biocarbon composition that contains a single material having a uniform fixed carbon concentration.

In one technique to demonstrate that a given biocarbon composition contains both a low fixed carbon material and a distinct high fixed carbon material, thermogravimetric analysis (TGA) of combustion of a biocarbon composition test sample is performed. In some embodiments, the resulting TGA thermal curve has two peaks characteristic of distinct mass-loss events that correlate with the low fixed carbon material and the high fixed carbon material. This can be compared against a control sample of a biocarbon composition that contains a single material having a uniform fixed carbon concentration, to show a TGA thermal curve with a single peak characteristic of one mass-loss event for the material. In similar embodiments, the TGA thermal curve for the test sample has three or more peaks, while the TGA thermal curve for the control sample has at least one less peak than for the test sample.

Another technique to demonstrate that a given biocarbon composition contains both a low fixed carbon material and a distinct high fixed carbon material is a particle-size analysis. This is a viable approach when the particle sizes associated with the low fixed carbon material and the high fixed carbon material are different, or when the particle-size distributions associated with the low fixed carbon material and the high fixed carbon material are different. For example, the high fixed carbon material tends to have larger particles compared to the low fixed carbon material. In some embodiments, a bimodal particle-size distribution arising from the presence of both a low fixed carbon material and a high fixed carbon material, in contrast to a control sample that has a unimodal particle-size distribution characteristic of a uniform material. In similar embodiments, the test sample may have a particle-size distribution with at least one more mode than the control-sample particle-size distribution. It is possible, for example, for each of the low fixed carbon material and the high fixed carbon material to have bimodal particle-size distributions (with peaks centered at different sizes) and the control sample to also have a bimodal particle-size distribution, depending on how the control sample was produced.

Particle sizes can be measured by a variety of techniques, including dynamic light scattering, laser diffraction, image analysis, or sieve separation, for example. Dynamic light scattering is a non-invasive, well-established technique for measuring the size and size distribution of particles typically in the submicron region, and with the latest technology down to 1 nanometer. Laser diffraction is a widely used particle-sizing technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images. Finally, sieving is a conventional technique of separating particles by size.

Imaging techniques may alternatively, or additionally, be utilized to demonstrate that a given biocarbon composition contains both a low fixed carbon material and a distinct high fixed carbon material. Imaging techniques include, but are not limited to, optical microscopy; dark-field microscopy; scanning electron microscopy (SEM); transmission electron microscopy (TEM); and X-ray tomography (XRT), for example. An imaging technique can be used to demonstrate distinct materials in a blend, rather than a homogeneous material, for example. Or, an imaging technique can be used to select subsamples for further analysis. Further analysis can be compositional analysis to show three-dimensional variations in fixed carbon content. Further analysis can be property analysis to show three-dimensional variations in chemical or physical properties, such as density, particle size, or reactivity, for example.

Spectroscopy techniques may alternatively, or additionally, be utilized to demonstrate that a given biocarbon composition contains both a low fixed carbon material and a distinct high fixed carbon material. Spectroscopy techniques include, but are not limited to, energy dispersive X-ray spectroscopy (EDS), X-ray fluorescence (XRF), infrared (IR) spectroscopy; and nuclear magnetic resonance (NMR) spectroscopy, for example.

Some embodiments are predicated on optimized pyrolysis of biomass to generate a carbon substrate, mechanical size reduction of the carbon substrate, and use of a binder to agglomerate the carbon substrate to form biocarbon pellets. The carbon substrate can be or contain a blend of low fixed carbon material and high fixed carbon material.

Hardgrove Grindability Index ("HGI") is a measure of the grindability of a material, such as biomass or coal. The HGI parameter for coal is important in power applications, such as pulverized coal boilers where coal is pulverized and burned in suspension, and in iron making, such as in pulverized coal injection where pulverized coal is injected through a lance into a blast furnace where pulverized coal can displace coke to reduce iron ores to metallic iron.

In some embodiments, varying the proportions and compositions of the low fixed carbon material and high fixed carbon material enables optimization of HGI. The incorporation of binders or other additives also may enable HGI adjustability.

The ability to adjust the HGI of biocarbon pellets is beneficial because downstream applications (e.g., replacement of coal in boilers) that utilize biocarbon pellets have varying HGI requirements. HGI adjustability addresses to well-known problems industrially: the difficulty to grind raw biomass, and the difficulty to grind pellets. Furthermore, because there are so many downstream uses of biocarbon pellets, each having its own requirements, it is highly advantageous to be able to adjust the grindability of the pellets. It is desirable to be able to adjust HGI to suit a particular application, such as combustion in boilers, metalmaking, or gasification to make syngas.

For many applications, pellets are preferred over powders (isolated biomass particles) due to advantages in shipping, storage, safety. Ultimately, the pellets may need to be converted back to powders, or at least smaller objects, at some point. Grindability of the pellets is thus often an important parameter that impacts operating costs and capital costs.

In some cases, pellets need to be ground or pulverized to a powder, such as when the boiler or gasifier utilizes a fluidized bed or a suspension of carbon particles. Another example is pulverized carbon injection into a blast furnace, for reducing metal ores to metals. In these cases, high grindability of the pellets is desired, but not too high such that the pellets fall apart during shipping and handling. In other cases, it is desired to feed pellets themselves to a process, such as a metal-making process. In these cases, lower grindability can be desirable since some pellet strength can be necessary to support a material bed in the reactor. Different technologies have different pellet grindability requirements.

The Hardgrove Grindability Index of the biocarbon pellet can be at least 30, at least 40, at least 50, at least 60, at least 70, at least 80, at least 90, or at least 100. In some embodiments, the Hardgrove Grindability Index is from about 30 to about 50 or from about 50 to about 70. ASTM-Standard D 409/D 409M for "Standard Test Method for Grindability of Coal by the Hardgrove-Machine Method" is hereby incorporated by reference herein in its entirety. Unless otherwise indicated, all references in this disclosure to Hardgrove Grindability Index or HGI are in reference to ASTM-Standard D 409/D 409M.

In various embodiments, the Hardgrove Grindability Index is about, at least about, or at most about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, including all intervening ranges (e.g., 25-40, 30-60, etc.).

In some embodiments, the biocarbon pellet comprises a Pellet Durability Index of at least 80%, at least 85%, at least 90%, at least 95%, or at least 99%. In some embodiments, the biocarbon pellet comprises a Pellet Durability Index less than 99%, less than 95%, less than 90%, less than 85%, or less than 80%. Unless otherwise indicated, all references in this disclosure to Pellet Durability Index are in reference to ISO 17831-1:2015 "Solid biofuels—Determination of mechanical durability of pellets and briquettes—Part 1: Pellets", which is hereby incorporated by reference herein in its entirety.

In some embodiments of the invention, the biocarbon pellets are utilized as a starting material to make smaller objects, which may also be referred to as biocarbon pellets since "pellet" does not limit the geometry. For example, initial biocarbon pellets that are 10 mm in average pellet diameter can be fabricated. Then, these initial biocarbon pellets can be crushed using various mechanical means (e.g., using a hammer mill). The crushed pellets can be separated according to size, such as by screening. In this manner, smaller biocarbon pellets can be produced, with an average pellet diameter of about, at least about, or at most about 50, 100, 150, 200, 300, 400, 500, 600, 700, 800, 900, 1000, 1500, 2000, 3000, 4000, or 5000 microns, for example. The average pellet diameter of the smaller biocarbon pellets can be larger than the average particle diameter of the initial carbon-containing particles that were used to make the pellets with the binder.

When the biocarbon pellets are crushed to generate smaller biocarbon pellets, a step of crushing (and optionally screening) can be integrated with another process step, including potentially at a site of industrial use. In some embodiments, generating smaller biocarbon pellets comprises utilizing a crushing apparatus. In some embodiments, the crushing apparatus comprises a hammer mill, an attrition mill, a disc mill, a pin mill, a ball mill, a cone crusher, a jaw crusher, a rock crusher, or a combination thereof.

In various process embodiments, the Hardgrove Grindability Index is at least 40, at least 50, at least 60, at least 70, at least 80, at least 90, or at least 100. For example, the Hardgrove Grindability Index can be from about 30 to about 50 or from about 50 to about 70.

In various processes, the process conditions are selected and optimized to generate a final biocarbon pellet with a Hardgrove Grindability Index of about, at least about, or at most about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, including all intervening ranges (e.g., 30-60, 33-47, etc.).

In some embodiments, the biocarbon pellet comprises a Pellet Durability Index of at least about 80%, at least about 90%, or at least about 95%.

In some embodiments, the process comprises pre-selecting a Hardgrove Grindability Index, adjusting process conditions based on the pre-selected Hardgrove Grindability Index, and achieving within ±20% of the pre-selected Hardgrove Grindability Index for the biocarbon pellets, wherein the adjusting process conditions comprises adjusting one or more of pyrolysis temperature, pyrolysis time, mechanical-treatment conditions, pelletizing conditions, binder type, binder concentration, binding conditions, and drying. The process of certain embodiments may achieve within ±10%, or within ±5%, of the pre-selected Hardgrove Grindability Index for the biocarbon pellets.

The size and geometry of the biocarbon pellet may vary. By "pellet" as used herein, it is meant an agglomerated object rather than a loose powder. The pellet geometry is not limited to spherical or approximately spherical. Also, in this disclosure, "pellet" is synonymous with "briquette". The pellet geometry can be spherical (round or ball shape), cube (square), octagon, hexagon, honeycomb/beehive shape, oval shape, egg shape, column shape, bar shape, pillow shape, random shape, or a combination thereof. For convenience of disclosure, the term "pellet" will generally be used for any object containing a powder agglomerated with a binder. It is also reiterated that this invention is by no means limited to biocarbon compositions in the form of pellets.

The biocarbon pellets can be characterized by an average pellet diameter, which is the true diameter in the case of a sphere, or an equivalent diameter in the case of any other 3D geometry. The equivalent diameter of a non-spherical pellet is the diameter of a sphere of equivalent volume to the actual pellet. In some embodiments, the average pellet diameter can be about, or at least about, 1, 2, 3, 4, 5, 6, 7, 8, 9, 10, 11, 12, 13, 14, 15, 20, or 25 millimeters, including all intervening ranges. In some embodiments, the average pellet diameter can be about, or at least about, 500, 1000, 1500, 2000, 2500, 3000, 3500, 4000, 4500, 5000, 5500, 6000, or 6500 microns, including all intervening ranges.

In some embodiments, there is a plurality of biocarbon pellets that is relatively uniform in size, such as a standard deviation of less than ±100%, less than ±50%, less than ±25%, less than ±10%, or less than ±5% of the average pellet diameter. In other embodiments, there is a wide range of sizes of biocarbon pellets, as this can be advantageous in some applications.

Biocarbon pellets may contain moisture. The moisture present in a biocarbon pellet can be water that is chemically bound to carbon or binder, water that is physically bound (absorbed or adsorbed) to carbon or binder, free water present in an aqueous phase that is not chemically or physically bound to carbon or binder, or a combination thereof. When moisture is desired during the binding process, it is preferred that such moisture is chemically or physically bound to carbon and/or binder, rather than being free water.

Various moisture levels can be present. For example, the biocarbon pellet may comprise from about 1 wt % to about 30 wt % (e.g., 32 wt %) moisture, such as from about 5 wt % to about 15 wt % moisture, from about 2 wt % to about 10 wt % moisture, or from about 0.1 wt % to about 1 wt % moisture. In some embodiments, the biocarbon pellet contains about 4-8 wt % moisture. In various embodiments, the biocarbon pellet comprises about, at least about, or at most about 0.5, 1, 1.5, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, or 35 wt % moisture, including all intervening ranges. Moisture levels of the biocarbon pellets can be optimized to vary the densification within the pellets.

For some market applications, such as in agriculture, higher moisture levels are desirable for dust control or other reasons. For other market applications, such as metallurgy, lower moisture levels can be desirable (e.g., 1 wt % moisture or even less). Note that although water is present during the process of making biocarbon pellets, those pellets are then optionally dried which means the final biocarbon pellets do not necessarily contain moisture.

In some biocarbon pellets, the biocarbon pellet comprises from about 2 wt % to about 25 wt % of the binder, from about 5 wt % to about 20 wt % of the binder, or from about 1 wt % to about 5 wt % of the binder. In various embodiments, the biocarbon pellet comprises about, at least about, or at most about 0.5, 1, 1.5, 2, 3, 4, 5, 6, 7, 8, 9, 10, 11, 12, 13, 14, 15, 20, 25, or 30 wt % binder, including all intervening ranges. In some embodiments, there is an inverse relationship between moisture content and binder concentration.

The binder can be pore-filling within the biogenic reagent of the biocarbon pellets. Alternatively, or additionally, the binder can be disposed on the surfaces of the biocarbon pellets.

The binder can be an organic binder or an inorganic binder. In some embodiments, the binder is or includes a renewable material. In some embodiments, the binder is or includes a biodegradable material. In some embodiments, the binder is capable of being partially oxidized and/or combusted.

In some embodiments, the binder comprises starch, crosslinked starch, starch polymers, cellulose, cellulose ethers, hemicellulose, methylcellulose, chitosan, lignin, lactose, sucrose, dextrose, maltodextrin, banana flour, wheat flour, wheat starch, soy flour, corn flour, wood flour, coal tars, coal fines, met coke, asphalt, coal-tar pitch, petroleum pitch, bitumen, pyrolysis tars, gilsonite, bentonite clay, borax, limestone, lime, waxes, vegetable waxes, baking soda, baking powder, sodium hydroxide, potassium hydroxide, iron ore concentrate, silica fume, gypsum, Portland cement, guar gum, xanthan gum, polyvidones, polyacrylamides, polylactides, phenol-formaldehyde resins, vegetable resins, recycled shingles, recycled tires, or a derivative thereof, or a combination thereof. In some embodiments, the binder comprises a grindable plasticizer.

In some embodiments, the binder comprises starch, thermoplastic starch, crosslinked starch, starch-based polymers (e.g., polymers based on amylose and amylopectin), or a derivative thereof, or a combination thereof. In some embodiments, starch comprises non-ionic starch, anionic starch, cationic starch, or zwitterionic starch.

Starch is one of the most abundant biopolymers. It is completely biodegradable, inexpensive, renewable, and can be easily chemically modified. The cyclic structure of the starch molecules together with strong hydrogen bonding gives starch a rigid structure and leads to highly ordered crystalline and granular regions. Starch in its granular state is generally unsuitable for thermoplastic processing. To obtain thermoplastic starch, the semi-crystalline starch granules can be broken down by thermal and mechanical forces. Since the melting point of pure starch is considerably higher than its decomposition temperature, plasticizers such as water and/or glycols can be added. The natural crystallinity may then be disrupted by vigorous mixing (shearing) at elevated temperatures which yields thermoplastic starch. Starch can be plasticized (destructurized) by relatively low levels of molecules that are capable of hydrogen bonding with the starch hydroxyl groups, such as water, glycerol, or sorbitol.

Thermoplastic starch can be chemically modified and/or blended with other biopolymers to produce a tougher and more ductile and resilient bioplastic. For example, starch can be blended with natural and synthetic (biodegradable) polyesters such as polylactic acid, polycaprolactone, or polyhydroxybutyrate. To improve the compatibility of the starch/polyester blends, suitable compatibilizers such as poly (ethylene-co-vinyl alcohol) and/or polyvinyl alcohol can be added. The hydrophilic hydroxyl groups (—OH) of starch can be replaced with hydrophobic (reactive) groups, such as by esterification or etherification.

In some embodiments, a starch-containing binder is or includes a crosslinked starch. Various methods for crosslinking starch are known in the art. A starch material can be crosslinked under acidic or alkaline conditions after dissolving or dispersing it in an aqueous medium, for example. Aldehydes (e.g., glutaraldehyde or formaldehyde) can be used to crosslink starch.

One example of a crosslinked starch is a reaction product of starch and glycerol or another polyol, such as (but not limited to) ethylene glycol, propylene glycol, glycerol, butanediols, butanetriols, erythritol, xylitol, sorbitol, or combinations thereof. The reaction product can be formed from a crosslinking reaction that is catalyzed by an acid, such as (but not limited to) formic acid, acetic acid, lactic acid, citric acid, oxalic acid, uronic acids, glucuronic acids, or combinations thereof. Inorganic acids, such as sulfuric acid, may also be utilized to catalyze the crosslinking reaction. In some embodiments, the thermoplasticizing and/or crosslinking reaction product can be formed from a crosslinking reaction that is catalyzed instead by an base, such as (but not limited to) ammonia or sodium borate.

In some embodiments, a binder is designed to be a water-resistant binder. For example, in the case of starch, hydrophilic groups can be replaced by hydrophobic groups that better resist water.

In some embodiments, the binder serves other purposes, such as (but not limited to) water retention in the biocarbon pellet, a food source for microorganisms, etc.

In some embodiments, the binder reduces the reactivity of the biocarbon pellet compared to an otherwise-equivalent biocarbon pellet without the binder. Reactivity may refer to thermal reactivity or chemical reactivity (or both).

In the case of thermal reactivity, the biocarbon pellet may have lower self-heating compared to the otherwise-equivalent biocarbon pellet without the binder. "Self-heating" refers to biocarbon pellet undergoing spontaneous exothermic reactions, in absence of any external ignition, at relatively low temperatures and in an oxidative atmosphere, to cause the internal temperature of a biocarbon pellet to rise.

Chemical reactivity can be reactivity with oxygen, water, hydrogen, carbon monoxide, metals (e.g., iron), or combinations thereof. Chemical reactivity can be associated with reactions to CO, $CO_2$, $H_2O$, pyrolysis oils, and heat, for example.

Optionally, biocarbon pellets comprise one or more additives (that are not necessarily binders), such as inorganic bentonite clay, limestone, starch, cellulose, lignin, or acrylamides. When lignin is used as a binder or other additive, the lignin can be obtained from the same biomass feedstock as used in the pyrolysis process. For example, a starting biomass feedstock can be subjected to a lignin-extraction step, removing a quantity of lignin for use as a binder or additive. As explained earlier, any additive can be contained within the low fixed carbon material, the high fixed carbon material, or both of these.

Other possible additives include fluxing agents, such as inorganic chlorides, inorganic fluorides, or lime. In some embodiments, the additive comprises an acid, a base, or a salt thereof. In some embodiments, the additive comprises a metal, a metal oxide, a metal hydroxide, a metal halide, or a combination thereof. In some embodiments, the additive comprises sodium hydroxide, potassium hydroxide, magnesium oxide, hydrogen bromide, hydrogen chloride, sodium silicate, potassium permanganate, magnesium, manganese, aluminum, nickel, chromium, silicon, boron, cerium, molybdenum, phosphorus, tungsten, vanadium, iron halide, iron chloride, iron bromide, dolomite, dolomitic lime, fluorite, fluorospar, bentonite, calcium oxide, lime, or a combination thereof. The additive can be added before, during, or after any one or more steps of the process, including into the feedstock itself at any time, before or after it is harvested.

Biocarbon pellets disclosed herein have a wide variety of downstream uses. The biocarbon pellets can be stored, sold, shipped, and converted to other products. The biocarbon pellets can be pulverized for use in a boiler, to combust the carbon and generate electrical energy and/or heat. The biocarbon pellets can be pulverized, crushed, or milled for feeding into a furnace, such as a blast furnace in metal making. The biocarbon pellets can be fed directly into a furnace, such as a Tecnored furnace in metal making. The biocarbon pellets can be pulverized, crushed, or milled for feeding into a gasifier for purposes of making syngas from the biocarbon pellets.

In many embodiments, the biocarbon pellets are fed to a furnace, either directly or following a step to pulverize, crush, mill, or otherwise reduce particle size. A furnace can be a blast furnace, a top-gas recycling blast furnace, a shaft furnace, a reverberatory furnace (also known as an air furnace), a crucible furnace, a muffling furnace, a retort furnace, a flash furnace, a Tecnored furnace, an Ausmelt furnace, an ISASMELT furnace, a puddling furnace, a Bogie hearth furnace, a continuous chain furnace, a pusher furnace, a rotary hearth furnace, a walking beam furnace, an electric arc furnace, an induction furnace, a basic oxygen furnace, a puddling furnace, a Bessemer furnace, a direct-reduced-metal furnace, or a combination or derivative thereof.

Note that regardless of the Hardgrove Grindability Index of the biocarbon pellets, they are not necessarily later subjected to a grinding process. For example, the biocarbon pellets can be used directly in an agricultural application. As another example, the biocarbon pellets can be directly incorporated into an engineered structure, such as a landscaping wall. At the end-of-life of a structure containing biocarbon pellets, the pellets may then be ground, combusted, gasified, or otherwise reused or recycled.

Pyrolysis Processes and Systems

Processes and systems suitable for pyrolyzing a biomass feedstock to generate a low fixed carbon material and/or a high fixed carbon material will now be further described in detail. References herein to "biocarbon reagent" will be understood, in various instances, as references to (a) a low fixed carbon material in some instances or (b) a high fixed carbon material or (c) a biocarbon composition containing a blend of low fixed carbon material and high fixed carbon material, depending on process conditions and product characteristics. Likewise, descriptions of a pyrolysis reactor (or reaction) will be understood as references to a reactor (or reaction) specifically for producing a low fixed carbon material in some instances and to a reactor (or reaction) specifically for producing a high fixed carbon material in some instances. Descriptions of uses (commercial applications) of biocarbon reagents will typically be in reference to a biocarbon composition containing a blend of low fixed carbon material and high fixed carbon material, unless otherwise stated.

"Pyrolysis" and "pyrolyze" generally refer to thermal decomposition of a carbonaceous material. In pyrolysis, less oxygen is present than is required for complete combustion of the material, such as less than 10%, 5%, 1%, 0.5%, 0.1%, or 0.01% of the oxygen ($O_2$ molar basis) that is required for complete combustion. In some embodiments, pyrolysis is performed in the absence of oxygen.

Exemplary changes that may occur during pyrolysis include any of the following: (i) heat transfer from a heat source increases the temperature inside the feedstock; (ii) the initiation of primary pyrolysis reactions at this higher temperature releases volatiles and forms a char; (iii) the flow of hot volatiles toward cooler solids results in heat transfer between hot volatiles and cooler unpyrolyzed feedstock; (iv) condensation of some of the volatiles in the cooler parts of the feedstock, followed by secondary reactions, can produce tar; (v) autocatalytic secondary pyrolysis reactions proceed while primary pyrolytic reactions simultaneously occur in competition; and (vi) further thermal decomposition, reforming, water-gas shift reactions, free-radical recombination, and/or dehydrations can also occur, which are a function of the residence time, temperature, and pressure profile.

Pyrolysis can at least partially dehydrate a starting feedstock (e.g., lignocellulosic biomass). In various embodiments, pyrolysis removes greater than about 50%, 75%, 90%, 95%, 99%, or more of the water from the starting feedstock.

In some embodiments, a starting biomass feedstock comprises softwood chips, hardwood chips, timber harvesting residues, tree branches, tree stumps, leaves, bark, sawdust, corn, corn stover, wheat, wheat straw, rice, rice straw, sugarcane, sugarcane bagasse, sugarcane straw, energy cane, sugar beets, sugar beet pulp, sunflowers, sorghum, canola, algae, miscanthus, alfalfa, switchgrass, fruits, fruit shells, fruit stalks, fruit peels, fruit pits, vegetables, vegetable shells, vegetable stalks, vegetable peels, vegetable pits, grape pumice, almond shells, pecan shells, coconut shells, coffee grounds, food waste, commercial waste, grass pellets, hay pellets, wood pellets, cardboard, paper, paper pulp, paper packaging, paper trimmings, food packaging, construction and/or demolition waste, lignin, animal manure, municipal solid waste, municipal sewage, or a combination thereof. A biomass feedstock comprises at least carbon, hydrogen, and oxygen.

In some embodiments, the biogenic reagent comprises at least about 50 wt %, at least about 75 wt %, or at least about 90 wt % total carbon. In some embodiments, the biogenic reagent comprises about 20, 25, 30, 35, 40, 45, 50, 55, 60, 65, 70, 75, 80, 85, 90, 95, or 99 wt % carbon, including intervening values. Total carbon is fixed carbon plus non-fixed carbon that is present in volatile matter. In some embodiments, component weight percentages are on an absolute basis, which is assumed unless stated otherwise. In other embodiments, component weight percentages are on a moisture-free and ash-free basis. Compositions of low fixed carbon materials and high fixed carbon materials have been discussed in detail above.

The pyrolysis conditions can be varied widely, depending on the desired compositions for the biogenic reagent and pyrolysis off-gas, the starting feedstock, the reactor configuration, and other factors.

In some embodiments, multiple reactor zones are designed and operated in a way that optimizes carbon yield and product quality from pyrolysis, while maintaining flexibility and adjustability for feedstock variations and product requirements.

In some non-limiting embodiments, the temperatures and residence times can be selected to achieve relatively slow pyrolysis chemistry. The benefit is potentially the substantial preservation of cell walls contained in the biomass structure, which means the final product can retain some, most, or all of the shape and strength of the starting biomass. In order to maximize this potential benefit, it is preferred to utilize apparatus that does not mechanically destroy the cell walls or otherwise convert the biomass particles into small fines. Preferred reactor configurations are discussed following the process description below.

Additionally, if the feedstock is a milled or sized feedstock, such as wood chips or pellets, it can be desirable for the feedstock to be carefully milled or sized. Careful initial treatment will tend to preserve the strength and cell-wall integrity that is present in the native feedstock source (e.g., trees). This can also be important when the final product should retain some, most, or all of the shape and strength of the starting biomass.

In some embodiments, a first zone of a pyrolysis reactor is configured for feeding biomass (or another carbon-containing feedstock) in a manner that does not "shock" the biomass, which would rupture the cell walls and initiate fast decomposition of the solid phase into vapors and gases. This first zone can be thought of as mild pyrolysis.

In some embodiments, a second zone of a pyrolysis reactor is configured as the primary reaction zone, in which preheated biomass undergoes pyrolysis chemistry to release gases and condensable vapors, leaving a significant amount of solid material which is a high-carbon reaction intermediate. Biomass components (primarily cellulose, hemicellulose, and lignin) decompose and create vapors, which escape by penetrating through pores or creating new nanopores. The latter effect contributes to the creation of porosity and surface area.

In some embodiments, a third zone of a pyrolysis reactor is configured for receiving the high-carbon reaction intermediate and cooling down the solids to some extent. Typically, the third zone will be a lower temperature than the second zone. In the third zone, the chemistry and mass transport can be surprisingly complex. Without being limited by any particular theory or proposed mechanisms, it is believed that secondary reactions may occur in the third zone. Essentially, carbon-containing components that are in the gas phase can decompose to form additional fixed carbon and/or become adsorbed onto the carbon. Thus, the final carbonaceous material may not simply be the solid, devolatilized residue of the processing steps, but rather may include additional carbon that has been deposited from the gas phase, such as by decomposition of organic vapors (e.g., tars) that can form carbon.

Certain embodiments extend the concept of additional carbon formation by including a separate unit in which cooled carbon is subjected to an environment including carbon-containing species, to enhance the carbon content of the final product. When the temperature of this unit is below pyrolysis temperatures, the additional carbon is expected to be in the form of adsorbed carbonaceous species, rather than additional fixed carbon.

There are a large number of options as to intermediate input and output (purge or probe) streams of one or more phases present in any particular zone, various mass and energy recycle schemes, various additives that can be introduced anywhere in the process, adjustability of process conditions including both reaction and separation conditions in order to tailor product distributions, and so on. Zone-specific input and output streams enable good process monitoring and control, such as through FTIR sampling and dynamic process adjustments.

Some embodiments do not employ fast pyrolysis, and some embodiments do not employ slow pyrolysis. Surprisingly high-quality carbon materials, including compositions with very high fractions of fixed carbon, can be obtained from the disclosed processes and systems.

In some embodiments, a pyrolysis process for producing a biogenic reagent comprises the following steps:
 (a) providing a carbon-containing feedstock comprising biomass;
 (b) optionally drying the feedstock to remove at least a portion of moisture contained within the feedstock;
 (c) optionally deaerating the feedstock to remove at least a portion of interstitial oxygen, if any, contained with the feedstock;
 (d) pyrolyzing the feedstock in the presence of a substantially inert gas phase for at least 10 minutes and with at least one temperature selected from about 250° C. to about 700° C., to generate hot pyrolyzed solids, condensable vapors, and non-condensable gases;
 (e) separating at least a portion of the condensable vapors and at least a portion of the non-condensable gases from the hot pyrolyzed solids;
 (f) cooling the hot pyrolyzed solids to generate cooled pyrolyzed solids; and
 (g) recovering a biogenic reagent comprising at least a portion of the cooled pyrolyzed solids.

"Biomass," for purposes of this disclosure, shall be construed as any biogenic feedstock or mixture of a biogenic and non-biogenic feedstocks. Elementally, biomass includes at least carbon, hydrogen, and oxygen. The methods and apparatus of the invention can accommodate a wide range of feedstocks of various types, sizes, and moisture contents.

Biomass includes, for example, plant and plant-derived material, vegetation, agricultural waste, forestry waste, wood waste, paper waste, animal-derived waste, poultry-derived waste, and municipal solid waste. In various embodiments of the invention utilizing biomass, the biomass feedstock may include one or more materials selected from: timber harvesting residues, softwood chips, hardwood chips, tree branches, tree stumps, knots, leaves, bark, sawdust, off-spec paper pulp, cellulose, corn, corn stover, wheat straw, rice straw, sugarcane bagasse, switchgrass, miscanthus, animal manure, municipal garbage, municipal sewage, commercial waste, grape pumice, almond shells, pecan shells, coconut shells, coffee grounds, grass pellets, hay pellets, wood pellets, cardboard, paper, carbohydrates, plastic, and cloth. A person of ordinary skill in the art will readily appreciate that the feedstock options are virtually unlimited.

The present invention can also be used for carbon-containing feedstocks other than biomass, such as a fossil fuel (e.g., coal or petroleum coke), or any mixtures of biomass and fossil fuels (such as biomass/coal blends). In some embodiments, a biogenic feedstock is, or includes, coal, oil shale, crude oil, asphalt, or solids from crude-oil processing (such as petcoke). Feedstocks may include waste tires, recycled plastics, recycled paper, construction waste, deconstruction waste, and other waste or recycled materials. For the avoidance of doubt, any method, apparatus, or system described herein can be used with any carbonaceous feedstock. Carbon-containing feedstocks can be transportable by any known means, such as by truck, train, ship, barge, tractor trailer, or any other vehicle or means of conveyance.

Selection of a particular feedstock or feedstocks is not regarded as technically critical, but is carried out in a manner that tends to favor an economical process. Typically, regardless of the feedstocks chosen, there can be (in some embodiments) screening to remove undesirable materials. The feedstock can optionally be dried prior to processing.

The feedstock employed can be provided or processed into a wide variety of particle sizes or shapes. For example, the feed material can be a fine powder, or a mixture of fine and coarse particles. The feed material can be in the form of large pieces of material, such as wood chips or other forms of wood (e.g., round, cylindrical, square, etc.). In some embodiments, the feed material comprises pellets or other agglomerated forms of particles that have been pressed together or otherwise bound, such as with a binder.

It is noted that size reduction is a costly and energy-intensive process. Pyrolyzed material can be sized with significantly less energy input—that is, it can be preferred to reduce the particle size of the product, not the feedstock. This is an option in the present invention because the process does not require a fine starting material, and there is not necessarily any significant particle-size reduction during processing. The ability to process very large pieces of feedstock is a significant economic advantage of this invention. Notably, some market applications of the high-carbon product actually require large sizes (e.g., on the order of centimeters), so that in some embodiments, large pieces are fed, produced, and sold.

When it is desired to produce a final carbonaceous biogenic reagent that has structural integrity, such as in the form of cylinders, there are at least two options in the context of this invention. First, the material produced from the process can be collected and then further process mechanically into the desired form. For example, the product can be pressed or pelletized, with a binder. The second option is to utilize feed materials that generally possess the desired size and/or shape for the final product, and employ processing steps that do not destroy the basic structure of the feed material. In some embodiments, the feed and product have similar geometrical shapes, such as spheres, cylinders, or cubes.

The ability to maintain the approximate size of feed material throughout the process is beneficial when product strength is important. Also, this avoids the difficulty and cost of pelletizing high fixed carbon materials.

The starting feed material can be provided with a range of moisture levels, as will be appreciated. In some embodiments, the feed material may already be sufficiently dry that it need not be further dried before pyrolysis. Typically, it will be desirable to utilize commercial sources of biomass which will usually contain moisture, and feed the biomass through a drying step before introduction into the pyrolysis reactor. However, in some embodiments a dried feedstock can be utilized.

It is usually desirable to provide a relatively low-oxygen environment in the pyrolysis reactor, such as about, or at most about, 10 mol %, 5 mol %, 4 mol %, 3 mol %, 2 mol %, 1.5 mol %, 1 mol %, 0.5 mol %, 0.2 mol %, 0.1 mol %, 0.05 mol %, 0.02 mol %, or 0.01 mol % $O_2$ in the gas phase. First, uncontrolled combustion should be avoided in the pyrolysis reactor, for safety reasons. Some amount of total carbon oxidation to $CO_2$ may occur, and the heat released from the exothermic oxidation may assist the endothermic pyrolysis chemistry. Large amounts of oxidation of carbon, including partial oxidation to syngas, will reduce the carbon yield to solids.

Practically speaking, it can be difficult to achieve a strictly oxygen-free environment in the reactor. This limit can be approached, and in some embodiments, the reactor is substantially free of molecular oxygen in the gas phase. To ensure that little or no oxygen is present in the pyrolysis reactor, it can be desirable to remove air from the feed material before it is introduced to the reactor. There are various ways to remove or reduce air in the feedstock.

In some embodiments, a deaeration unit is utilized in which feedstock, before or after drying, is conveyed in the presence of another gas which can remove adsorbed oxygen and penetrate the feedstock pores to remove oxygen from the pores. Essentially any gas that has lower than 21 vol % $O_2$ can be employed, at varying effectiveness. In some embodiments, nitrogen is employed. In some embodiments, CO and/or $CO_2$ is employed. Mixtures can be used, such as a mixture of nitrogen and a small amount of oxygen. Steam can be present in the deaeration gas, although adding significant moisture back to the feed should be avoided. The effluent from the deaeration unit can be purged (to the atmosphere or to an emissions treatment unit) or recycled.

In principle, the effluent (or a portion thereof) from the deaeration unit could be introduced into the pyrolysis reactor itself since the oxygen removed from the solids will now be highly diluted. In this embodiment, it can be advantageous to introduce the deaeration effluent gas to the last zone of the reactor, when it is operated in a countercurrent configuration.

Various types of deaeration units can be employed. If drying it to be performed, it can be preferable to dry and then deaerate since it can be inefficient to scrub soluble oxygen out of the moisture present. In certain embodiments, the drying and deaerating steps are combined into a single unit, or some amount of deaeration is achieved during drying, and so on.

The optionally dried and optionally deaerated feed material is introduced to a pyrolysis reactor or multiple reactors in series or parallel. The feed material can be introduced using any known means, including screw feeders or lock hoppers, for example. In some embodiments, a material feed system incorporates an air knife.

When a single reactor is employed, multiple zones can be present. Multiple zones, such as two, three, four, or more zones, can allow for the separate control of temperature, solids residence time, gas residence time, gas composition, flow pattern, and/or pressure in order to adjust the overall process performance.

References to "zones" shall be broadly construed to include regions of space within a single physical unit, physically separate units, or any combination thereof. For a continuous reactor, the demarcation of zones may relate to structure, such as the presence of flights within the reactor or distinct heating elements to provide heat to separate zones. Alternatively, or additionally, the demarcation of zones in a continuous reactor may relate to function, such as distinct temperatures, fluid flow patterns, solid flow patterns, extent of reaction, and so on. In a single batch reactor, "zones" are operating regimes in time, rather than in space. Multiple batch reactors may also be used.

It will be appreciated that there are not necessarily abrupt transitions from one zone to another zone. For example, the boundary between the preheating zone and pyrolysis zone can be somewhat arbitrary; some amount of pyrolysis may take place in a portion of the preheating zone, and some amount of "preheating" may continue to take place in the pyrolysis zone. The temperature profile in the reactor is typically continuous, including at zone boundaries within the reactor.

Some embodiments employ a first zone that is operated under conditions of preheating and/or mild pyrolysis. The temperature of the first zone can be selected from about 150° C. to about 500° C., such as about 300° C. to about 400° C. The temperature of the first zone is not so high as to shock the biomass material which ruptures the cell walls and initiates fast decomposition of the solid phase into vapors and gases.

All references to zone temperatures in this specification should be construed in a non-limiting way to include temperatures that may apply to the bulk solids present, or the gas phase, or the reactor walls (on the process side). It will be understood that there will be a temperature gradient in each zone, both axially and radially, as well as temporally (i.e., following start-up or due to transients). Thus, references to zone temperatures can be references to average temperatures or other effective temperatures that may influence the actual kinetics. Temperatures can be directly measured by thermocouples or other temperature probes, or indirectly measured or estimated by other means.

The second zone, or in general the primary pyrolysis zone, is operated under conditions of pyrolysis or carbonization. The temperature of the second zone can be selected from about 250° C. to about 700° C., such as about, or at least about, or at most about 300° C., 350° C., 400° C., 450° C., 500° C., 550° C., 600° C., or 650° C. Within this zone, preheated biomass undergoes pyrolysis chemistry to release gases and condensable vapors, leaving a significant amount of solid material as a high-carbon reaction intermediate. Biomass components (primarily cellulose, hemicellulose, and lignin) decompose and create vapors, which escape by penetrating through pores or creating new pores. The preferred temperature will at least depend on the residence time of the second zone, as well as the nature of the feedstock and desired product properties.

The third zone, or cooling zone, is operated to cool down the high-carbon reaction intermediate to varying degrees. At a minimum, the temperature of the third zone should be a lower temperature than that of the second zone. The temperature of the third zone can be selected from about 100° C. to about 550° C., such as about 150° C. to about 350° C.

Chemical reactions may continue to occur in the cooling zone. Without being limited by any particular theory, it is believed that secondary pyrolysis reactions can be initiated in the third zone. Carbon-containing components that are in the gas phase can condense (due to the reduced temperature of the third zone). The temperature remains sufficiently high, however, to promote reactions that may form additional fixed carbon from the condensed liquids (secondary pyrolysis) or at least form bonds between adsorbed species and the fixed carbon. One exemplary reaction that may take place is the Boudouard reaction for conversion of carbon monoxide to carbon dioxide plus fixed carbon.

The residence times of the reactor zones may vary. There is an interplay of time and temperature, so that for a desired amount of pyrolysis, higher temperatures may allow for lower reaction times, and vice versa. The residence time in a continuous reactor (zone) is the volume divided by the volumetric flow rate. The residence time in a batch reactor is the batch reaction time, following heating to reaction temperature.

It should be recognized that in multiphase reactors, there are multiple residence times. In the present context, in each zone, there will be a residence time (and residence-time distribution) of both the solids phase and the vapor phase. For a given apparatus employing multiple zones, and with a given throughput, the residence times across the zones will generally be coupled on the solids side, but residence times can be uncoupled on the vapor side when multiple inlet and outlet ports are utilized in individual zones. The solids and vapor residence times are uncoupled.

The solids residence time of the preheating zone can be selected from about 5 min to about 60 min, such as about 10, 20, 30, 40, or 50 min. Depending on the temperature, sufficient time is desired to allow the biomass to reach a desired preheat temperature. The heat-transfer rate, which will depend on the particle type and size, the physical apparatus, and on the heating parameters, will dictate the minimum residence time necessary to allow the solids to reach a desired preheat temperature. Additional time may not be desirable as it would contribute to higher capital cost, unless some amount of mild pyrolysis is intended in the preheating zone.

The solids residence time of the pyrolysis zone can be selected from about 10 min to about 120 min, such as about 20, 30, 40, 50, 60, 70, 80, 90, or 100 min. Depending on the pyrolysis temperature in this zone, there should be sufficient time to allow the carbonization chemistry to take place, following the necessary heat transfer. For times below about 10 min, in order to remove high quantities of non-carbon elements, the temperature would need to be quite high, such as above 700° C. This temperature would promote fast pyrolysis and its generation of vapors and gases derived from the carbon itself, which is to be avoided when the intended product is solid carbon.

In a static system, there would be an equilibrium conversion that could be substantially reached at a certain time. When, as in certain embodiments, vapor is continuously flowing over solids with continuous volatiles removal, the equilibrium constraint can be removed to allow for pyrolysis and devolatilization to continue until reaction rates approach zero. Longer times would not tend to substantially alter the remaining recalcitrant solids.

The solids residence time of the cooling zone can be selected from about 5 min to about 60 min, such as about 10, 20, 30, 40, or 50 min. Depending on the cooling temperature in this zone, there should be sufficient time to allow the carbon solids to cool to the desired temperature. The cooling rate and temperature will dictate the minimum residence time necessary to allow the carbon to be cooled. Additional time may not be desirable, unless some amount of secondary pyrolysis is desired.

As discussed above, the residence time of the vapor phase can be separately selected and controlled. The vapor residence time of the preheating zone can be selected from about 0.1 min to about 15 min, such as about 0.5, 1, 2, 3, 4, 5, 6, 7, 8, 9, or 10 min. The vapor residence time of the pyrolysis zone can be selected from about 0.1 min to about 20 min, such as about 0.5, 1, 2, 3, 4, 5, 6, 7, 8, 9, 10, 11, 12, 13, 14, or 15 min. The vapor residence time of the cooling zone can be selected from about 0.1 min to about 15 min, such as about 0.5, 1, 2, 3, 4, 5, 6, 7, 8, 9, or 10 min. Short vapor residence times promote fast sweeping of volatiles out of the system, while longer vapor residence times promote reactions of components in the vapor phase with the solid phase.

The mode of operation for the reactor, and overall system, can be continuous, semi-continuous, batch, or any combination or variation of these. In some embodiments, the reactor is a continuous, countercurrent reactor in which solids and vapor flow substantially in opposite directions. The reactor may also be operated in batch but with simulated countercurrent flow of vapors, such as by periodically introducing and removing gas phases from the batch vessel.

Various flow patterns can be desired or observed. With chemical reactions and simultaneous separations involving multiple phases in multiple reactor zones, the fluid dynamics can be quite complex. Typically, the flow of solids may approach plug flow (well-mixed in the radial dimension)

while the flow of vapor may approach fully mixed flow (fast transport in both radial and axial dimensions). Multiple inlet and outlet ports for vapor may contribute to overall mixing.

The pressure in each zone can be separately selected and controlled. The pressure of each zone can be independently selected from about 1 kPa to about 3000 kPa, such as about 101.3 kPa (normal atmospheric pressure). Independent zone control of pressure is possible when multiple gas inlets and outlets are used, including vacuum ports to withdraw gas when a zone pressure less than atmospheric is desired.

The process may conveniently be operated at atmospheric pressure, in some embodiments. There are many advantages associated with operation at atmospheric pressure, ranging from mechanical simplicity to enhanced safety. In certain embodiments, the pyrolysis zone is operated at a pressure of about 90 kPa, 95 kPa, 100 kPa, 101 kPa, 102 kPa, 105 kPa, or 110 kPa (absolute pressures).

Vacuum operation (e.g., 10-100 kPa) would promote fast sweeping of volatiles out of the system. Higher pressures (e.g., 100-1000 kPa) can be useful when the off-gases will be fed to a high-pressure operation. Elevated pressures may also be useful to promote heat transfer, chemistry, or separations.

The step of separating at least a portion of the condensable vapors and at least a portion of the non-condensable gases from the hot pyrolyzed solids can be accomplished in the reactor itself, or using a distinct separation unit. A substantially inert sweep gas can be introduced into one or more of the zones. Condensable vapors and non-condensable gases are then carried away from the zone(s) in the sweep gas, and out of the reactor.

In some embodiments, the sweep gas comprises $N_2$, Ar, CO, $CO_2$, $H_2$, $H_2O$, $CH_4$, other light hydrocarbons, or a combination thereof. In some embodiments, the sweep gas is preheated prior to introduction, or cooled if it is obtained from a heated source.

The sweep gas more thoroughly removes volatile components, by getting them out of the system before they can condense or further react. The sweep gas allows volatiles to be removed at higher rates than would be attained merely from volatilization at a given process temperature. Or, use of the sweep gas allows milder temperatures to be used to remove a certain quantity of volatiles. The reason the sweep gas improves the volatiles removal is that the mechanism of separation is not merely relative volatility but rather liquid/vapor phase disengagement assisted by the sweep gas. The sweep gas can both reduce mass-transfer limitations of volatilization as well as reduce thermodynamic limitations by continuously depleting a given volatile species, to cause more of it to vaporize to attain thermodynamic equilibrium.

Some embodiments remove gases laden with volatile organic carbon from subsequent processing stages, in order to produce a product with high fixed carbon. Without removal, the volatile carbon can adsorb or absorb onto the pyrolyzed solids, thereby requiring additional energy (cost) to achieve a purer form of carbon which can be desired. By removing vapors quickly, it is also speculated that porosity can be enhanced in the pyrolyzing solids. Higher porosity is desirable for some products.

In certain embodiments, the sweep gas in conjunction with a relatively low process pressure, such as atmospheric pressure, provides for fast vapor removal without large amounts of inert gas necessary.

In some embodiments, the sweep gas flows countercurrent to the flow direction of feedstock. In other embodiments, the sweep gas flows cocurrent to the flow direction of feedstock. In some embodiments, the flow pattern of solids approaches plug flow while the flow pattern of the sweep gas, and gas phase generally, approaches fully mixed flow in one or more zones.

The sweep can be performed in any one or more of the reactor zones. In some embodiments, the sweep gas is introduced into the cooling zone and extracted (along with volatiles produced) from the cooling and/or pyrolysis zones. In some embodiments, the sweep gas is introduced into the pyrolysis zone and extracted from the pyrolysis and/or preheating zones. In some embodiments, the sweep gas is introduced into the preheating zone and extracted from the pyrolysis zone. In these or other embodiments, the sweep gas can be introduced into each of the preheating, pyrolysis, and cooling zones and also extracted from each of the zones.

In some embodiments, the zone or zones in which separation is carried out is a physically separate unit from the reactor. The separation unit or zone can be disposed between reactor zones, if desired. For example, there can be a separation unit placed between pyrolysis and cooling units.

The sweep gas can be introduced continuously, especially when the solids flow is continuous. When the pyrolysis reaction is operated as a batch process, the sweep gas can be introduced after a certain amount of time, or periodically, to remove volatiles. Even when the pyrolysis reaction is operated continuously, the sweep gas can be introduced semi-continuously or periodically, if desired, with suitable valves and controls.

The volatiles-containing sweep gas may exit from the one or more reactor zones, and can be combined if obtained from multiple zones. The resulting gas stream, containing various vapors, may then be fed to a thermal oxidizer for control of air emissions. Any known thermal-oxidation unit can be employed. In some embodiments, the thermal oxidizer is fed with natural gas and air, to reach sufficient temperatures for substantial destruction of volatiles contained therein.

The effluent of the thermal oxidizer will be a hot gas stream comprising water, carbon dioxide, and nitrogen. This effluent stream can be purged directly to air emissions, if desired. The energy content of the thermal oxidizer effluent can be recovered, such as in a waste-heat recovery unit. The energy content may also be recovered by heat exchange with another stream (such as the sweep gas). The energy content can be utilized by directly or indirectly heating, or assisting with heating, a unit elsewhere in the process, such as the dryer or the reactor. In some embodiments, essentially all of the thermal oxidizer effluent is employed for indirect heating (utility side) of the dryer. The thermal oxidizer may employ other fuels than natural gas.

The yield of carbonaceous material may vary, depending on the above-described factors including type of feedstock and process conditions. In some embodiments, the net yield of solids as a percentage of the starting feedstock, on a dry basis, is at least 25%, 30%, 35%, 40%, 45%, 50%, or higher. The remainder will be split between condensable vapors, such as terpenes, tars, alcohols, acids, aldehydes, or ketones; and non-condensable gases, such as carbon monoxide, hydrogen, carbon dioxide, and methane. The relative amounts of condensable vapors compared to non-condensable gases will also depend on process conditions, including the water present.

In terms of the carbon balance, in some embodiments the net yield of carbon as a percentage of starting carbon in the feedstock is at least 25%, 30%, 40%, 50%, 60%, 65%, 70%, 75%, 80%, or higher. For example, the in some embodiments the carbonaceous material contains between about 40% and about 70% of the carbon contained in the starting feedstock. The rest of the carbon results in the formation of methane, carbon monoxide, carbon dioxide, light hydrocarbons, aromatics, tars, terpenes, alcohols, acids, aldehydes, or ketones, to varying extents.

In alternative embodiments, some portion of these molecules is combined with the carbon-rich solids to enrich the carbon and energy content of the product. In these embodiments, some or all of the resulting gas stream from the reactor, containing various vapors, can be condensed, at least in part, and then passed over cooled pyrolyzed solids derived from the cooling zone and/or from the separate cooling unit. These embodiments are described in more detail below.

Following the reaction and cooling within the cooling zone (if present), the carbonaceous solids can be introduced into a distinct cooling unit. In some embodiments, solids are collected and simply allowed to cool at slow rates. If the carbonaceous solids are reactive or unstable in air, it can be desirable to maintain an inert atmosphere and/or rapidly cool the solids to, for example, a temperature less than 40° C., such as ambient temperature. In some embodiments, a water quench is employed for rapid cooling. In some embodiments, a fluidized-bed cooler is employed. A "cooling unit" should be broadly construed to also include containers, tanks, pipes, or portions thereof.

In some embodiments, the process further comprises operating the cooling unit to cool the warm pyrolyzed solids with steam, thereby generating the cool pyrolyzed solids and superheated steam; wherein the drying is carried out, at least in part, with the superheated steam derived from the cooling unit. Optionally, the cooling unit can be operated to first cool the warm pyrolyzed solids with steam to reach a first cooling-unit temperature, and then with air to reach a second cooling-unit temperature, wherein the second cooling-unit temperature is lower than the first cooling-unit temperature and is associated with a reduced combustion risk for the warm pyrolyzed solids in the presence of the air.

Following cooling to ambient conditions, the carbonaceous solids can be recovered and stored, conveyed to another site operation, transported to another site, or otherwise disposed, traded, or sold. The solids can be fed to a unit to reduce particle size. A variety of size-reduction units are known in the art, including crushers, shredders, grinders, pulverizers, jet mills, pin mills, and ball mills.

Screening or some other means for separation based on particle size can be included. The grinding can be upstream or downstream of grinding, if present. A portion of the screened material (e.g., large chunks) can be returned to the grinding unit. The small and large particles can be recovered for separate downstream uses. In some embodiments, cooled pyrolyzed solids are ground into a fine powder, such as a pulverized carbon or activated carbon product.

Various additives can be introduced throughout the process, before, during, or after any step disclosed herein. The additives can be broadly classified as process additives, selected to improve process performance such as carbon yield or pyrolysis time/temperature to achieve a desired carbon purity; and product additives, selected to improve one or more properties of the biogenic reagent, or a downstream product incorporating the reagent. Certain additives may provide enhanced process and product (biogenic reagents or products containing biogenic reagents) characteristics.

Additives can be added before, during, or after any one or more steps of the process, including into the feedstock itself at any time, before or after it is harvested. Additive treatment can be incorporated prior to, during, or after feedstock sizing, drying, or other preparation. Additives can be incorporated at or on feedstock supply facilities, transport trucks, unloading equipment, storage bins, conveyors (including open or closed conveyors), dryers, process heaters, or any other units. Additives can be added anywhere into the pyrolysis process itself, using suitable means for introducing additives. Additives can be added after carbonization, or even after pulverization, if desired.

In some embodiments, an additive is selected from a metal, a metal oxide, a metal hydroxide, or a combination thereof. For example an additive can be selected from, but is by no means limited to, magnesium, manganese, aluminum, nickel, chromium, silicon, boron, cerium, molybdenum, phosphorus, tungsten, vanadium, iron chloride, iron bromide, magnesium oxide, dolomite, dolomitic lime, fluorite, fluorospar, bentonite, calcium oxide, lime, and combinations thereof.

In some embodiments, an additive is selected from an acid, a base, or a salt thereof. For example an additive can be selected from, but is by no means limited to, sodium hydroxide, potassium hydroxide, magnesium oxide, hydrogen bromide, hydrogen chloride, sodium silicate, potassium permanganate, or combinations thereof.

In some embodiments, an additive is selected from a metal halide. Metal halides are molecules between metals and halogens (fluorine, chlorine, bromine, iodine, and astatine). The halogens can form many molecules with metals. Metal halides are generally obtained by direct combination, or more commonly, neutralization of basic metal salt with a hydrohalic acid. In some embodiments, an additive is selected from iron chloride ($FeCl_2$ and/or $FeCl_3$), iron bromide ($FeBr_2$ and/or $FeBr_3$), or hydrates thereof, and any combinations thereof.

Additives may result in a final product with higher energy content (energy density). An increase in energy content may result from an increase in total carbon, fixed carbon, volatile carbon, or even hydrogen. Alternatively or additionally, the increase in energy content may result from removal of non-combustible matter or of material having lower energy density than carbon. In some embodiments, additives reduce the extent of liquid formation, in favor of solid and gas formation, or in favor of solid formation.

Without being limited to any particular hypothesis, additives may chemically modify the starting biomass, or treated biomass prior to pyrolysis, to reduce rupture of cell walls for greater strength/integrity. In some embodiments, additives may increase fixed carbon content of biomass feedstock prior to pyrolysis.

Additives may result in a biogenic reagent with improved mechanical properties, such as yield strength, compressive strength, tensile strength, fatigue strength, impact strength, elastic modulus, bulk modulus, or shear modulus. Additives may improve mechanical properties by simply being present (e.g., the additive itself imparts strength to the mixture) or due to some transformation that takes place within the additive phase or within the resulting mixture. For example, reactions such as vitrification may occur within a portion of the biogenic reagent that includes the additive, thereby improving the final strength.

Chemical additives can be applied to wet or dry biomass feedstocks. The additives can be applied as a solid powder, a spray, a mist, a liquid, or a vapor. In some embodiments, additives can be introduced through spraying of a liquid solution (such as an aqueous solution or in a solvent), or by soaking in tanks, bins, bags, or other containers.

In certain embodiments, dip pretreatment is employed wherein the solid feedstock is dipped into a bath comprising the additive, either batchwise or continuously, for a time sufficient to allow penetration of the additive into the solid feed material.

In some embodiments, additives applied to the feedstock may reduce energy requirements for the pyrolysis, and/or increase the yield of the carbonaceous product. In these or other embodiments, additives applied to the feedstock may provide functionality that is desired for the intended use of the carbonaceous product.

The throughput, or process capacity, may vary widely from small laboratory-scale units to full operations, including any pilot, demonstration, or semi-commercial scale. In various embodiments, the process capacity (for feedstocks, products, or both) is at least about 1 kg/day, 10 kg/day, 100 kg/day, 1 ton/day (all tons are metric tons), 10 tons/day, 100 tons/day, 500 tons/day, 1000 tons/day, 2000 tons/day, or higher.

In some embodiments, a portion of solids produced can be recycled to the front end of the process, i.e. to the drying or deaeration unit or directly to the reactor. By returning to the front end and passing through the process again, treated solids can become higher in fixed carbon. Solid, liquid, and gas streams produced or existing within the process can be independently recycled, passed to subsequent steps, or removed/purged from the process at any point.

In some embodiments, pyrolyzed material is recovered and then fed to a separate unit for further pyrolysis, to create a product with higher carbon purity (e.g., conversion of low fixed carbon material to high fixed carbon material). In some embodiments, the secondary process can be conducted in a simple container, such as a steel drum, in which heated inert gas (such as heated $N_2$) is passed through. Other containers useful for this purpose include process tanks, barrels, bins, totes, sacks, and roll-offs. This secondary sweep gas with volatiles can be sent to the thermal oxidizer, or back to the main process reactor, for example. To cool the final product, another stream of inert gas, which is initially at ambient temperature for example, can be passed through the solids to cool the solids, and then returned to an inert gas preheat system.

Some variations of the invention utilize a biogenic reagent production system comprising:
(a) a feeder configured to introduce a carbon-containing feedstock;
(b) an optional dryer, disposed in operable communication with the feeder, configured to remove moisture contained within a carbon-containing feedstock;
(c) a multiple-zone reactor, disposed in operable communication with the dryer, wherein the multiple-zone reactor contains at least a pyrolysis zone disposed in operable communication with a spatially separated cooling zone, and wherein the multiple-zone reactor is configured with an outlet to remove condensable vapors and non-condensable gases from solids;
(d) a solids cooler, disposed in operable communication with the multiple-zone reactor; and
(e) a biogenic reagent recovery unit, disposed in operable communication with the solids cooler.

Some variations utilize a biogenic reagent production system comprising:
(a) a feeder configured to introduce a carbon-containing feedstock;
(b) an optional dryer, disposed in operable communication with the feeder, configured to remove moisture contained within a carbon-containing feedstock;
(c) an optional preheater, disposed in operable communication with the dryer, configured to heat and/or mildly pyrolyze the feedstock;
(d) a pyrolysis reactor, disposed in operable communication with the preheater, configured to pyrolyze the feedstock;
(e) a cooler, disposed in operable communication with the pyrolysis reactor, configured to cool pyrolyzed solids; and
(f) a biogenic reagent recovery unit, disposed in operable communication with the cooler,
wherein the system is configured with at least one gas outlet to remove condensable vapors and non-condensable gases from solids.

The feeder can be physically integrated with the multiple-zone reactor, such as through the use of a screw feeder or auger mechanism to introduce feed solids into the first reaction zone.

In some embodiments, the system further comprises a preheating zone, disposed in operable communication with the pyrolysis zone. Each of the pyrolysis zone, cooling zone, and preheating zone (it present) can be located within a single unit, or can be located in separate units.

Optionally, the dryer can be configured as a drying zone within the multiple-zone reactor. Optionally, the solids cooler can be disposed within the multiple-zone reactor (i.e., configured as an additional cooling zone or integrated with the main cooling zone).

The system may include a purging means for removing oxygen from the system. For example, the purging means may comprise one or more inlets to introduce a substantially inert gas, and one or more outlets to remove the substantially inert gas and displaced oxygen from the system. In some embodiments, the purging means is a deaerater disposed in operable communication between the dryer and the multiple-zone reactor.

The multiple-zone reactor can be configured with at least a first gas inlet and a first gas outlet. The first gas inlet and the first gas outlet can be disposed in communication with different zones, or with the same zone.

In some embodiments, the multiple-zone reactor is configured with a second gas inlet and/or a second gas outlet. In some embodiments, the multiple-zone reactor is configured with a third gas inlet and/or a third gas outlet. In some embodiments, the multiple-zone reactor is configured with a fourth gas inlet and/or a fourth gas outlet. In some embodiments, each zone present in the multiple-zone reactor is configured with a gas inlet and a gas outlet.

Gas inlets and outlets allow not only introduction and withdrawal of vapor, but gas outlets (probes) in particular allow precise process monitoring and control across various stages of the process, up to and potentially including all stages of the process. Precise process monitoring would be expected to result in yield and efficiency improvements, both dynamically as well as over a period of time when operational history can be utilized to adjust process conditions.

In preferred embodiments, a reaction gas probe is disposed in operable communication with the pyrolysis zone. Such a reaction gas probe can be useful to extract gases and analyze them, in order to determine extent of reaction, pyrolysis selectivity, or other process monitoring. Then, based on the measurement, the process can be controlled or adjusted in any number of ways, such as by adjusting feed rate, rate of inert gas sweep, temperature (of one or more zones), pressure (of one or more zones), additives, and so on.

As intended herein, "monitor and control" via reaction gas probes should be construed to include any one or more sample extractions via reaction gas probes, and optionally making process or equipment adjustments based on the measurements, if deemed necessary or desirable, using well-known principles of process control (feedback, feedforward, proportional-integral-derivative logic, etc.).

A reaction gas probe can be configured to withdraw gas samples in a number of ways. For example, a sampling line may have a lower pressure than the pyrolysis reactor pressure, so that when the sampling line is opened an amount of gas can readily be withdrawn from pyrolysis zone. The sampling line can be under vacuum, such as when the pyrolysis zone is near atmospheric pressure. Typically, a reaction gas probe will be associated with one gas output, or a portion thereof (e.g., a line split from a gas output line).

In some embodiments, both a gas input and a gas output are utilized as a reaction gas probe by periodically introducing an inert gas into a zone, and pulling the inert gas with a process sample out of the gas output ("sample sweep"). Such an arrangement could be used in a zone that does not otherwise have a gas inlet/outlet for the substantially inert gas for processing, or, the reaction gas probe could be associated with a separate gas inlet/outlet that is in addition to process inlets and outlets. A sampling inert gas that is introduced and withdrawn periodically for sampling (in embodiments that utilize sample sweeps) could even be different than the process inert gas, if desired, either for reasons of accuracy in analysis or to introduce an analytical tracer.

For example, acetic acid concentration in the gas phase of the pyrolysis zone can be measured using a gas probe to extract a sample, which is then analyzed using a suitable technique (such as gas chromatography, GC; mass spectroscopy, MS; GC-MS, or Fourier-Transform Infrared Spectroscopy, FTIR). CO and/or $CO_2$ concentration in the gas phase could be measured and used as an indication of the pyrolysis selectivity toward gases/vapors, for example. Turpene concentration in the gas phase could be measured and used as an indication of the pyrolysis selectivity toward liquids, for example.

In some embodiments, the system further comprises at least one additional gas probe disposed in operable communication with the cooling zone, or with the drying zone (if present) or the preheating zone (if present).

A gas probe for the cooling zone could be useful to determine the extent of any additional chemistry taking place in the cooling zone, for example. A gas probe in the cooling zone could also be useful as an independent measurement of temperature (in addition, for example, to a thermocouple disposed in the cooling zone). This independent measurement can be a correlation of cooling temperature with a measured amount of a certain species. The correlation could be separately developed, or could be established after some period of process operation.

A gas probe for the drying zone could be useful to determine the extent of drying, by measuring water content, for example. A gas probe in the preheating zone could be useful to determine the extent of any mild pyrolysis taking place, for example.

In certain embodiments, the cooling zone is configured with a gas inlet, and the pyrolysis zone is configured with a gas outlet, to generate substantially countercurrent flow of the gas phase relative to the solid phase. Alternatively, or additionally, the preheating zone (when it is present) can be configured with a gas outlet, to generate substantially countercurrent flow of the gas phase relative to the solid phase.

Alternatively, or additionally, the drying zone can be configured with a gas outlet, to generate substantially countercurrent flow.

The pyrolysis reactor or reactors can be selected from any suitable reactor configuration that is capable of carrying out the pyrolysis process. Exemplary reactor configurations include, but are not limited to, fixed-bed reactors, fluidized-bed reactors, entrained-flow reactors, augers, ablative reactors, rotating cones, rotary drum kilns, calciners, roasters, moving-bed reactors, transport-bed reactors, ablative reactors, rotating cones, or microwave-assisted pyrolysis reactors.

In some embodiments in which an auger is used, sand or another heat carrier can optionally be employed. For example, the feedstock and sand can be fed at one end of a screw. The screw mixes the sand and feedstock and conveys them through the reactor. The screw can provide good control of the feedstock residence time and does not dilute the pyrolyzed products with a carrier or fluidizing gas. The sand can be reheated in a separate vessel.

In some embodiments in which an ablative process is used, the feedstock is moved at a high speed against a hot metal surface. Ablation of any char forming at surfaces can maintain a high rate of heat transfer. Such apparatus can prevent dilution of products. As an alternative, the feedstock particles can be suspended in a carrier gas and introduced at a high speed through a cyclone whose wall is heated.

In some embodiments in which a fluidized-bed reactor is used, the feedstock can be introduced into a bed of hot sand fluidized by a gas, which is typically a recirculated product gas. Reference herein to "sand" shall also include similar, substantially inert materials, such as glass particles, recovered ash particles, and the like. High heat-transfer rates from fluidized sand can result in rapid heating of the feedstock. There can be some ablation by attrition with the sand particles. Heat is usually provided by heat-exchanger tubes through which hot combustion gas flows.

Circulating fluidized-bed reactors can be employed, wherein gas, sand, and feedstock move together. Exemplary transport gases include recirculated product gases and combustion gases. High heat-transfer rates from the sand ensure rapid heating of the feedstock, and ablation is expected to be stronger than with regular fluidized beds. A separator can be employed to separate the product gases from the sand and char particles. The sand particles can be reheated in a fluidized burner vessel and recycled to the reactor.

In some embodiments, a multiple-zone reactor is a continuous reactor comprising a feedstock inlet, a plurality of spatially separated reaction zones configured for separately controlling the temperature and mixing within each of the reaction zones, and a carbonaceous-solids outlet, wherein one of the reaction zones is configured with a first gas inlet for introducing a substantially inert gas into the reactor, and wherein one of the reaction zones is configured with a first gas outlet.

In some embodiments, the reactor comprises at least two, three, or four reaction zones. Each of the reaction zones is disposed in operable communication with independently adjustable heating means. In some embodiments, the heating means comprise, independently, electrical heat transfer, steam heat transfer, hot-oil heat transfer, phase-change heat transfer, waste heat transfer, or a combination thereof. In some embodiments, at least one reactor zone is heated with an effluent stream from the thermal oxidizer, if present.

The reactor can be configured for separately adjusting gas-phase composition and gas-phase residence time of at least two reaction zones, up to and including all reaction zones present in the reactor.

The reactor can be equipped with a second gas inlet and/or a second gas outlet. In some embodiments, the reactor is configured with a gas inlet in each reaction zone. In these or other embodiments, the reactor is configured with a gas outlet in each reaction zone. The reactor can be a cocurrent or countercurrent reactor.

In some embodiments, the feedstock inlet comprises a screw or auger feed mechanism. In some embodiments, the carbonaceous-solids outlet comprises a screw or auger output mechanism.

Certain embodiments utilize a rotating calciner with a screw feeder. In these embodiments, the reactor is axially rotatable, i.e. it spins about its centerline axis. The speed of rotation will impact the solid flow pattern, and heat and mass transport. Each of the reaction zones can be configured with flights disposed on internal walls, to provide agitation of solids. The flights can be separately adjustable in each of the reaction zones.

Other means of agitating solids can be employed, such as augers, screws, or paddle conveyors. In some embodiments, the reactor includes a single, continuous auger disposed throughout each of the reaction zones. In other embodiments, the reactor includes twin screws disposed throughout each of the reaction zones.

Some systems are designed specifically with the capability to maintain the approximate size of feed material throughout the process—that is, to process the biomass feedstock without destroying or significantly damaging its structure. In some embodiments, the pyrolysis zone does not contain augers, screws, or rakes that would tend to greatly reduce the size of feed material being pyrolyzed.

In some embodiments of the invention, the system further includes a thermal oxidizer disposed in operable communication with the outlet at which condensable vapors and non-condensable gases are removed. The thermal oxidizer can be configured to receive a separate fuel (such as natural gas) and an oxidant (such as air) into a combustion chamber, adapted for combustion of the fuel and at least a portion of the condensable vapors. Certain non-condensable gases may also be oxidized, such as CO or $CH_4$, to $CO_2$.

When a thermal oxidizer is employed, the system may include a heat exchanger disposed between the thermal oxidizer and the dryer, configured to utilize at least some of the heat of the combustion for the dryer. This embodiment can contribute significantly to the overall energy efficiency of the process.

In some embodiments, the system further comprises a carbon-enhancement unit, disposed in operable communication with the solids cooler, configured for combining condensable vapors, in at least partially condensed form, with the solids. The carbon-enhancement unit may increase the carbon content of the biogenic reagent obtained from the recovery unit.

The system may further include a separate pyrolysis unit adapted to further pyrolyze the biogenic reagent to further increase its carbon content. The separate pyrolysis unit can be a relatively simply container, unit, or device, such as a tank, barrel, bin, drum, tote, sack, or roll-off.

The overall system can be at a fixed location, or it can be distributed at several locations. The system can be constructed using modules which can be simply duplicated for practical scale-up. The system may also be constructed using economy-of-scale principles, as is well-known in the process industries.

Some variations relating to carbon enhancement of solids will now be further described. In some embodiments, a process for producing a biogenic reagent comprises:
 (a) providing a carbon-containing feedstock comprising biomass;
 (b) optionally drying the feedstock to remove at least a portion of moisture contained within the feedstock;
 (c) optionally deaerating the feedstock to remove at least a portion of interstitial oxygen, if any, contained with the feedstock;
 (d) in a pyrolysis zone, pyrolyzing the feedstock in the presence of a substantially inert gas for at least 10 minutes and with a pyrolysis temperature selected from about 250° C. to about 700° C., to generate hot pyrolyzed solids, condensable vapors, and non-condensable gases;
 (e) separating at least a portion of the condensable vapors and at least a portion of the non-condensable gases from the hot pyrolyzed solids;
 (f) in a cooling zone, cooling the hot pyrolyzed solids, in the presence of the substantially inert gas for at least 5 minutes and with a cooling temperature less than the pyrolysis temperature, to generate warm pyrolyzed solids;
 (g) optionally cooling the warm pyrolyzed solids to generate cool pyrolyzed solids;
 (h) subsequently passing at least a portion of the condensable vapors and/or at least a portion of the non-condensable gases from step (e) across the warm pyrolyzed solids and/or the cool pyrolyzed solids, to form enhanced pyrolyzed solids with increased carbon content; and
 (i) recovering a biogenic reagent comprising at least a portion of the enhanced pyrolyzed solids.

In some embodiments, step (h) includes passing at least a portion of the condensable vapors from step (e), in vapor and/or condensed form, across the warm pyrolyzed solids, to produce enhanced pyrolyzed solids with increased carbon content. In some embodiments, step (h) includes passing at least a portion of the non-condensable gases from step (e) across the warm pyrolyzed solids, to produce enhanced pyrolyzed solids with increased carbon content.

Alternatively, or additionally, vapors or gases can be contacted with the cool pyrolyzed solids. In some embodiments, step (h) includes passing at least a portion of the condensable vapors from step (e), in vapor and/or condensed form, across the cool pyrolyzed solids, to produce enhanced pyrolyzed solids with increased carbon content. In some embodiments, step (h) includes passing at least a portion of the non-condensable gases from step (e) across the cool pyrolyzed solids, to produce enhanced pyrolyzed solids with increased carbon content.

In certain embodiments, step (h) includes passing substantially all of the condensable vapors from step (e), in vapor and/or condensed form, across the cool pyrolyzed solids, to produce enhanced pyrolyzed solids with increased carbon content. In certain embodiments, step (h) includes passing substantially all of the non-condensable gases from step (e) across the cool pyrolyzed solids, to produce enhanced pyrolyzed solids with increased carbon content.

In some embodiments, the process comprises a method of treating or separating the vapors or gases prior to using them for carbon enhancement. In some embodiments, an intermediate feed stream comprising condensable vapors or non-condensable gases, obtained from step (e), can be fed to a separation unit configured to generate a first and a second output streams. In some embodiments, the intermediate feed stream comprises condensable vapors and non-condensable gases.

Separation techniques can include or use distillation columns, flash vessels, centrifuges, cyclones, membranes, filters, packed beds, capillary columns, and so on. Separation can be principally based, for example, on distillation, absorption, adsorption, or diffusion, and can utilize differences in vapor pressure, activity, molecular weight, density, viscosity, polarity, chemical functionality, affinity to a stationary phase, and any combinations thereof.

In some embodiments, the first and second output streams are separated from the intermediate feed stream based on relative volatility. For example, the separation unit can be a distillation column, a flash tank, or a condenser.

Thus in some embodiments, the first output stream comprises the condensable vapors, and the second output stream comprises the non-condensable gases. The condensable vapors may include at least one carbon-containing molecule selected from terpenes, alcohols, acids, aldehydes, or ketones. The vapors from pyrolysis may include aromatic molecules such as benzene, toluene, ethylbenzene, and xylenes. Heavier aromatic molecules, such as refractory tars, can be present in the vapor. In some embodiments, the non-condensable gases comprise a carbon-containing molecule. In some embodiments, the carbon-containing molecule comprises carbon monoxide, carbon dioxide, or methane, or a combination thereof.

In some embodiments, the first and second output streams are separated intermediate feed stream based on relative polarity. For example, the separation unit can be a stripping column, a packed bed, a chromatography column, or membranes.

In some embodiments, the first output stream comprises polar molecules, and the second output stream comprises non-polar molecules. In some embodiments, the polar molecules comprise a carbon-containing molecule. In some embodiments, the carbon-containing molecule comprises methanol, furfural, or acetic acid, or a combination thereof. In some embodiments, the non-polar molecules comprise a carbon-containing molecule. In some embodiments, the carbon-containing molecule comprises carbon monoxide, carbon dioxide, methane, a turpene, a turpene derivative, or a combination thereof.

Step (h) may increase the total carbon content of the biogenic reagent, relative to an otherwise-identical process without step (h). The extent of increase in carbon content can be, for example, about 1%, 2%, 5%, 10%, 15%, 25%, or even higher, in various embodiments.

In some embodiments, step (h) increases the fixed carbon content of the biogenic reagent. In these or other embodiments, step (h) increases the volatile carbon content of the biogenic reagent. Volatile carbon content is the carbon attributed to volatile matter in the reagent. The volatile matter can be, but is not limited to, hydrocarbons including aliphatic or aromatic molecules (e.g., terpenes); oxygenates including alcohols, aldehydes, or ketones; and various tars. Volatile carbon will typically remain bound or adsorbed to the solids at ambient conditions but upon heating, will be released before the fixed carbon would be oxidized, gasified, or otherwise released as a vapor.

Depending on conditions associated with step (h), it is possible for some amount of volatile carbon to become fixed carbon (e.g., via Boudouard carbon formation from CO). Typically, the volatile matter will enter the micropores of the fixed carbon and will be present as condensed/adsorbed species, but remain relatively volatile. This residual volatility can be more advantageous for fuel applications, compared to product applications requiring high surface area and porosity.

Step (h) may increase the energy content (i.e., energy density) of the biogenic reagent. The increase in energy content may result from an increase in total carbon, fixed carbon, volatile carbon, or even hydrogen. The extent of increase in energy content can be, for example, about 1%, 2%, 5%, 10%, 15%, 25%, or even higher, in various embodiments.

Further separations can be employed to recover one or more non-condensable gases or condensable vapors, for use within the process or further processing. For example, further processing can be included to produce refined carbon monoxide and/or hydrogen.

As another example, separation of acetic acid can be conducted, followed by reduction of the acetic acid into ethanol. The reduction of the acetic acid can be accomplished, at least in part, using hydrogen derived from the non-condensable gases produced.

Condensable vapors can be used for either energy in the process (such as by thermal oxidation) or in carbon enrichment, to increase the carbon content of the biogenic reagent. Certain non-condensable gases, such as CO or $CH_4$, can be utilized either for energy in the process, or as part of the substantially inert gas for the pyrolysis step. Combinations of any of the foregoing are also possible.

A potential benefit of including step (h) is that the gas stream is scrubbed, with the resulting gas stream being enriched in CO and $CO_2$. The resulting gas stream can be utilized for energy recovery, recycled for carbon enrichment of solids, and/or used as an inert gas in the reactor. Similarly, by separating non-condensable gases from condensable vapors, the $CO/CO_2$ stream is prepared for use as the inert gas in the reactor system or in the cooling system, for example.

Other variations are premised on the realization that the principles of the carbon-enhancement step can be applied to any feedstock in which it is desired to add carbon.

In some embodiments, a batch or continuous process for producing a biogenic reagent comprises:
  (a) providing a solid stream comprising a carbon-containing material;
  (b) providing a gas stream comprising condensable carbon-containing vapors, non-condensable carbon-containing gases, or a mixture of condensable carbon-containing vapors and non-condensable carbon-containing gases; and
  (c) passing the gas stream across the solid stream under suitable conditions to form a carbon-containing product with increased carbon content relative to the carbon-containing material.

In some embodiments, the starting carbon-containing material is pyrolyzed biomass or torrefied biomass. The gas stream can be obtained during an integrated process that provides the carbon-containing material. Or, the gas stream can be obtained from separate processing of the carbon-containing material. The gas stream, or a portion thereof, can be obtained from an external source (e.g., an oven at a lumber mill). Mixtures of gas streams, as well as mixtures of carbon-containing materials, from a variety of sources, are possible.

In some embodiments, the process further comprises recycling or reusing the gas stream for repeating the process to further increase carbon and/or energy content of the carbon-containing product. In some embodiments, the process further comprises recycling or reusing the gas stream for carrying out the process to increase carbon and/or energy content of another feedstock different from the carbon-containing material.

In some embodiments, the process further includes introducing the gas stream to a separation unit configured to generate at least first and second output streams, wherein the gas stream comprises a mixture of condensable carbon-containing vapors and non-condensable carbon-containing gases. The first and second output streams can be separated based on relative volatility, relative polarity, or any other property. The gas stream can be obtained from separate processing of the carbon-containing material.

In some embodiments, the process further comprises recycling or reusing the gas stream for repeating the process to further increase carbon content of the carbon-containing product. In some embodiments, the process further comprises recycling or reusing the gas stream for carrying out the process to increase carbon content of another feedstock.

The carbon-containing product may have an increased total carbon content, a higher fixed carbon content, a higher volatile carbon content, a higher energy content, or any combination thereof, relative to the starting carbon-containing material.

In related variations, a biogenic reagent production system comprises:
(a) a feeder configured to introduce a carbon-containing feedstock;
(b) an optional dryer, disposed in operable communication with the feeder, configured to remove moisture contained within a carbon-containing feedstock;
(c) a multiple-zone reactor, disposed in operable communication with the dryer, wherein the multiple-zone reactor contains at least a pyrolysis zone disposed in operable communication with a spatially separated cooling zone, and wherein the multiple-zone reactor is configured with an outlet to remove condensable vapors and non-condensable gases from solids;
(d) a solids cooler, disposed in operable communication with the multiple-zone reactor;
(e) a material-enrichment unit, disposed in operable communication with the solids cooler, configured to pass the condensable vapors and/or the non-condensable gases across the solids, to form enhanced solids with increased carbon content; and
(f) a biogenic reagent recovery unit, disposed in operable communication with the material-enrichment unit.

The system may further comprise a preheating zone, disposed in operable communication with the pyrolysis zone. In some embodiments, the dryer is configured as a drying zone within the multiple-zone reactor. Each of the zones can be located within a single unit or in separate units. Also, the solids cooler can be disposed within the multiple-zone reactor.

In some embodiments, the cooling zone is configured with a gas inlet, and the pyrolysis zone is configured with a gas outlet, to generate substantially countercurrent flow of the gas phase relative to the solid phase. In these or other embodiments, the preheating zone and/or the drying zone (or dryer) is configured with a gas outlet, to generate substantially countercurrent flow of the gas phase relative to the solid phase.

In particular embodiments, the system incorporates a material-enrichment unit that comprises:
(i) a housing with an upper portion and a lower portion;
(ii) an inlet at a bottom of the lower portion of the housing configured to carry the condensable vapors and non-condensable gases;
(iii) an outlet at a top of the upper portion of the housing configured to carry a concentrated gas stream derived from the condensable vapors and non-condensable gases;
(iv) a path defined between the upper portion and the lower portion of the housing; and
(v) a transport system following the path, the transport system configured to transport the solids, wherein the housing is shaped such that the solids adsorb at least some of the condensable vapors and/or at least some of the non-condensable gases.

The present invention is capable of producing a variety of compositions useful as biogenic reagents, and products incorporating such reagents. In some variations, a biogenic reagent is produced by any process disclosed herein, such as a process comprising the steps of:
(a) providing a carbon-containing feedstock comprising biomass;
(b) optionally drying the feedstock to remove at least a portion of moisture contained within the feedstock;
(c) optionally deaerating the feedstock to remove at least a portion of interstitial oxygen, if any, contained with the feedstock;
(d) in a pyrolysis zone, pyrolyzing the feedstock in the presence of a substantially inert gas for at least 10 minutes and with a pyrolysis temperature selected from about 250° C. to about 700° C., to generate hot pyrolyzed solids, condensable vapors, and non-condensable gases;
(e) separating at least a portion of the condensable vapors and at least a portion of the non-condensable gases from the hot pyrolyzed solids;
(f) in a cooling zone, cooling the hot pyrolyzed solids, in the presence of the substantially inert gas for at least 5 minutes and with a cooling temperature less than the pyrolysis temperature, to generate warm pyrolyzed solids;
(g) cooling the warm pyrolyzed solids to generate cool pyrolyzed solids; and
(h) recovering a biogenic reagent comprising at least a portion of the cool pyrolyzed solids.

In some embodiments, the reagent comprises about at least 70 wt %, at least 80 wt %, at least 90 wt %, or at least 95 wt % total carbon on a dry basis. The total carbon includes at least fixed carbon, and may further include carbon from volatile matter. In some embodiments, carbon from volatile matter is about at least 5%, at least 10%, at least 25%, or at least 50% of the total carbon present in the biogenic reagent. Fixed carbon can be measured using ASTM D3172, while volatile carbon can be measured using ASTM D3175, for example.

The biogenic reagent may comprise about 10 wt % or less, such as about 5 wt % or less, hydrogen on a dry basis. The biogenic reagent may comprise about 1 wt % or less, such as about 0.5 wt % or less, nitrogen on a dry basis. The biogenic reagent may comprise about 0.5 wt % or less, such as about 0.2 wt % or less, phosphorus on a dry basis. The biogenic reagent may comprise about 0.2 wt % or less, such as about 0.1 wt % or less, sulfur on a dry basis.

Carbon, hydrogen, and nitrogen can be measured using ASTM D5373 for ultimate analysis, for example. Oxygen can be measured using ASTM D3176, for example. Sulfur can be measured using ASTM D3177, for example.

Certain embodiments provide reagents with little or essentially no hydrogen (except from any moisture that can be present), nitrogen, phosphorus, or sulfur, and are substantially carbon plus any ash and moisture present. Therefore, some embodiments provide a biogenic reagent with up to and including 100% carbon, on a dry/ash-free (DAF) basis.

Generally speaking, feedstocks such as biomass contain non-volatile species, including silica and various metals, which are not readily released during pyrolysis. It is of course possible to utilize ash-free feedstocks, in which case there should not be substantial quantities of ash in the pyrolyzed solids. Ash can be measured using ASTM D3174, for example.

Various amounts of non-combustible matter, such as ash, can be present. The biogenic reagent may comprise about 10 wt % or less, such as about 5 wt %, about 2 wt %, about 1 wt % or less non-combustible matter on a dry basis. In certain embodiments, the reagent contains little ash, or even essentially no ash or other non-combustible matter. Therefore, some embodiments provide essentially pure carbon, including 100% carbon, on a dry basis.

Various amounts of moisture can be present. On a total mass basis, the biogenic reagent may comprise at least 1 wt %, 2 wt %, 5 wt %, 10 wt %, 15 wt %, 25 wt %, 35 wt %, 50 wt %, or more moisture. As intended herein, "moisture" is to be construed as including any form of water present in the biogenic reagent, including absorbed moisture, adsorbed water molecules, chemical hydrates, and physical hydrates. The equilibrium moisture content may vary at least with the local environment, such as the relative humidity. Also, moisture may vary during transportation, preparation for use, and other logistics. Moisture can be measured using ASTM D3173, for example.

The biogenic reagent may have various energy contents which for present purposes means the energy density based on the higher heating value associated with total combustion of the bone-dry reagent. For example, the biogenic reagent may possess an energy content of about at least 11,000 Btu/lb, at least 12,000 Btu/lb, at least 13,000 Btu/lb, at least 14,000 Btu/lb, or at least 15,000 Btu/lb. In certain embodiments, the energy content is between about 14,000-15,000 Btu/lb. The energy content can be measured using ASTM D5865, for example.

The biogenic reagent can be formed into a powder, such as a coarse powder or a fine powder. For example, the reagent can be formed into a powder with an average mesh size of about 200 mesh, about 100 mesh, about 50 mesh, about 10 mesh, about 6 mesh, about 4 mesh, or about 2 mesh, in embodiments.

In some embodiments, the biogenic reagent is formed into structural objects comprising pressed, binded, or agglomerated particles. The starting material to form these objects can be a powder form of the reagent, such as an intermediate obtained by particle-size reduction. The objects can be formed by mechanical pressing or other forces, optionally with a binder or other means of agglomerating particles together.

In some embodiments, the biogenic reagent is produced in the form of structural objects whose structure substantially derives from the feedstock. For example, feedstock chips may produce product chips of biogenic reagent. Or, feedstock cylinders may produce biogenic reagent cylinders, which can be somewhat smaller but otherwise maintain the basic structure and geometry of the starting material.

A biogenic reagent according to the present invention can be produced as, or formed into, an object that has a minimum dimension of at least about 1 cm, 2 cm, 3 cm, 4 cm, 5 cm, 6 cm, 7 cm, 8 cm, 9 cm, 10 cm, or higher. In various embodiments, the minimum dimension or maximum dimension can be a length, width, or diameter.

Other variations of the invention relate to the incorporation of additives into the process, into the product, or both. In some embodiments, the biogenic reagent includes at least one process additive incorporated during the process. In these or other embodiments, the reagent includes at least one product additive introduced to the reagent following the process.

In some embodiments, a biogenic reagent comprises, on a dry basis:
70 wt % or more total carbon;
5 wt % or less hydrogen;
1 wt % or less nitrogen;
0.5 wt % or less phosphorus;
0.2 wt % or less sulfur; and
an additive selected from a metal, a metal oxide, a metal hydroxide, a metal halide, or a combination thereof.

The additive can be selected from, but is by no means limited to, magnesium, manganese, aluminum, nickel, chromium, silicon, boron, cerium, molybdenum, phosphorus, tungsten, vanadium, iron chloride, iron bromide, magnesium oxide, dolomite, dolomitic lime, fluorite, fluorospar, bentonite, calcium oxide, lime, and combinations thereof.

In some embodiments, a biogenic reagent comprises, on a dry basis:
70 wt % or more total carbon;
5 wt % or less hydrogen;
1 wt % or less nitrogen;
0.5 wt % or less phosphorus;
0.2 wt % or less sulfur; and
an additive selected from an acid, a base, or a salt thereof.

The additive can be selected from, but is by no means limited to, sodium hydroxide, potassium hydroxide, magnesium oxide, hydrogen bromide, hydrogen chloride, sodium silicate, potassium permanganate, or combinations thereof.

In certain embodiments, a biogenic reagent comprises, on a dry basis:
70 wt % or more total carbon;
5 wt % or less hydrogen;
1 wt % or less nitrogen;
0.5 wt % or less phosphorus;
0.2 wt % or less sulfur;
a first additive selected from a metal, metal oxide, metal hydroxide, a metal halide, or a combination thereof; and
a second additive selected from an acid, a base, or a salt thereof,
wherein the first additive is different from the second additive.

The first additive can be selected from magnesium, manganese, aluminum, nickel, chromium, silicon, boron, cerium, molybdenum, phosphorus, tungsten, vanadium, iron chloride, iron bromide, magnesium oxide, dolomite, dolomitic lime, fluorite, fluorospar, bentonite, calcium oxide, lime, and combinations thereof, while the second additive can be independently selected from sodium hydroxide, potassium hydroxide, magnesium oxide, hydrogen bromide, hydrogen chloride, sodium silicate, potassium permanganate, or combinations thereof.

In some embodiments, the biogenic reagent consists essentially of, on a dry basis, carbon, hydrogen, nitrogen, phosphorus, sulfur, non-combustible matter, and an additive selected from the group consisting of magnesium, manganese, aluminum, nickel, chromium, silicon, boron, cerium, molybdenum, phosphorus, tungsten, vanadium, iron chloride, iron bromide, magnesium oxide, dolomite, dolomitic lime, fluorite, fluorospar, bentonite, calcium oxide, lime, and combinations thereof.

In some embodiments, the biogenic reagent consists essentially of, on a dry basis, carbon, hydrogen, nitrogen, phosphorus, sulfur, non-combustible matter, and an additive selected from the group consisting of sodium hydroxide, potassium hydroxide, magnesium oxide, hydrogen bromide, hydrogen chloride, sodium silicate, and combinations thereof.

The amount of additive (or total additives) may vary widely, such as from about 0.01 wt % to about 25 wt %, including about 0.1 wt %, about 1 wt %, about 5 wt %, about 10 wt %, or about 20 wt %. It will be appreciated then when relatively large amounts of additives are incorporated, such as higher than about 1 wt %, there will be a reduction in energy content calculated on the basis of the total reagent weight (inclusive of additives). Still, in various embodiments, the biogenic reagent with additive(s) may possess an energy content of about at least 11,000 Btu/lb, at least 12,000 Btu/lb, at least 13,000 Btu/lb, at least 14,000 Btu/lb, or at least 15,000 Btu/lb.

The above discussion regarding product form applies also to embodiments that incorporate additives. In fact, certain embodiments incorporate additives as binding agents, fluxing agents, or other modifiers to enhance final properties for a particular application.

In preferred embodiments, the majority of carbon contained in the biogenic reagent is classified as renewable carbon. In some embodiments, substantially all of the carbon is classified as renewable carbon. There can be certain market mechanisms (e.g., Renewable Identification Numbers, tax credits, etc.) wherein value is attributed to the renewable carbon content within the biogenic reagent.

In certain embodiments, the fixed carbon can be classified as non-renewable carbon (e.g., from coal) while the volatile carbon, which can be added separately, can be renewable carbon to increase not only energy content but also renewable carbon value.

The biogenic reagents produced as described herein is useful for a wide variety of carbonaceous products. The biogenic reagent can be a desirable market product itself. Biogenic reagents as provided herein are associated with lower levels of impurities, reduced process emissions, and improved sustainability (including higher renewable carbon content) compared to the state of the art.

In variations, a product includes any of the biogenic reagents that can be obtained by the disclosed processes, or that are described in the compositions set forth herein, or any portions, combinations, or derivatives thereof.

Generally speaking, the biogenic reagents can be combusted to produce energy (including electricity and heat); partially oxidized, gasified, or steam-reformed to produce syngas; utilized for their adsorptive or absorptive properties; utilized for their reactive properties during metal refining (such as reduction of metal oxides) or other industrial processing; or utilized for their material properties in carbon steel and various other metal alloys. Essentially, the biogenic reagents can be utilized for any market application of carbon-based commodities or advanced materials, including specialty uses to be developed.

Prior to suitability or actual use in any product applications, the disclosed biogenic reagents can be analyzed, measured, and optionally modified (such as through additives) in various ways. Some properties of potential interest, other than chemical composition and energy content, include density, particle size, surface area, microporosity, absorptivity, adsorptivity, binding capacity, reactivity, desulfurization activity, and basicity, to name a few properties.

Products or materials that may incorporate these biogenic reagents include, but are by no means limited to, carbon-based blast furnace addition products, carbon-based taconite pellet addition products, ladle addition carbon-based products, met coke carbon-based products, coal replacement products, carbon-based coking products, carbon breeze products, fluidized-bed carbon-based feedstocks, carbon-based furnace addition products, injectable carbon-based products, pulverized carbon-based products, stoker carbon-based products, carbon electrodes, or activated carbon products.

Use of the disclosed biogenic reagents in metals production can reduce slag, increase overall efficiency, and reduce lifecycle environmental impacts. Therefore, embodiments of this invention are particularly well-suited for metal processing and manufacturing.

Some variations of the invention utilize the biogenic reagents as carbon-based blast furnace addition products. A blast furnace is a type of metallurgical furnace used for smelting to produce industrial metals, such as (but not limited to) iron. Smelting is a form of extractive metallurgy; its main use is to produce a metal from its ore. Smelting uses heat and a chemical reducing agent to decompose the ore. The carbon and/or the carbon monoxide derived from the carbon removes oxygen from the ore, leaving behind elemental metal.

In some embodiments, the reducing agent comprises a biogenic reagent. In some embodiments, the reducing agent consists essentially of a biogenic reagent. In a blast furnace, a biogenic reagent, ore, and limestone can be continuously supplied through the top of the furnace, while air (optionally with oxygen enrichment) is blown into the bottom of the chamber, such that the chemical reactions take place throughout the furnace as the material moves downward. The end products comprise molten metal and slag phases tapped from the bottom, and flue gases exiting from the top of the furnace. The downward flow of the ore in contact with an upflow of hot, carbon monoxide-rich gases is a countercurrent process.

Carbon quality in the blast furnace is measured by its resistance to degradation. The role of the carbon as a permeable medium is crucial in economic blast furnace operation. The degradation of the carbon varies with the position in the blast furnace and involves the combination of reaction with $CO_2$, $H_2O$, or $O_2$ and the abrasion of carbon particles against each other and other components of the burden. Degraded carbon particles may cause plugging and poor performance.

The Coke Reactivity test is a highly regarded measure of the performance of carbon in a blast furnace. This test has two components: the Coke Reactivity Index (CRI) and the Coke Strength after Reaction (CSR). A carbon-based material with a low CRI value (high reactivity) and a high CSR value is preferable for better blast furnace performance. CRI can be determined according to any suitable method known in the art, for example by ASTM Method DS341 on an as-received basis.

In some embodiments, the biogenic reagent provides a carbon product having suitable properties for introduction directly into a blast furnace.

The strength of the biogenic reagent can be determined by any suitable method known in the art, for example by a drop-shatter test, or a CSR test. In some embodiments, the biogenic reagent, optionally when blended with another source of carbon, provides a final carbon product having CSR of at least about 50%, 60%, or 70%. A combination product may also provide a final coke product having a suitable reactivity for combustion in a blast furnace. In some embodiments, the product has a CRI such that the biogenic reagent is suitable for use as an additive or replacement for met coal, met coke, coke breeze, foundry coke, or injectable coal.

Some embodiments employ one or more additives in an amount sufficient to provide a biogenic reagent that, when added to another carbon source (e.g., coke) having a CRI or CSR insufficient for use as a blast furnace product, provides a composite product with a CRI and/or CSR sufficient for use in a blast furnace. In some embodiments, one or more additives are present in an amount sufficient to provide a biogenic reagent having a CRI of not more than about 40%, 30%, or 20%.

In some embodiments, one or more additives selected from the alkaline earth metals, or oxides or carbonates thereof, are introduced during or after the process of producing a biogenic reagent. For example, calcium, calcium oxide, calcium carbonate, magnesium oxide, or magnesium carbonate can be introduced as additives. The addition of these molecules before, during, or after pyrolysis may increase the reactivity of the biogenic reagent in a blast furnace. These molecules may lead to stronger materials, i.e. higher CSR, thereby improving blast-furnace efficiency. In addition, additives such as those selected from the alkaline earth metals, or oxides or carbonates thereof, may lead to lower emissions (e.g., $SO_2$).

In some embodiments, a blast furnace replacement product is a biogenic reagent according to the present invention comprising at least about 55 wt % carbon, not more than about 0.5 wt % sulfur, not more than about 8 wt % non-combustible material, and a heat value of at least about 11,000 Btu per pound. In some embodiments, the blast furnace replacement product further comprises not more than about 0.035 wt % phosphorous, about 0.5 wt % to about 50 wt % volatile matter, and optionally one or more additives. In some embodiments, the blast furnace replacement product comprises about 2 wt % to about 15 wt % dolomite, about 2 wt % to about 15 wt % dolomitic lime, about 2 wt % to about 15 wt % bentonite, and/or about 2 wt % to about 15 wt % calcium oxide. In some embodiments, the blast furnace replacement product has dimensions substantially in the range of about 1 cm to about 10 cm.

In some embodiments, a biogenic reagent according to the present invention is useful as a foundry coke replacement product. Foundry coke is generally comprises a carbon content of at least about 85 wt %, a sulfur content of about 0.6 wt %, not more than about 1.5 wt % volatile matter, not more than about 13 wt % ash, not more than about 8 wt % moisture, about 0.035 wt % phosphorus, a CRI value of about 30, and dimensions ranging from about 5 cm to about 25 cm.

Some variations of the invention utilize the biogenic reagents as carbon-based taconite pellet addition products. The ores used in making iron and steel are iron oxides. Major iron oxide ores include hematite, limonite (also called brown ore), taconite, and magnetite, a black ore. Taconite is a low-grade but important ore, which contains both magnetite and hematite. The iron content of taconite is generally 25 wt % to 30 wt %. Blast furnaces typically require at least a 50 wt % iron content ore for efficient operation. Iron ores may undergo beneficiation including crushing, screening, tumbling, flotation, and magnetic separation. The refined ore is enriched to over 60% iron and is often formed into pellets before shipping.

For example, taconite can be ground into a fine powder and combined with a binder such as bentonite clay and limestone. Pellets about one centimeter in diameter can be formed, containing approximately 65 wt % iron, for example. The pellets are fired, oxidizing magnetite to hematite. The pellets are durable which ensures that the blast furnace charge remains porous enough to allow heated gas to pass through and react with the pelletized ore.

The taconite pellets can be fed to a blast furnace to produce iron, as described above with reference to blast furnace addition products. In some embodiments, a biogenic reagent is introduced to the blast furnace. In these or other embodiments, a biogenic reagent is incorporated into the taconite pellet itself. For example, taconite ore powder, after beneficiation, can be mixed with a biogenic reagent and a binder and rolled into small objects, then baked to hardness. In such embodiments, taconite-carbon pellets with the appropriate composition may conveniently be introduced into a blast furnace without the need for a separate source of carbon.

Some variations of the invention utilize the biogenic reagents as ladle addition carbon-based products. A ladle is a vessel used to transport and pour out molten metals. Casting ladles are used to pour molten metal into molds to produce the casting. Transfers ladle are used to transfer a large amount of molten metal from one process to another. Treatment ladles are used for a process to take place within the ladle to change some aspect of the molten metal, such as the conversion of cast iron to ductile iron by the addition of various elements into the ladle.

Biogenic reagents can be introduced to any type of ladle, but typically carbon will be added to treatment ladles in suitable amounts based on the target carbon content. Carbon injected into ladles can be in the form of fine powder, for good mass transport of the carbon into the final composition. In some embodiments, a biogenic reagent according to the present invention, when used as a ladle addition product, has a minimum dimension of about 0.5 cm, such as about 0.75 cm, about 1 cm, about 1.5 cm, or higher.

In some embodiments, a high carbon biogenic reagent according to the present invention is useful as a ladle addition carbon additive at, for example, basic oxygen furnace or electric arc furnace facilities wherever ladle addition of carbon would be used (e.g., added to ladle carbon during steel manufacturing).

In some embodiments, the ladle addition carbon additive additionally comprises up to about 5 wt % manganese, up to about 5 wt % calcium oxide, and/or up to about 5 wt % dolomitic lime.

Direct-reduced iron (DRI), also called sponge iron, is produced from direct reduction of iron ore (in the form of lumps, pellets, or fines) by a reducing gas conventionally produced from natural gas or coal. The reducing gas is typically syngas, a mixture of hydrogen and carbon monoxide which acts as reducing agent. The biogenic reagent as provided herein can be converted into a gas stream comprising CO, to act as a reducing agent to produce direct-reduced iron.

Iron nuggets are a high-quality steelmaking and iron-casting feed material. Iron nuggets are essentially all iron and carbon, with almost no gangue (slag) and low levels of metal residuals. They are a premium grade pig iron product with superior shipping and handling characteristics. The carbon contained in iron nuggets, or any portion thereof, can be the biogenic reagent provided herein. Iron nuggets can be produced through the reduction of iron ore in a rotary hearth furnace, using a biogenic reagent as the reductant and energy source.

Some variations of the invention utilize the biogenic reagents as metallurgical coke carbon-based products. Metallurgical coke, also known as "met" coke, is a carbon material normally manufactured by the destructive distillation of various blends of bituminous coal. The final solid is a non-melting carbon called metallurgical coke. As a result of the loss of volatile gases and of partial melting, met coke has an open, porous morphology. Met coke has a very low volatile content. However, the ash constituents, that were part of the original bituminous coal feedstock, remain encapsulated in the resultant coke. Met coke feedstocks are available in a wide range of sizes from fine powder to basketball-sized lumps. Typical purities range from 86-92 wt % fixed carbon.

Metallurgical coke is used where a high-quality, tough, resilient, wearing carbon is required. Applications include, but are not limited to, conductive flooring, friction materials (e.g., carbon linings), foundry coatings, foundry carbon raiser, corrosion materials, drilling applications, reducing agents, heat-treatment agents, ceramic packing media, electrolytic processes, and oxygen exclusion.

Met coke generally comprises a heat value of about 10,000 to 14,000 Btu per pound and an ash content of about 10 wt % or greater. Thus, in some embodiments, a met coke replacement product comprises a biogenic reagent according to the present invention comprising at least about 80 wt %, 85 wt %, or 90 wt % carbon, not more than about 0.8 wt % sulfur, not more than about 3 wt % volatile matter, not more than about 15 wt % ash, not more than about 13 wt % moisture, and not more than about 0.035 wt % phosphorus. A biogenic reagent according to the present invention, when used as a met coke replacement product, may have a size range from about 2 cm to about 15 cm, for example.

In some embodiments, the met coke replacement product further comprises an additive such as chromium, nickel, manganese, magnesium oxide, silicon, aluminum, dolomite, fluorospar, calcium oxide, lime, dolomitic lime, bentonite and combinations thereof.

Some variations of the invention utilize the biogenic reagents as coal replacement products. Any process or system using coal can in principle be adapted to use a biogenic reagent.

In some embodiments, a biogenic reagent is combined with one or more coal-based products to form a composite product having a higher rank than the coal-based product(s) and/or having fewer emissions, when burned, than the pure coal-based product.

For example, a low-rank coal such as sub-bituminous coal can be used in applications normally calling for a higher-rank coal product, such as bituminous coal, by combining a selected amount of a biogenic reagent according to the present invention with the low-rank coal product. In other embodiments, the rank of a mixed coal product (e.g., a combination of a plurality of coals of different rank) can be improved by combining the mixed coal with some amount of biogenic reagent. The amount of a biogenic reagent to be mixed with the coal product(s) may vary depending on the rank of the coal product(s), the characteristics of the biogenic reagent (e.g., carbon content, heat value, etc.) and the desired rank of the final combined product.

For example, anthracite coal can have at least about 80 wt % carbon, about 0.6 wt % sulfur, about 5 wt % volatile matter, up to about 15 wt % ash, up to about 10 wt % moisture, and a heat value of about 12,494 Btu/lb. In some embodiments, an anthracite coal replacement product is a biogenic reagent comprising at least about 80 wt % carbon, not more than about 0.6 wt % sulfur, not more than about 15 wt % ash, and a heat value of at least about 12,000 Btu/lb.

In some embodiments, a biogenic reagent is useful as a thermal coal replacement product. Thermal coal products generally can have high sulfur levels, high phosphorus levels, high ash content, and heat values of up to about 15,000 Btu/lb. In some embodiments, a thermal coal replacement product is a biogenic reagent comprising not more than about 0.5 wt % sulfur, not more than about 4 wt % ash, and a heat value of at least about 12,000 Btu/lb.

Some variations of the invention utilize the biogenic reagents as carbon-based coking products. Any coking process or system can be adapted to use biogenic reagents to produce coke, or use it as a coke feedstock.

In some embodiments, a biogenic reagent is useful as a thermal coal or coke replacement product. In some embodiments, the thermal coal or coke replacement product comprises a biogenic reagent comprising at least about 50 wt % carbon, at most about 8 wt % ash, at most about 0.5 wt % sulfur, and a heat value of at least about 11,000 Btu/lb. In some embodiments, the thermal coke replacement product further comprises about 0.5 wt % to about 50 wt % volatile matter. In some embodiments, the thermal coal or coke replacement product comprises at least about 0.4 wt % to at most about 15 wt % moisture.

In some embodiments, a biogenic reagent is useful as a petroleum (pet) coke or calcine pet coke replacement product. Calcine pet coke generally can have at least about 66 wt % carbon, up to 4.6 wt % sulfur, up to about 5.5 wt % volatile matter, up to about 19.5 wt % ash, and up to about 2 wt % moisture, and is typically sized at about 3 mesh or less. In some embodiments, the calcine pet coke replacement product is a biogenic reagent comprising at least about 66 wt % carbon, not more than about 4.6 wt % sulfur, not more than about 19.5 wt % ash, not more than about 2 wt % moisture, and is sized at about 3 mesh or less.

In some embodiments, a biogenic reagent is useful as a coking carbon replacement carbon (e.g., co-fired with metallurgical coal in a coking furnace). In one embodiment, a coking carbon replacement product is a biogenic reagent comprising at least about 55 wt % carbon, not more than about 0.5 wt % sulfur, not more than about 8 wt % non-combustible material, and a heat value of at least about 11,000 Btu per pound. In some embodiments, the coking carbon replacement product comprises about 0.5 wt % to about 50 wt % volatile matter, and/or one or more additives.

Some variations of the invention utilize the biogenic reagents as carbon breeze products, which typically have very fine particle sizes such as 6 mm, 3 mm, 2 mm, 1 mm, or smaller. In some embodiments, a biogenic reagent according to the present invention is useful as a coke breeze replacement product. Coke breeze generally can have a maximum dimension of not more than about 6 mm, a carbon content of at least about 80 wt %, 0.6 to 0.8 wt % sulfur, 1% to 20 wt % volatile matter, up to about 13 wt % ash, and up to about 13 wt % moisture. In some embodiments, a coke breeze replacement product is a biogenic reagent according to the present invention comprising at least about 80 wt % carbon, not more than about 0.8 wt % sulfur, not more than about 20 wt % volatile matter, not more than about 13 wt % ash, not more than about 13 wt % moisture, and a maximum dimension of about 6 mm.

In some embodiments, a biogenic reagent is useful as a carbon breeze replacement product during, for example, taconite pellet production or in an iron-making process.

Some variations utilize the biogenic reagents as feedstocks for various fluidized beds, or as fluidized-bed carbon-based feedstock replacement products. The carbon can be employed in fluidized beds for total combustion, partial oxidation, gasification, steam reforming, or the like. The carbon can be primarily converted into syngas for various downstream uses, including production of energy (e.g., combined heat and power), or liquid fuels (e.g., methanol or Fischer-Tropsch diesel fuels).

In some embodiments, a biogenic reagent according to the present invention is useful as a fluidized-bed coal replacement product in, for example, fluidized bed furnaces wherever coal would be used (e.g., for process heat or energy production).

Some variations utilize the biogenic reagents as carbon-based furnace addition products. Coal-based carbon furnace addition products generally can have high sulfur levels, high phosphorus levels, and high ash content, which contribute to degradation of the metal product and create air pollution. In some embodiments, a carbon furnace addition replacement product comprising a biogenic reagent comprises not more than about 0.5 wt % sulfur, not more than about 4 wt % ash, not more than about 0.03 wt % phosphorous, and a maximum dimension of about 7.5 cm. In some embodiments, the carbon furnace addition replacement product replacement product comprises about 0.5 wt % to about 50 wt % volatile matter and about 0.4 wt % to about 15 wt % moisture.

In some embodiments, a biogenic reagent is useful as a furnace addition carbon additive at, for example, basic oxygen furnace or electric arc furnace facilities wherever furnace addition carbon would be used. For example, furnace addition carbon can be added to scrap steel during steel manufacturing at electric-arc furnace facilities). For electric-arc furnace applications, high-purity carbon is desired so that impurities are not introduced back into the process following earlier removal of impurities.

In some embodiments, a furnace addition carbon additive is a biogenic reagent comprising at least about 80 wt % carbon, not more than about 0.5 wt % sulfur, not more than about 8 wt % non-combustible material, and a heat value of at least about 11,000 Btu per pound. In some embodiments, the furnace addition carbon additive further comprises up to about 5 wt % manganese, up to about 5 wt % fluorospar, about 5 wt % to about 10 wt % dolomite, about 5 wt % to about 10 wt % dolomitic lime, and/or about 5 wt % to about 10 wt % calcium oxide.

Some variations utilize the biogenic reagents as stoker furnace carbon-based products. In some embodiments, a biogenic reagent according to the present invention is useful as a stoker coal replacement product at, for example, stoker furnace facilities wherever coal would be used (e.g., for process heat or energy production).

Some variations utilize the biogenic reagents as injectable (e.g., pulverized) carbon-based materials. In some embodiments, a biogenic reagent is useful as an injection-grade calcine pet coke replacement product. Injection-grade calcine pet coke generally can have at least about 66 wt % carbon, about 0.55 to about 3 wt % sulfur, up to about 5.5 wt % volatile matter, up to about 10 wt % ash, up to about 2 wt % moisture, and is sized at about 6 mesh or less. In some embodiments, a calcine pet coke replacement product is a biogenic reagent comprising at least about 66 wt % carbon, not more than about 3 wt % sulfur, not more than about 10 wt % ash, not more than about 2 wt % moisture, and is sized at about 6 mesh or less.

In some embodiments, a biogenic reagent is useful as an injectable carbon replacement product at, for example, basic oxygen furnace or electric arc furnace facilities in any application where injectable carbon would be used (e.g., injected into slag or ladle during steel manufacturing).

In some embodiments, a biogenic reagent is useful as a pulverized carbon replacement product, for example, wherever pulverized coal would be used (e.g., for process heat or energy production). In some embodiments, the pulverized coal replacement product comprises up to about 10 percent calcium oxide.

Some variations utilize the biogenic reagents as carbon addition product for metals production. In some embodiments, a biogenic reagent according to the present invention is useful as a carbon addition product for production of carbon steel or another metal alloy comprising carbon. Coal-based late-stage carbon addition products generally can have high sulfur levels, high phosphorous levels, and high ash content, and high mercury levels which degrade metal quality and contribute to air pollution. In some embodiments of this invention, the carbon addition product comprises not more than about 0.5 wt % sulfur, not more than about 4 wt % ash, not more than about 0.03 wt % phosphorus, a minimum dimension of about 1 to 5 mm, and a maximum dimension of about 8 to 12 mm.

Some variations utilize the biogenic reagents within carbon electrodes. In some embodiments, a biogenic reagent is useful as an electrode (e.g. anode) material suitable for use, for example, in aluminum production.

Other uses of the biogenic reagent in carbon electrodes include applications in batteries, fuel cells, capacitors, and other energy-storage or energy-delivery devices. For example, in a lithium-ion battery, the biogenic reagent can be used on the anode side to intercalate lithium. In these applications, carbon purity and low ash can be very important.

Some variations of the invention utilize the biogenic reagents as catalyst supports. Carbon is a known catalyst support in a wide range of catalyzed chemical reactions, such as mixed-alcohol synthesis from syngas using sulfided cobalt-molybdenum metal catalysts supported on a carbon phase, or iron-based catalysts supported on carbon for Fischer-Tropsch synthesis of higher hydrocarbons from syngas.

Some variations utilize the biogenic reagents as activated carbon products. Activated carbon is used in a wide variety of liquid and gas-phase applications, including water treatment, air purification, solvent vapor recovery, food and beverage processing, and pharmaceuticals. For activated carbon, the porosity and surface area of the material are generally important. The biogenic reagent provided herein may provide a superior activated carbon product, in various embodiments, due to (i) greater surface area than fossil-fuel based activated carbon; (ii) carbon renewability; (iii) vascular nature of biomass feedstock in conjunction with additives better allows penetration/distribution of additives that enhance pollutant control; and (iv) less inert material (ash) leads to greater reactivity.

It should be recognized that in the above description of market applications of biogenic reagents, the described applications are not exclusive, nor are they exhaustive. Thus a biogenic reagent that is described as being suitable for one type of carbon product can be suitable for any other application described, in various embodiments. These applications are exemplary only, and there are other applications of biogenic reagents.

In addition, in some embodiments, the same physical material can be used in multiple market processes, either in an integrated way or in sequence. Thus, for example, a biogenic reagent that is used as a carbon electrode or an activated carbon may, at the end of its useful life as a performance material, then be introduced to a combustion process for energy value or to a metal-making (e.g., metal ore reduction) process, etc.

Some embodiments may employ a biogenic reagent both for its reactive/adsorptive properties and also as a fuel. For example, a biogenic reagent injected into an emissions stream can be suitable to remove contaminants, followed by combustion of the biogenic reagent particles and possibly the contaminants, to produce energy and thermally destroy or chemically oxidize the contaminants.

Significant environmental and product use advantages can be associated with biogenic reagents, compared to conventional fossil-fuel-based products. The biogenic reagents can be not only environmentally superior, but also functionally superior from a processing standpoint because of greater purity, for example.

With regard to some embodiments of metals production, production of biogenic reagents with disclosed processes can result in significantly lower emissions of CO, $CO_2$, NON, $SO_2$, and hazardous air pollutants compared to the coking of coal-based products necessary to prepare them for use in metals production.

Use of biogenic reagents in place of coal or coke also significantly reduces environmental emissions of $SO_2$, hazardous air pollutants, and mercury.

Also, because of the purity of these biogenic reagents (including low ash content), the disclosed biogenic reagents have the potential to reduce slag and increase production capacity in batch metal-making processes.

In some embodiments, a biogenic reagent functions as an activated carbon. For example, the low fixed carbon material can be activated, the high fixed carbon material can be activated, or both materials can be activated such that the biocarbon composition (blend) functions as an activated carbon.

In certain embodiments, a portion of the biogenic reagent is recovered as an activated carbon product, while another portion (e.g., the remainder) of the biogenic reagent is pelletized with a binder to produce biocarbon pellets. In other embodiments, the biogenic reagent is pelletized with a binder to produce biocarbon pellets that are shipped for later conversion to an activated carbon product. The later conversion may include pulverizing back to a powder, and may also include chemical treatment with e.g. steam, acids, or bases. In these embodiments, the biocarbon pellets can be regarded as activated-carbon precursor pellets.

In certain embodiments, the fixed carbon within the biogenic reagent can be primarily used to make activated carbon while the volatile carbon within the biogenic reagent can be primarily used to make reducing gas. For example, at least 50 wt %, at least 90 wt %, or essentially all of the fixed carbon within the biogenic reagent generated in step (b) can be recovered as activated carbon in step (f), while, for example, at least 50 wt %, at least 90 wt %, or essentially all of the volatile carbon within the biogenic reagent generated in step (b) can be directed to the reducing gas (e.g., via steam-reforming reactions of volatile carbon to CO).

In some embodiments, the activated carbon comprises an Iodine Number of at least about 500, 750, 800, 1000, 1500, or 2000. In some embodiments, the activated carbon comprises a renewable carbon content of at least about 50%, at least about 60%, at least about 70%, at least about 80%, at least about 90%, or at least about 95%, as determined from a measurement of the $^{14}C/^{12}C$ isotopic ratio of the activated carbon. In some embodiments, the activated carbon consists essentially of renewable activated carbon as determined from a measurement of the $^{14}C/^{12}C$ isotopic ratio of the activated carbon.

In some embodiments, the pyrolysis reactor is configured for optimizing the production of different types of activated carbon. For example, reaction conditions (e.g., time, temperature, and steam concentration) can be selected for an activated carbon product with certain attributes such as Iodine Number. Different reaction conditions can be selected for a different activated carbon product, such as one with a higher Iodine Number. The pyrolysis reactor can be operated in a campaign mode to produce one product and then switched to another mode for another product. The first product may have been continuously or periodically removed during the first campaign, or can be removed prior to switching the reaction conditions of the pyrolysis reactor.

In some embodiments, the activated carbon comprises an Iodine Number of at least about 500, at least about 750, at least about 1000, at least about 1500, or at least about 2000. In some embodiments, the activated carbon comprises a renewable carbon content of at least about 90% as determined from a measurement of the $^{14}C/^{12}C$ isotopic ratio of the activated carbon. In some embodiments, the activated carbon consists essentially of renewable activated carbon as determined from a measurement of the $^{14}C/^{12}C$ isotopic ratio of the activated carbon.

Activated carbon produced by the processes disclosed herein can be used in a number of ways.

In some embodiments, the activated carbon is utilized internally at the process site to purify the one or more primary products. In some embodiments, the activated carbon is utilized at the site to purify water. In these or other embodiments, the activated carbon is utilized at the site to treat a liquid waste stream to reduce liquid-phase emissions and/or to treat a vapor waste stream to reduce air emissions. In some embodiments, the activated carbon is utilized as a soil amendment to assist generation of new biomass, which can be the same type of biomass utilized as local feedstock at the site.

Activated carbon prepared according to the processes disclosed herein may have the same or better characteristics as traditional fossil fuel-based activated carbon. In some embodiments, the activated carbon has a surface area that is comparable to, equal to, or greater than surface area associated with fossil fuel-based activated carbon. In some embodiments, the activated carbon can control pollutants as well as or better than traditional activated carbon products. In some embodiments, the activated carbon has an inert material (e.g., ash) level that is comparable to, equal to, or less than an inert material (e.g., ash) level associated with a traditional activated carbon product. In some embodiments, the activated carbon has a particle size and/or a particle size distribution that is comparable to, equal to, greater than, or less than a particle size and/or a particle size distribution associated with a traditional activated carbon product. In some embodiments, the activated carbon has a particle shape that is comparable to, substantially similar to, or the same as a particle shape associated with a traditional activated carbon product. In some embodiments, the activated carbon has a particle shape that is substantially different than a particle shape associated with a traditional activated carbon product.

In some embodiments, the activated carbon has a pore volume that is comparable to, equal to, or greater than a pore volume associated with a traditional activated carbon product. In some embodiments, the activated carbon has pore dimensions that are comparable to, substantially similar to, or the same as pore dimensions associated with a traditional activated carbon product. In some embodiments, the activated carbon has an attrition resistance of particles value that is comparable to, substantially similar to, or the same as an attrition resistance of particles value associated with a traditional activated carbon product. In some embodiments, the activated carbon has a hardness value that is comparable to, substantially similar to, or the same as a hardness value associated with a traditional activated carbon product. In some embodiments, the activated carbon has a bulk density value that is comparable to, substantially similar to, or the same as a bulk density value associated with a traditional activated carbon product. In some embodiments, the activated carbon product has an adsorptive capacity that is comparable to, substantially similar to, or the same as an adsorptive capacity associated with a traditional activated carbon product.

Prior to suitability or actual use in any product applications, the disclosed activated carbons can be analyzed, measured, and optionally modified (such as through additives) in various ways. Some properties of potential interest include density, particle size, surface area, microporosity, absorptivity, adsorptivity, binding capacity, reactivity, desulfurization activity, basicity, hardness, and Iodine Number.

Activated carbon is used commercially in a wide variety of liquid and gas-phase applications, including water treatment, air purification, solvent vapor recovery, food and beverage processing, sugar and sweetener refining, automotive uses, and pharmaceuticals. For activated carbon, key product attributes may include particle size, shape, composition, surface area, pore volume, pore dimensions, particle-size distribution, the chemical nature of the carbon surface and interior, attrition resistance of particles, hardness, bulk density, and adsorptive capacity.

The bulk density for the biogenic activated carbon can be from about 50 g/liter to about 650 g/liter, for example.

The surface area of the biogenic activated carbon may vary widely. Exemplary surface areas (e.g., BET surface areas) range from about 400 $m^2/g$ to about 2000 $m^2/g$ or higher, such as about 500 $m^2/g$, 600 $m^2/g$, 800 $m^2/g$, 1000 $m^2/g$, 1200 $m^2/g$, 1400 $m^2/g$, 1600 $m^2/g$, or 1800 $m^2/g$. Surface area generally correlates to adsorption capacity.

The pore-size distribution can be important to determine ultimate performance of the activated carbon. Pore-size measurements may include micropore content, mesopore content, and macropore content.

The Iodine Number is a parameter used to characterize activated carbon performance. The Iodine Number measures the degree of activation of the carbon, and is a measure of micropore (e.g., 0-20 Å) content. It is an important measurement for liquid-phase applications. Exemplary Iodine Numbers for activated carbon products produced by embodiments of the disclosure include about 500, 600, 750, 900, 1000, 1100, 1200, 1300, 1500, 1600, 1750, 1900, 2000, 2100, and 2200, including all intervening ranges. The units of Iodine Number are milligram iodine per gram carbon.

Another pore-related measurement is Methylene Blue Number, which measures mesopore content (e.g., 20-500 Å). Exemplary Methylene Blue Numbers for activated carbon products produced by embodiments of the disclosure include about 100, 150, 200, 250, 300, 350, 400, 450, and 500, including all intervening ranges. The units of Methylene Blue Number are milligram methylene blue (methylthioninium chloride) per gram carbon.

Another pore-related measurement is Molasses Number, which measures macropore content (e.g., >500 Å). Exemplary Molasses Numbers for activated carbon products produced by embodiments of the disclosure include about 100, 150, 200, 250, 300, 350, and 400, including all intervening ranges. The units of Molasses Number are milligram molasses per gram carbon.

In some embodiments, the activated carbon comprises a mesopore volume of at least about 0.5 $cm^3/g$, such as at least about 1 $cm^3/g$, for example.

The activated carbon can be characterized by its water-holding capacity. In various embodiments, activated carbon products produced by embodiments of the disclosure have a water-holding capacity at 25° C. of about 10% to about 300% (water weight divided by weight of dry activated carbon), such as from about 50% to about 100%, e.g. about 60-80%.

Hardness or Abrasion Number is measure of activated carbon's resistance to attrition. It is an indicator of activated carbon's physical integrity to withstand frictional forces and mechanical stresses during handling or use. Some amount of hardness is desirable, but if the hardness is too high, excessive equipment wear can result. Exemplary Abrasion Numbers, measured according to ASTM D3802, range from about 1% to great than about 99%, such as about 1%, about 5%, about 10%, about 15%, about 20%, about 25%, about 30%, about 35%, about 40%, about 45%, about 50%, about 55%, 60%, about 65%, about 70%, about 75%, about 80%, about 85%, about 90%, about 95%, about 96%, about 97%, about 98%, about 99%, or greater than about 99%.

In some embodiments, an optimal range of hardness can be achieved in which the activated carbon is reasonably resistant to attrition but does not cause abrasion and wear in capital facilities that process the activated carbon. This optimum is made possible in some embodiments of this disclosure due to the selection of feedstock as well as processing conditions. In some embodiments in which the downstream use can handle high hardness, the process of this disclosure can be operated to increase or maximize hardness to produce biogenic activated carbon products having an Abrasion Number of about 75%, about 80%, about 85%, about 90%, about 95%, about 96%, about 97%, about 98%, about 99%, or greater than about 99%.

The biogenic activated carbon provided by the present disclosure has a wide range of commercial uses. For example, without limitation, the biogenic activated carbon can be utilized in emissions control, water purification, groundwater treatment, wastewater treatment, air stripper applications, PCB removal applications, odor removal applications, soil vapor extractions, manufactured gas plants, industrial water filtration, industrial fumigation, tank and process vents, pumps, blowers, filters, pre-filters, mist filters, ductwork, piping modules, adsorbers, absorbers, and columns.

In one embodiment, a method of using activated carbon to reduce emissions comprises:
 (a) providing activated carbon particles comprising a biogenic activated carbon composition recovered from the second reactor disclosed herein;
 (b) providing a gas-phase emissions stream comprising at least one selected contaminant;
 (c) providing an additive selected to assist in removal of the selected contaminant from the gas-phase emissions stream;

(d) introducing the activated carbon particles and the additive into the gas-phase emissions stream, to adsorb at least a portion of the selected contaminant onto the activated carbon particles, thereby generating contaminant-adsorbed carbon particles within the gas-phase emissions stream; and (e) separating at least a portion of the contaminant-adsorbed carbon particles from the gas-phase emissions stream, to produce a contaminant-reduced gas-phase emissions stream.

An additive for the biogenic activated carbon composition can be provided as part of the activated carbon particles. Alternatively, or additionally, an additive can be introduced directly into the gas-phase emissions stream, into a fuel bed, or into a combustion zone. Other ways of directly or indirectly introducing the additive into the gas-phase emissions stream for removal of the selected contaminant are possible, as will be appreciated by one of skill in the art.

In some embodiments, a selected contaminant (in the gas-phase emissions stream) comprises a metal. In some embodiments, the metal comprises mercury, boron, selenium, arsenic, a salt thereof, or a combination thereof. In some embodiments, the selected contaminant comprises a hazardous air pollutant, an organic molecule (such as a volatile organic compound, or "VOC"), or a non-condensable gas. In some embodiments, a biogenic activated carbon product adsorbs, absorbs, or chemisorbs a contaminant in greater amounts than a comparable amount of a non-biogenic activated carbon product. In some embodiments, the contaminant is a metal, a hazardous air pollutant, an organic molecule (such as a VOC), a non-condensable gas, or a combination thereof. In some embodiments, the contaminant comprises mercury. In some embodiments, the contaminant comprises a VOCs. In some embodiments, the biogenic activated carbon comprises at least about 1 wt % hydrogen or at least about 10 wt % oxygen.

Hazardous air pollutants are those pollutants that cause or may cause cancer or other serious health effects, such as reproductive effects or birth defects, or adverse environmental and ecological effects. Section 112 of the Clean Air Act, as amended, is incorporated by reference herein in its entirety. Pursuant to the Section 112 of the Clean Air Act, the United States Environmental Protection Agency (EPA) is mandated to control 189 hazardous air pollutants. Any current or future molecules classified as hazardous air pollutants by the EPA are included in possible selected contaminants in the present context.

Volatile organic molecules, some of which are also hazardous air pollutants, are organic chemicals that have a high vapor pressure at ordinary, room-temperature conditions. Examples include short-chain alkanes, olefins, alcohols, ketones, and aldehydes. Many volatile organic molecules are dangerous to human health or cause harm to the environment. EPA regulates volatile organic molecules in air, water, and land. EPA's definition of volatile organic molecules is described in 40 CFR Section 51.100, which is incorporated by reference herein in its entirety.

Non-condensable gases are gases that do not condense under ordinary, room-temperature conditions. Non-condensable gas may include, but are not limited to, nitrogen oxides, carbon monoxide, carbon dioxide, hydrogen sulfide, sulfur dioxide, sulfur trioxide, methane, ethane, ethylene, ozone, ammonia, or combinations thereof.

Multiple contaminants can be removed by the disclosed activated carbon particles. In some embodiments, the contaminant-adsorbed carbon particles include at least two contaminants, at least three contaminants, or more. The activated carbon as disclosed herein can allow multi-pollutant control as well as control of certain targeted pollutants (e.g. selenium).

In some embodiments, contaminant-adsorbed carbon particles are treated to regenerate activated carbon particles. In some embodiments, the method includes thermally oxidizing the contaminant-adsorbed carbon particles. The contaminant-adsorbed carbon particles, or a regenerated form thereof, can be combusted to provide energy.

In some embodiments, an additive for activated carbon is selected from an acid, a base, a salt, a metal, a metal oxide, a metal hydroxide, a metal halide, or a combination thereof. In some embodiments, the additive comprises magnesium, manganese, aluminum, nickel, iron, chromium, silicon, boron, cerium, molybdenum, phosphorus, tungsten, vanadium, iron chloride, iron bromide, magnesium oxide, dolomite, dolomitic lime, fluorite, fluorospar, bentonite, calcium oxide, lime, sodium hydroxide, potassium hydroxide, hydrogen bromide, hydrogen chloride, sodium silicate, potassium permanganate, organic acids (e.g., citric acid), or a combination thereof.

In some embodiments, the gas-phase emissions stream is derived from metals processing, such as the processing of high-sulfur-content metal ores.

As an exemplary embodiment relating to mercury control, activated carbon can be injected (such as into the ductwork) upstream of a particulate matter control device, such as an electrostatic precipitator or fabric filter. In some cases, a flue gas desulfurization (dry or wet) system can be downstream of the activated carbon injection point. The activated carbon can be pneumatically injected as a powder. The injection location will typically be determined by the existing plant configuration (unless it is a new site) and whether additional downstream particulate matter control equipment is modified.

For boilers currently equipped with particulate matter control devices, implementing biogenic activated carbon injection for mercury control could entail: (i) injection of powdered activated carbon upstream of the existing particulate matter control device (electrostatic precipitator or fabric filter); (ii) injection of powdered activated carbon downstream of an existing electrostatic precipitator and upstream of a retrofit fabric filter; or (iii) injection of powdered activated carbon between electrostatic precipitator electric fields. Inclusion of iron or iron-containing molecules may drastically improve the performance of electrostatic precipitators for mercury control. Furthermore, inclusion of iron or iron-containing molecules may drastically change end-of-life options, since the spent activated carbon solids can be separated from other ash.

In some embodiments, powdered activated carbon injection approaches can be employed in combination with existing $SO_2$ control devices. Activated carbon could be injected prior to the $SO_2$ control device or after the $SO_2$ control device, subject to the availability of a means to collect the activated carbon sorbent downstream of the injection point.

In some embodiments, the same physical material can be used in multiple processes, either in an integrated way or in sequence. Thus, for example, activated carbon may, at the end of its useful life as a performance material, then be introduced to a combustion process for energy value or to a metal-making process that requires carbon but does not require the properties of activated carbon, etc.

The biogenic activated carbon and the principles of the disclosure can be applied to liquid-phase applications, including processing of water, aqueous streams of varying purities, solvents, liquid fuels, polymers, molten salts, and molten metals, for example. As intended herein, "liquid phase" includes slurries, suspensions, emulsions, multiphase systems, or any other material that has (or can be adjusted to have) at least some amount of a liquid state present.

In one embodiment, the present disclosure provides a method of using activated carbon to purify a liquid, in some variations, includes the following steps:
- (a) providing activated carbon particles recovered from the second reactor;
- (b) providing a liquid comprising at least one selected contaminant;
- (c) providing an additive selected to assist in removal of the selected contaminant from the liquid; and
- (d) contacting the liquid with the activated carbon particles and the additive, to adsorb at least a portion of the at least one selected contaminant onto the activated carbon particles, thereby generating contaminant-adsorbed carbon particles and a contaminant-reduced liquid.

The additive can be provided as part of the activated carbon particles. Or, the additive can be introduced directly into the liquid. In some embodiments, additives—which can be the same, or different—are introduced both as part of the activated carbon particles as well as directly into the liquid.

In some embodiments relating to liquid-phase applications, an additive comprises an acid, a base, a salt, a metal, a metal oxide, a metal hydroxide, a metal halide, or a combination thereof. In some embodiments, the additive comprises magnesium, manganese, aluminum, nickel, iron, chromium, silicon, boron, cerium, molybdenum, phosphorus, tungsten, vanadium, iron chloride, iron bromide, magnesium oxide, dolomite, dolomitic lime, fluorite, fluorospar, bentonite, calcium oxide, lime, sodium hydroxide, potassium hydroxide, hydrogen bromide, hydrogen chloride, sodium silicate, potassium permanganate, organic acids (e.g., citric acid), or a combination thereof.

In some embodiments, the contaminant (as in the liquid to be treated) comprises a metal. In some embodiments, the metal comprises arsenic, boron, selenium, mercury, a salt thereof, or a combination thereof. In some embodiments, the selected contaminant comprises an organic molecule (such as a VOC), a halogen, a biological molecule, a pesticide, or am herbicide. In some embodiments, the contaminant-adsorbed carbon particles comprise two, three, or more contaminants, or derivatives thereof. In some embodiments, an activated carbon product adsorbs, absorbs, or chemisorbs a contaminant in greater amounts than would a comparable amount of a non-biogenic activated carbon product. In some embodiments, the contaminant comprises a metal, a hazardous air pollutant, an organic molecule (such as a VOC), a non-condensable gas, or a combination thereof. In some embodiments, the selected contaminant comprises mercury. In some embodiments, the selected contaminant comprises a VOC. In some embodiments, the biogenic activated carbon comprises at least about 1 wt % hydrogen or at least about 10 wt % oxygen.

The liquid to be treated will typically be aqueous, although that is not necessary for the principles of this disclosure. In some embodiments, a liquid is treated with activated carbon particles in a fixed bed. In other embodiments, a liquid is treated with activated carbon particles in solution or in a moving bed.

In one embodiment, the present disclosure provides a method of using a biogenic activated carbon composition to remove at least a portion of a sulfur-containing contaminant from a liquid, the method comprising:

- (a) providing activated-carbon particles recovered from the second reactor disclosed herein;
- (b) providing a liquid containing a sulfur-containing contaminant;
- (c) providing an additive selected to assist in removal of the sulfur-containing contaminant from the liquid; and
- (d) contacting the liquid with the activated-carbon particles and the additive, to adsorb or absorb at least a portion of the sulfur-containing contaminant onto or into the activated-carbon particles.

In some embodiments, the sulfur-containing contaminant comprises elemental sulfur, sulfuric acid, sulfurous acid, sulfur dioxide, sulfur trioxide, sulfate anions, bisulfate anions, sulfite anions, bisulfite anions, thiols, sulfides, disulfides, polysulfides, thioethers, thioesters, thioacetals, sulfoxides, sulfones, thiosulfinates, sulfimides, sulfoximides, sulfonediimines, sulfur halides, thioketones, thioaldehydes, sulfur oxides, thiocarboxylic acids, thioamides, sulfonic acids, sulfinic acids, sulfenic acids, sulfonium, oxosulfonium, sulfuranes, persulfuranes, or a salt thereof, or a derivative thereof, or a combination thereof. For example, the sulfur-containing contaminant can be a sulfate, in anionic and/or salt form.

The liquid can be an aqueous liquid, such as water. In some embodiments, the water is wastewater associated with a process. In some embodiments, the process comprises metal mining, acid mine drainage, mineral processing, municipal sewer treatment, pulp and paper, ethanol, or another industrial process that is capable of discharging sulfur-containing contaminants in wastewater. In some embodiments, the water comprises a natural body of water, such as a lake, river, or stream.

In one embodiment, the present disclosure provides a process to reduce the concentration of sulfates in water, the process comprising:

- (a) providing activated-carbon particles recovered from the second reactor disclosed herein;
- (b) providing a volume or stream of water containing sulfates;
- (c) providing an additive selected to assist in removal of the sulfates from the water; and
- (d) contacting the water with the activated-carbon particles and the additive, to adsorb or absorb at least a portion of the sulfates onto or into the activated-carbon particles.

In some embodiments, the sulfates are reduced to a concentration of about 50 mg/L or less in the water, such as a concentration of about 10 mg/L or less in the water. In some embodiments, the sulfate is present primarily in the form of sulfate anions and/or bisulfate anions. Depending on pH, the sulfate may also be present in the form of sulfate salts.

The water can be derived from, part of, or the entirety of a wastewater stream. Exemplary wastewater streams are those that can be associated with a metal mining, acid mine drainage, mineral processing, municipal sewer treatment, pulp and paper, ethanol, or any other industrial process that could discharge sulfur-containing contaminants to wastewater. The water can be a natural body of water, such as a lake, river, or stream. In some embodiments, the process is conducted continuously. In other embodiments, the process is conducted in batch.

When water is treated with activated carbon, there can be filtration of the water, osmosis of the water, and/or direct addition (with sedimentation, clarification, etc.) of the activated-carbon particles to the water. When osmosis is employed, the activated carbon can be used in several ways within, or to assist, an osmosis device. In some embodiments, the activated-carbon particles and the additive are directly introduced to the water prior to osmosis. The activated-carbon particles and the additive are optionally employed in pre-filtration prior to the osmosis. In certain embodiments, the activated-carbon particles and the additive are incorporated into a membrane for osmosis.

In some embodiments, an activated carbon is effective for removing a sulfur-containing contaminant. In some embodiments, the sulfur-containing contaminant comprises elemental sulfur, sulfuric acid, sulfurous acid, sulfur dioxide, sulfur trioxide, sulfate anions, bisulfate anions, sulfite anions, bisulfite anions, thiols, sulfides, disulfides, polysulfides, thioethers, thioesters, thioacetals, sulfoxides, sulfones, thiosulfinates, sulfimides, sulfoximides, sulfonediimines, sulfur halides, thioketones, thioaldehydes, sulfur oxides, thiocarboxylic acids, thioamides, sulfonic acids, sulfinic acids, sulfenic acids, sulfonium, oxosulfonium, sulfuranes, persulfuranes, or a salt thereof, or a derivative thereof, or a combination thereof.

Generally speaking, the disclosed activated carbon can be used in any application in which traditional activated carbon might be used. In some embodiments, the activated carbon is used as a total (i.e., 100%) replacement for traditional activated carbon. In some embodiments, the activated carbon comprises essentially all or substantially all of the activated carbon used for a particular application. In some embodiments, the activated carbon comprises about 1% to about 100% of biogenic activated carbon.

For example and without limitation, the activated carbon can be used—alone or in combination with a traditional activated carbon product—in filters. In some embodiments, a packed bed or packed column comprises the disclosed activated carbon. In such embodiments, the biogenic activated carbon comprises a size suitable for the particular packed bed or packed column. Injection of biogenic activated carbon into gas streams can be useful for control of contaminant emissions in gas streams or liquid streams derived from coal-fired power plants, biomass-fired power plants, metal processing plants, crude-oil refineries, chemical plants, polymer plants, pulp and paper plants, cement plants, waste incinerators, food processing plants, gasification plants, and syngas plants.

Use of Biocarbon Compositions in Metal Oxide Reduction

There are various embodiments in which the biocarbon pellets, or a pulverized form thereof, or other biocarbon compositions disclosed herein, are fed to a metal ore furnace and/or a chemical-reduction furnace.

A metal ore furnace or a chemical-reduction furnace can be a blast furnace, a top-gas recycling blast furnace, a shaft furnace, a reverberatory furnace (also known as an air furnace), a crucible furnace, a muffling furnace, a retort furnace, a flash furnace, a Tecnored furnace, an Ausmelt furnace, an ISASMELT furnace, a puddling furnace, a Bogie hearth furnace, a continuous chain furnace, a pusher furnace, a rotary hearth furnace, a walking beam furnace, an electric arc furnace, an induction furnace, a basic oxygen furnace, a puddling furnace, a Bessemer furnace, a direct-reduced-metal furnace, or a combination or derivative thereof.

A metal ore furnace or a chemical-reduction furnace can be arranged horizontally, vertically, or inclined. The flow of solids and fluids (liquids and/or gases) can be cocurrent or countercurrent. The solids within a furnace can be in a fixed bed and/or a fluidized bed. A metal ore furnace or a chemical-reduction furnace can be operated at a variety of process conditions of temperature, pressure, and residence time.

Some variations of the invention relate specifically to a blast furnace. A blast furnace is a type of metallurgical furnace used for smelting to produce industrial metals, such as iron or copper. Blast furnaces are utilized in smelting iron ore to produce pig iron, an intermediate material used in the production of commercial iron and steel. Blast furnaces are also used in combination with sinter plants in base metals smelting, for example.

"Blast" refers to the combustion air being forced or supplied above atmospheric pressure. In a blast furnace, metal ores, carbon (in the present disclosure, biogenic reagent or a derivative thereof), and usually flux (e.g., limestone) are continuously supplied through the top of the furnace, while a hot blast of air (optionally with oxygen enrichment) is blown into the lower section of the furnace through a series of pipes called tuyeres. The chemical reduction reactions take place throughout the furnace as the material falls downward. The end products are usually molten metal and slag phases tapped from the bottom, and waste gases (reduction off-gas) exiting from the top of the furnace. The downward flow of the metal ore along with the flux in countercurrent contact with an upflow of hot, CO-rich gases allows for an efficient chemical reaction to reduce the metal ore to metal.

Air furnaces (such as reverberatory furnaces) are naturally aspirated, usually by the convection of hot gases in a chimney flue. According to this broad definition, bloomeries for iron, blowing houses for tin, and smelt mills for lead would be classified as blast furnaces.

The blast furnace remains an important part of modern iron production. Modern furnaces are highly efficient, including Cowper stoves which preheat incoming blast air with waste heat from flue gas, and recovery systems to extract the heat from the hot gases exiting the furnace. A blast furnace is typically built in the form of a tall structure, lined with refractory brick, and profiled to allow for expansion of the feed materials as they heat during their descent, and subsequent reduction in size as melting starts to occur.

In some embodiments pertaining to iron production, biocarbon pellets, iron ore (iron oxide), and limestone flux are charged into the top of the blast furnace. The iron ore and/or limestone flux can be integrated within the biocarbon pellets. Optionally, the biocarbon pellets are size-reduced before feeding to the blast furnace. For example, the biocarbon pellets can be pulverized to a powder which is fed to the blast furnace.

The blast furnace can be configured to allow the hot, dirty gas high in carbon monoxide content to exit the furnace throat, while bleeder valves may protect the top of the furnace from sudden gas pressure surges. The coarse particles in the exhaust gas settle and can be disposed, while the gas may flow through a venturi scrubber and/or electrostatic precipitator and/or a gas cooler to reduce the temperature of the cleaned gas. A casthouse at the bottom of the furnace contains equipment for casting the liquid iron and slag. A taphole can be drilled through a refractory plug, so that liquid iron and slag flow down a trough through an opening, separating the iron and slag. Once the pig iron and slag has been tapped, the taphole can be plugged with refractory clay. Nozzles, called tuyeres, are used to implement a hot blast to increase the efficiency of the blast furnace. The hot blast is directed into the furnace through cooled tuyeres near the base. The hot blast temperature can be from 900° C. to 1300° C. (air temperature), for example. The temperature within the blast furnace can be 2000° C. or higher. Other carbonaceous materials and/or oxygen can also be injected into the furnace at the tuyere level to combine with the carbon (from biocarbon pellets) to release additional energy and increase the percentage of reducing gases present which increases productivity.

Blast furnaces operate on the principle of chemical reduction whereby carbon monoxide, having a stronger affinity for the oxygen in metal ore (e.g., iron ore) than the corresponding metal does, reduces the metal to its elemental form. Blast furnaces differ from bloomeries and reverberatory furnaces in that in a blast furnace, flue gas is in direct contact with the ore and metal, allowing carbon monoxide to diffuse into the ore and reduce the metal oxide to elemental metal mixed with carbon. The blast furnace usually operates as a continuous, countercurrent exchange process.

Silica usually is removed from the pig iron. Silica reacts with calcium oxide and forms a silicate which floats to the surface of the molten pig iron as slag. The downward-moving column of metal ore, flux, carbon, and reaction products must be porous enough for the flue gas to pass through. This requires the biogenic-reagent carbon to be in large enough particles (e.g., biocarbon pellets or smaller objects derived from the pellets) to be permeable. Therefore, pellets, or crushed pellets, must be strong enough so it will not be crushed by the weight of the material above it. Besides physical strength of the carbon, it can be low in sulfur, phosphorus, and ash.

Many chemical reactions take place in a blast furnace. The chemistry can be understood with reference to hematite ($Fe_2O_3$) as the starting metal oxide. This form of iron oxide is common in iron ore processing, either in the initial feedstock or as produced within the blast furnace. Other forms of iron ore (e.g., taconite) will have various concentrations of different iron oxides ($Fe_3O_4$, $Fe_2O_3$, FeO, etc.).

The main overall chemical reaction producing molten iron in a blast furnace is $$Fe_2O_3 + 3CO \rightarrow 2Fe + 3CO_2$$

which is an endothermic reaction. This overall reaction occurs over many steps, with the first being that preheated blast air blown into the furnace reacts with carbon (e.g., from the biocarbon pellets) to produce carbon monoxide and heat:

$$2C + O_2 \rightarrow 2CO$$

The hot carbon monoxide is the reducing agent for the iron ore and reacts with the iron oxide to produce molten iron and carbon dioxide. Depending on the temperature in the different parts of the furnace (typically highest at the bottom), the iron is reduced in several steps. At the top, where the temperature usually is in the range of 200-700° C., the iron oxide is partially reduced to iron(II,III) oxide, $Fe_3O_4$:

$$3Fe_2O_3 + CO \rightarrow 2\ Fe_3O_4 + CO_2$$

At temperatures around 850° C., further down in the furnace, the iron(II,III) is reduced further to iron(II) oxide, FeO:

$$Fe_3O_4 + CO \rightarrow 3FeO + CO_2$$

Hot carbon dioxide, unreacted carbon monoxide, and nitrogen from the air pass up through the furnace as fresh feed material travels down into the reaction zone. As the material travels downward, countercurrent gases both preheat the feed charge and decompose the limestone (when employed) to calcium oxide and carbon dioxide:

$$CaCO_3 \rightarrow CaO + CO_2$$

The calcium oxide formed by decomposition reacts with various acidic impurities in the iron (notably silica) to form a slag which is primarily calcium silicate, $CaSiO_3$:

$$SiO_2 + CaO \rightarrow CaSiO_3$$

As the FeO moves down to the region with higher temperatures, ranging up to 1200° C., FeO is reduced further to iron metal, again with carbon monoxide as reactant:

$$FeO + CO \rightarrow Fe + CO_2$$

The carbon dioxide formed in this process can be converted back to carbon monoxide by reacting with carbon via the reverse Boudouard reaction:

$$C + CO_2 \rightarrow 2\ CO$$

In the chemical reactions shown above, it is important to note that a reducing gas may alternatively or additionally be directly introduced into the blast furnace, rather than being an in-situ product within the furnace. Typically, in these embodiments, the reducing gas includes both hydrogen and carbon monoxide, which both function to chemically reduce metal oxide. Optionally, the reducing gas can be separately produced from biocarbon pellets by reforming, gasification, or partial oxidation.

In conventional blast furnaces, there is no hydrogen available for causing metal oxide reduction. Hydrogen can be injected directly into the blast furnace. Alternatively, or additionally, hydrogen can be available within the biocarbon pellets that are fed to the blast furnace, when the biocarbon pellets contain volatile carbon that is associated with hydrogen (e.g., heavy tar components). Regardless of the source, hydrogen can cause additional reduction reactions that are similar to those above, but replacing CO with $H_2$:

$$3Fe_2O_3 + H_2 \rightarrow 2Fe_3O_4 + H_2O$$

$$Fe_3O_4 + 4H_2 \rightarrow 3Fe + 4H_2O$$

which occur in parallel to the reduction reactions with CO. The hydrogen may also react with carbon dioxide to generate more CO, in the reverse water-gas shift reaction. In some embodiments, a reducing gas consisting essentially of hydrogen is fed to a blast furnace.

The "pig iron" produced by the blast furnace typically has a relatively high carbon content of around 3-6 wt %. Pig iron can be used to make cast iron. Pig iron produced by blast furnaces normally undergoes further processing to reduce the carbon and sulfur content and produce various grades of steel used commercially. In a further process step referred to as basic oxygen steelmaking, the carbon is oxidized by blowing oxygen onto the liquid pig iron to form crude steel.

Desulfurization conventionally is performed during the transport of the liquid iron to the steelworks, by adding calcium oxide, which reacts with iron sulfide contained in the pig iron to form calcium sulfide. In some embodiments, desulfurization may also take place within a furnace or downstream of a furnace, by reacting a metal sulfide with CO (in the reducing gas) to form a metal and carbonyl sulfide, CSO. In these or other embodiments, desulfurization may also take place within a furnace or downstream of a furnace, by reacting a metal sulfide with $H_2$ (in the reducing gas) to form a metal and hydrogen sulfide, $H_2S$.

Other types of furnaces may employ other chemical reactions. It will be understood that in the chemical conversion of a metal oxide into a metal, which employs carbon and/or a reducing gas in the conversion, that carbon can be renewable carbon. This disclosure provides renewable carbon in biogenic reagents produced via pyrolysis of biomass. In certain embodiments, some carbon utilized in the furnace is not renewable carbon. In various embodiments, of the total carbon that is consumed in the metal ore furnace, that percentage of that carbon that is renewable can be at least about 20%, 30%, 40%, 50%, 60%, 70%, 80%, 90%, 95%, 99%, or 100%.

In some variations, a Tecnored furnace, or modification thereof, is utilized. The Tecnored process was originally developed by Tecnored Desenvolvimento Tecnológico S.A. of Brazil and is based on a low-pressure moving-bed reduction furnace which reduces cold-bonded, carbon-bearing, self-fluxing, and self-reducing pellets. Reduction is carried out in a short-height shaft furnace at typical reduction temperatures. The process produces hot metal (typically liquid iron) at high efficiency.

Tecnored technology was developed to be a coke-less ironmaking process, thus avoiding the investment and operation of environmentally harmful coke ovens besides significantly reducing greenhouse gas emissions in the production of hot metal. The Tecnored process uses a combination of hot and cold blasts and requires no additional oxygen. It eliminates the need for coke plants, sinter plants, and tonnage oxygen plants. Hence, the process has much lower operating and investment costs than those of traditional ironmaking routes.

In the present disclosure, the Tecnored process can be adapted for use in various ways. Some embodiments provide self-reducing agglomerates (such as biocarbon pellets), produced from iron ore fines or iron-bearing residues, plus a biogenic reagent disclosed herein. These materials, mixed with fluxing and binding agents, are agglomerated and thermally cured, producing biocarbon pellets which have sufficient strength for the physical and metallurgical demands of the Tecnored process. The agglomerates produced are then smelted in a Tecnored furnace. The fuel for the Tecnored furnace may itself be biocarbon pellets, or a non-pellet biocarbon composition (e.g., a powder).

By combining fine particles of iron oxide and the reductant within the briquette, both the surface area of the oxide in contact with reductant and, consequently, the reaction kinetics are increased dramatically. The self-reducing briquettes can be designed to contain sufficient reductant to allow full reduction of the iron-bearing feed contained, optionally with fluxes to provide the desired slag chemistry. The self-reducing briquettes are cured at low temperatures prior to feeding to the furnace. The heat required to drive the reaction within the self-reducing briquettes is provided by a bed of solid fuel, which may also be in the form of briquettes, onto which the self-reducing briquettes are fed within the furnace.

A Tecnored furnace has three zones: (i) upper shaft zone; (ii) melting zone; and (iii) lower shaft zone. In the upper shaft zone, solid fuel (for example, a biogenic reagent) is charged. In this zone, the Boudouard reaction ($C+CO_2 \rightarrow 2$ CO) is prevented which saves energy. Post-combustion in this zone of the furnace burns CO which provides energy for preheating and reduction of the charge. Inside the pellets, the following reactions take place at a very fast rate:

$$Fe_xO_y + yCO \rightarrow xFe + yCO_2$$

$$yCO_2 + yC = 2yCO$$

where x is from 1 to typically 5 and y is from 1 to typically 7.

In the melting zone, reoxidation is prevented because of the reducing atmosphere in the charge. The melting of the charge takes place under reducing atmosphere. In the lower shaft zone, solid fuel is charged. In some embodiments, the solid fuel comprises biocarbon pellets. In some embodiments, the solid fuel consists essentially of biocarbon pellets. In this zone, further reduction of residual iron oxides and slagging reactions of gangue materials and fuel ash takes place in the liquid state. Also, superheating of metal and slag droplets take place. These superheated metal and slag droplets sink due to gravity to the furnace hearth and accumulate there.

This modified Tecnored process employs two different inputs of carbon units—namely the reductant and the solid fuel. The reducing agent is conventionally coal fines, but in this disclosure, the reducing agent may include pulverized biocarbon pellets. The self-reducing agglomerates can be the biocarbon pellets disclosed herein. The quantity of carbon fines required is established by a ratio of carbon to ore fines, which can be selected to achieve full reduction of the metal oxides.

The solid fuel need not be in the form of fines. For example, the solid fuel can be in the form of lumps, such as about 40-80 mm in size to handle the physical and thermal needs required from the solid fuels in the Tecnored process. These lumps can be made by breaking apart (e.g., crushing) biocarbon pellets, but not all the way down to powder. The solid fuel is charged through side feeders (to avoid the endothermic Boudouard reaction in the upper shaft) and provides most of the energy demanded by the process. This energy is formed by the primary blast ($C+O_2 \rightarrow CO_2$) and by the secondary blast, where the upstream CO, generated by the gasification of the solid fuel at the hearth, is burned (2 $CO + O_2 \rightarrow 2\ CO_2$).

In certain exemplary embodiments, a modified-Tecnored process comprises pelletizing iron ore fines with a size less than 140 mesh, biogenic-reagent fines with a size less than 200 mesh, and a flux such as hydrated lime of size less than 140 mesh using cement as the binder. The pellets are cured and dried at 200° C. before they are fed to the top of the Tecnored furnace. The total residence time of the charge in the furnace is around 30-40 minutes. Biogenic reagent in the form of solid fuel of size ranging from 40 mm to 80 mm is fed in the furnace below the hot pellet area using side feeders. Hot blast air at around 1150° C. is blown in through tuyeres located in the side of the furnace to provide combustion air for the biogenic carbon. A small amount of furnace gas is allowed to flow through the side feeders to use for the solid fuel drying and preheating. Cold blast air is blown in at a higher point to promote post-combustion of CO in the upper shaft. The hot metal produced is tapped into a ladle on a ladle car, which can tilt the ladle for de-slagging. The liquid iron is optionally desulfurized in the ladle, and the slag is raked into a slag pot. The hot metal typically contains about 3-5 wt % carbon.

Conventionally, external CO or $H_2$ does not play a significant role in the self-reduction process using a Tecnored furnace. However, external $H_2$ and/or CO (from reducing gas) may assist the overall chemistry by increasing the rate and/or conversion of iron oxides in the above reaction ($Fe_xO_y + y\ CO \rightarrow x\ Fe + y\ CO_2$) or in a reaction with hydrogen as reactant ($Fe_xO_y + y\ H_2 \rightarrow x\ Fe + y\ H_2O$). The reduction chemistry can be assisted at least at the surface of the pellets or briquettes, and possibly within the bulk phase of the pellets or briquettes since mass transfer of hot reducing gas is fast. Some embodiments of this disclosure combine aspects of a blast furnace with aspects of a Tecnored furnace, so that a self-reducing pellet or briquette is utilized, in addition to the use of reducing gas within the furnace.

As stated previously, there are a large number of possible furnace configurations for metal ore processing. This specification will not describe in details the various conditions and chemistry that may take place in all possible furnaces, but it will be understood by one skilled in the art that the principles of this invention can be applied to essentially any furnace or process that uses carbon somewhere in the process of making a metal from a metal ore.

It will also be observed that some processes utilize biocarbon pellets, some processes utilize reducing gas, and some processes utilize both biocarbon pellets and reducing gas. The processes provided herein may produce both solid biocarbon pellets as well as a reducing gas. In some embodiments, only the solid biocarbon pellets are employed in a metal ore conversion process. In other embodiments, only the reducing gas is employed in a metal ore conversion process. In still other embodiments, both the biocarbon pellets and the reducing gas are employed in a metal ore conversion process. In these embodiments employing both sources of renewable carbon, the percentage of overall carbon usage in the metal ore conversion from the reducing gas can be about, at least about, or at most about 5%, 10%, 20%, 30%, 40%, 50%, 60%, 70%, 80%, 90%, 95%, or 100%. The other carbon usage can be from the biocarbon pellets. Alternatively, some or all of the other carbon usage can be from conventional carbon inputs, such as coal fines.

Conversion of Biocarbon Compositions to Reducing Gas

Some variations employ a biocarbon composition (as pellets, powder, or another form) to generate reducing gas, wherein the reducing gas can be utilized in situ in a process or can be recovered and sold. In related embodiments, a portion of low fixed carbon material and/or a portion of high fixed carbon material (e.g., an off-spec portion of one of these materials, or an extra quantity of material not needed for final product demand) can be diverted from the blending operation and instead utilized to generate a reducing gas. All references to using biocarbon compositions to generate reducing gas will also be understood as references to using specifically a low fixed carbon material and/or a high fixed carbon material to generate reducing gas.

The optional production of reducing gas (also referred to herein as "bio-reductant gas") will now be further described. The conversion of a biocarbon composition to reducing gas takes place in a reactor, which can be referred to as a bio-reductant formation unit.

A reactant can be employed to react with the biocarbon composition and produce a reducing gas. The reactant can be selected from oxygen, steam, or a combination thereof. In some embodiments, oxygen is mixed with steam, and the resulting mixture is added to the second reactor. Oxygen or oxygen-enriched air can be added to cause an exothermic reaction such as the partial or total oxidation of carbon with oxygen; to achieve a more favorable $H_2/CO$ ratio in the reducing gas; (iii) to increase the yield of reducing gas; and/or (iv) to increase the purity of reducing gas, e.g. by reducing the amount of $CO_2$, pyrolysis products, tar, aromatic molecules, and/or other undesirable products.

Steam is a preferred reactant, in some embodiments. Steam (i.e. $H_2O$ in a vapor phase) can be introduced into the reactor in one or more input streams. Steam may include steam generated by moisture contained in the biocarbon pellets, as well as steam generated by any chemical reactions that produce water.

All references herein to a "ratio" of chemical species are references to molar ratios unless otherwise indicated. For example, a $H_2/CO$ ratio of 1 means one mole of hydrogen per mole of carbon dioxide.

Steam reforming, partial oxidation, water-gas shift (WGS), and/or combustion reactions can occur when oxygen or steam are added. Exemplary reactions are shown below with respect to a cellulose repeat unit ($C_6H_{10}O_5$) found, for example, in cellulosic feedstocks. Similar reactions can occur with any carbon-containing feedstock, including biocarbon pellets.

$C_6H_{10}O_5+H_2O \rightarrow 6CO+6H_2$  Steam Reforming $C_6H_{10}O_5+\frac{1}{2}O_2 \rightarrow 6CO+5H_2$  Partial Oxidation $CO+H_2O \leftrightarrow H_2+CO_2$  Water-Gas Shift $C_6H_{10}O_5+6O_2 \rightarrow 6CO_2+5H_2O$  Complete Combustion The bio-reductant formation unit is any reactor capable of causing at least one chemical reaction that produces reducing gas. Conventional steam reformers, well-known in the art, can be used either with or without a catalyst. Other possibilities include autothermal reformers, partial-oxidation reactors, and multistaged reactors that combine several reaction mechanisms (e.g., partial oxidation followed by water-gas shift). The reactor configuration can be a fixed bed, a fluidized bed, a plurality of microchannels, or some other configuration.

In some embodiments, the total amount of steam as reactant is at least about 0.1 mole of steam per mole of carbon in the feed material. In various embodiments, at least about any of 0.5, 1.0, 1.5, 2.0, 3.0, 4.0, 5.0, or more moles of steam are added or are present per mole of carbon. In some embodiments, between about 1.5-3.0 moles of steam are added or are present per mole carbon.

The amount to steam that is added to the second reactor may vary depending on factors such as the conditions of the pyrolysis reactor. When pyrolysis produces a carbon-rich solid material, generally more steam (and/or more oxygen) is used to add the necessary H and O atoms to the C available to generate CO and $H_2$. From the perspective of the overall system, the moisture contained in the biocarbon pellets can be accounted for in determining how much additional water (steam) to add in the process.

Exemplary ratios of oxygen to steam ($O_2/H_2O$) are equal to or less than about any of 2, 1.5, 1, 0.5, 0.2, 0.1, 0.05, 0.02, 0.01, or less, in the second reactor. When the ratio of $O_2/H_2O$ is greater than 1, the combustion reaction starts to dominate over partial oxidation, which may produce undesirably low $CO/CO_2$ ratios.

In some embodiments, oxygen without steam is used as the reactant. Oxygen can be added in substantially pure form, or it can be fed to the process via the addition of air, optionally enriched with oxygen. In some embodiments, air that is not enriched with oxygen is added. In other embodiments, enriched air from an off-spec or recycle stream, which can be a stream from a nearby air-separation plant, for example, can be used. In some embodiments, the use of enriched air with a reduced amount of $N_2$ (i.e., less than 79 vol %) results in less $N_2$ in the resulting reducing gas. Because removal of $N_2$ can be expensive, methods of producing reducing gas with less or no $N_2$ are typically desirable.

In some embodiments, the presence of oxygen alters the ratio of $H_2/CO$ in the reducing gas, compared to the ratio produced by the same method in the absence of oxygen. The $H_2/CO$ ratio of the reducing gas can be between about 0.5 to about 2.0, such as between about 0.75-1.25, about 1-1.5, or about 1.5-2.0. As will be recognized, increased water-gas shift (by higher rates of steam addition) will tend to produce higher $H_2/CO$ ratios, such as at least 2.0, 3.0. 4.0. 5.0, or even higher, which can be desired for certain applications, including hydrogen production.

Catalysts may optionally be utilized in the reactor for generating the reducing gas. Catalysts may include, but are not limited to, alkali metal salts, alkaline earth metal oxides and salts, mineral substances or ash in coal, transition metals and their oxides and salts, and eutectic salt mixtures. Specific examples of catalysts include, but are not limited to, potassium hydroxide, potassium carbonate, lithium hydroxide, lithium carbonate, cesium hydroxide, nickel oxide, nickel-substituted synthetic mica montmorillonite (NiSMM), NiSMM-supported molybdenum, iron hydroxyoxide, iron nitrate, iron-calcium-impregnated salts, nickel uranyl oxide, sodium fluoride, and cryolite.

Other exemplary catalysts include, but are not limited to, nickel, nickel oxide, rhodium, ruthenium, iridium, palladium, and platinum. Such catalysts can be coated or deposited onto one or more support materials, such as, for example, gamma-alumina (optionally doped with a stabilizing element such as magnesium, lanthanum, or barium).

Before being added to the system, any catalyst can be pretreated or activated using known techniques that impact total surface area, active surface area, site density, catalyst stability, catalyst lifetime, catalyst composition, surface roughness, surface dispersion, porosity, density, and/or thermal diffusivity. Pretreatments of catalysts include, but are not limited to, calcining, washcoat addition, particle-size reduction, and surface activation by thermal or chemical means.

Catalyst addition can be performed by first dissolving or slurrying the catalyst(s) into a solvent such as water or any hydrocarbon that can be gasified and/or reformed. In some embodiments, the catalyst is added by direct injection of such a slurry into a vessel. In some embodiments, the catalyst is added to steam and the steam/catalyst mixture is added to the system. In these embodiments, the added catalyst can be at or near its equilibrium solubility in the steam or can be introduced as particles entrained in the steam and thereby introduced into the system.

Material can generally be conveyed into and out of the reactor by single screws, twin screws, rams, and the like. Material can be conveyed mechanically by physical force (metal contact), pressure-driven flow, pneumatically driven flow, centrifugal flow, gravitational flow, fluidized flow, or some other known means of moving solid and gas phases. It can be preferable to utilize a fixed bed of biocarbon pellets in the reactor, especially in embodiments that employ a bed of metal oxide disposed above the biocarbon pellet bed which need to be mechanically robust.

In some embodiments, the reactor employs gasification of a biocarbon composition to generate a reducing gas. Gasification is carried out at elevated temperatures, typically about 600° C. to about 1100° C. Less-reactive biogenic reagents require higher operating temperatures. The amount of reactant introduced (e.g., air, oxygen, enriched air, or oxygen-steam mixtures) will typically be the primary factor controlling the gasification temperature. Operating pressures from atmospheric to about 50 bar have been employed in biomass gasification. Gasification also requires a reactant, commonly air, high-purity oxygen, steam, or some mixture of these gases.

Gasifiers can be differentiated based on the means of supporting solids within the vessel, the directions of flow of both solids and gas, and the method of supplying heat to the reactor. Whether the gasifier is operated at near atmospheric or at elevated pressures, and the gasifier is air-blown or oxygen-blown, are also distinguishing characteristics. Common classifications are fixed-bed updraft, fixed-bed downdraft, bubbling fluidized bed, and circulating fluidized bed.

Fixed-bed gasifiers, in general, cannot handle fibrous herbaceous feedstocks, such as wheat straw, corn stover, or yard wastes. However, in the disclosed processes, biomass is first pyrolyzed to a biogenic reagent, which is pelletized, and the biocarbon pellets can be gasified. The biocarbon pellets can be directly gasified using a fixed-bed gasifier, without necessarily reducing the size of the pellets.

Circulating fluidized-bed gasification technology is available from Lurgi and Foster Wheeler, and represents the majority of existing gasification technology utilized for biomass and other wastes. Bubbling fluidized-bed gasification (e.g., U-GAS® technology) has been commercially used.

Directly heated gasifiers conduct endothermic and exothermic gasification reactions in a single reaction vessel; no additional heating is needed. In contrast, indirectly heated gasifiers require an external source of heat. Indirectly heated gasifiers commonly employ two vessels. The first vessel gasifies the feed with steam (an endothermic process). Heat is supplied by circulating a heat-transfer medium, commonly sand. Reducing gas and solid char produced in the first vessel, along with the sand, are separated. The mixed char and sand are fed to the second vessel, where the char is combusted with air, heating the sand. The hot sand is circulated back to the first vessel.

The biocarbon composition can be introduced to a gasifier as a "dry feed" (optionally with moisture, but no free liquid phase), or as a slurry or suspension in water. Dry-feed gasifiers typically allow for high per-pass carbon conversion to reducing gas and good energy efficiency. In a dry-feed gasifier, the energy released by the gasification reactions can cause the gasifier to reach extremely high temperatures. This problem can be resolved by using a wet-wall design.

In some embodiments, the feed to the gasifier is biocarbon pellets with high hydrogen content. The resulting reducing gas is relatively rich in hydrogen, with high $H_2/CO$ ratios, such as $H_2/CO>1.5$ or more.

In some embodiments, the feed to the gasifier is biocarbon pellets with low hydrogen content. The resulting reducing gas is expected to have relatively low $H_2/CO$ ratios. For downstream processes that require $H_2/CO>1$, it can be desirable to inject water or steam into the gasifier to both moderate the gasifier temperature (via sensible-heat effects and/or endothermic chemistry), and to shift the $H_2/CO$ ratio to a higher, more-desirable ratio. Water addition can also contribute to temperature moderation by endothermic consumption, via steam-reforming chemistry. In steam reforming, $H_2O$ reacts with carbon or with a hydrocarbon, such as tar or benzene/toluene/xylenes, to produce reducing gas and lower the adiabatic gasification temperature.

In certain variations, the gasifier is a fluidized-bed gasifier, such as a bubbling fluidized gasification reactor. Fluidization results in a substantially uniform temperature within the gasifier bed. A fluidizing bed material, such as alumina sand or silica sand, can reduce potential attrition issues. The gasifier temperature can be moderated to a sufficiently low temperature such that ash particles do not begin to transform from solid to molten form, which can cause agglomeration and loss of fluidization within the gasifier.

When a fluidized-bed gasifier is used, the total flow rate of all components should ensure that the gasifier bed is fluidized. The total gas flow rate and bed diameter establish the gas velocity through the gasifier. The correct velocity must be maintained to ensure proper fluidization.

In variations, the gasifier type can be entrained-flow slagging, entrained flow non-slagging, transport, bubbling fluidized bed, circulating fluidized bed, or fixed bed. Some embodiments employ gasification catalysts.

Circulating fluidized-bed gasifiers can be employed, wherein gas, sand, and feedstock (e.g., crushed or pulverized biocarbon pellets) move together. Exemplary transport gases include recirculated product gas, combustion gas, or recycle gas. High heat-transfer rates from the sand ensure rapid heating of the feedstock, and ablation is expected to be stronger than with regular fluidized beds. A separator can be employed to separate the reducing gas from the sand and char particles. The sand particles can be reheated in a fluidized burner vessel and recycled to the reactor.

In some embodiments in which a countercurrent fixed-bed gasifier is used, the reactor comprises a fixed bed of a feedstock through which a gasification agent (such as steam, oxygen, and/or recycle gas) flows in countercurrent configuration. The ash is either removed dry or as a slag.

In some embodiments in which a cocurrent fixed-bed gasifier is used, the reactor is similar to the countercurrent type, but the gasification agent gas flows in cocurrent configuration with the feedstock. Heat is added to the upper part of the bed, either by combusting small amounts of the feedstock or from external heat sources. The produced gas leaves the reactor at a high temperature, and much of this heat is transferred to the gasification agent added in the top of the bed, resulting in good energy efficiency.

In some embodiments in which a fluidized-bed reactor is used, the feedstock is fluidized in recycle gas, oxygen, air, and/or steam. The ash can be removed dry or as heavy agglomerates that defluidize. Recycle or subsequent combustion of solids can be used to increase conversion. Fluidized-bed reactors are useful for feedstocks that form highly corrosive ash that would damage the walls of slagging reactors.

In some embodiments in which an entrained-flow gasifier is used, biocarbon pellets are pulverized and gasified with oxygen, air, or recycle gas in cocurrent flow. The gasification reactions take place in a dense cloud of very fine particles. High temperatures can be employed, thereby providing for low quantities of tar and methane in the reducing gas.

Entrained-flow reactors remove the major part of the ash as a slag, as the operating temperature is typically well above the ash fusion temperature. A smaller fraction of the ash is produced either as a very fine dry fly ash or as a fly-ash slurry. Certain entrained-bed reactors have an inner water- or steam-cooled wall covered with partially solidified slag.

The gasifier chamber can be designed, by proper configuration of the freeboard or use of internal cyclones, to keep the carryover of solids downstream operations at a level suitable for recovery of heat. Unreacted carbon can be drawn from the bottom of the gasifier chamber, cooled, and recovered.

A gasifier may include one or more catalysts, such as catalysts effective for partial oxidation, reverse water-gas shift, or dry ($CO_2$) reforming of carbon-containing species.

In some embodiments, a bubbling fluid-bed devolatilization reactor is utilized. The reactor is heated, at least in part, by the hot recycle gas stream to approximately 600° C.—below the expected slagging temperature. Steam, oxygen, or air may also be introduced to the second reactor. The second can be designed, by proper configuration of a freeboard or use of internal cyclones, to keep the carryover of solids at a level suitable for recovery of heat downstream. Unreacted char can be drawn from the bottom of the devolatilization chamber, cooled, and then fed to a utility boiler to recover the remaining heating value of this stream.

When a fluidized-bed gasifier is employed, the feedstock can be introduced into a bed of hot sand fluidized by a gas, such as recycle gas. Reference herein to "sand" shall also include similar, substantially inert materials, such as glass particles, recovered ash particles, and the like. High heat-transfer rates from fluidized sand can result in rapid heating of the feedstock. There can be some ablation by attrition with the sand particles. Heat can be provided by heat-exchanger tubes through which hot combustion gas flows.

Circulating fluidized-bed reactors can be employed, wherein gas, sand, and feedstock move together. Exemplary transport gases include recirculated product gas, combustion gas, or recycle gas. High heat-transfer rates from the sand ensure rapid heating of the feedstock, and ablation is expected to be stronger than with regular fluidized beds. A separator can be employed to separate the reducing gas from the sand and char particles. The sand particles can be reheated in a fluidized burner vessel and recycled to the reactor.

In some embodiments in which a countercurrent fixed-bed reactor is used, the reactor comprises a fixed bed of a feedstock through which a gasification agent (such as steam, oxygen, and/or recycle gas) flows in countercurrent configuration. The ash is either removed dry or as a slag.

In some embodiments in which a cocurrent fixed-bed reactor is used, the reactor is similar to the countercurrent type, but the gasification agent gas flows in cocurrent configuration with the feedstock. Heat is added to the upper part of the bed, either by combusting small amounts of the feedstock or from external heat sources. The reducing gas leaves the reactor at a high temperature, and much of this heat is transferred to the reactants added in the top of the bed, resulting in good energy efficiency. Since tars pass through a hot bed of carbon in this configuration, tar levels are expected to be lower than when using the countercurrent type.

In some embodiments in which a fluidized-bed reactor is used, the feedstock is fluidized in recycle gas, oxygen, air, and/or steam. The ash is removed dry or as heavy agglomerates that defluidize. Recycle or subsequent combustion of solids can be used to increase conversion.

To enhance heat and mass transfer, water can be introduced into the reactor using a nozzle, which is generally a mechanical device designed to control the direction or characteristics of a fluid flow as it enters an enclosed chamber or pipe via an orifice. Nozzles are capable of reducing the water droplet size to generate a fine spray of water. Nozzles can be selected from atomizer nozzles (similar to fuel injectors), swirl nozzles which inject the liquid tangentially, and so on.

Water sources may include direct piping from process condensate, other recycle water, wastewater, make-up water, boiler feed water, city water, and so on. Water may optionally first be cleaned, purified, treated, ionized, distilled, and the like. When several water sources are used, various volume ratios of water sources are possible. In some embodiments, a portion or all of the water for the second reactor is wastewater.

In some variations, the reducing gas is filtered, purified, or otherwise conditioned prior to being converted to another product. For example, cooled reducing gas can be introduced to a conditioning unit, where benzene, toluene, ethyl benzene, xylene, sulfur molecules, nitrogen, metals, and/or other impurities are optionally removed from the reducing gas.

Some embodiments include a reducing-gas cleanup unit. The reducing-gas cleanup unit is not particularly limited in its design. Exemplary reducing-gas cleanup units include cyclones, centrifuges, filters, membranes, solvent-based systems, and other means of removing particulates and/or other specific contaminants. In some embodiments, an acid-gas removal unit is included and can be any means known in the art for removing $H_2S$, $CO_2$, and/or other acid gases from the reducing gas.

Examples of acid-gas removal steps include removal of $CO_2$ with one or more solvents for $CO_2$, or removal of $CO_2$ by a pressure-swing adsorption unit. Suitable solvents for reactive solvent-based acid gas removal include monoethanolamine, diethanolamine, methyldiethanolamine, diisopropylamine, and aminoethoxyethanol. Suitable solvents for physical solvent-based acid gas removal include dimethyl ethers of polyethylene glycol (such as in the Selexol® process) and refrigerated methanol (such as in the Rectisol® process).

The reducing gas produced as described according to the present invention can be utilized in a number of ways. Reducing gas can generally be chemically converted and/or purified into hydrogen, carbon monoxide, methane, olefins (such as ethylene), oxygenates (such as dimethyl ether), alcohols (such as methanol and ethanol), paraffins, and other hydrocarbons. Reducing gas can be converted into linear or branched $C_5$-$C_{15}$ hydrocarbons, diesel fuel, gasoline, waxes, or olefins by Fischer-Tropsch chemistry; mixed alcohols by a variety of catalysts; isobutane by isosynthesis; ammonia by hydrogen production followed by the Haber process; aldehydes and alcohols by oxosynthesis; and many derivatives of methanol including dimethyl ether, acetic acid, ethylene, propylene, and formaldehyde by various processes. The reducing gas can also be converted to energy using energy-conversion devices such as solid-oxide fuel cells, Stirling engines, micro-turbines, internal combustion engines, thermo-electric generators, scroll expanders, gas burners, or thermo-photovoltaic devices.

In this detailed description, reference has been made to multiple embodiments of the invention and non-limiting examples relating to how the invention can be understood and practiced. Other embodiments that do not provide all of the features and advantages set forth herein can be utilized, without departing from the spirit and scope of the present invention. This invention incorporates routine experimentation and optimization of the methods and systems described herein. Such modifications and variations are considered to be within the scope of the invention defined by the claims.

All publications, patents, and patent applications cited in this specification are herein incorporated by reference in their entirety as if each publication, patent, or patent application were specifically and individually put forth herein.

Where methods and steps described above indicate certain events occurring in certain order, those of ordinary skill in the art will recognize that the ordering of certain steps can be modified and that such modifications are in accordance with the variations of the invention. Additionally, certain of the steps can be performed concurrently in a parallel process when possible, as well as performed sequentially.

EXAMPLES

Example 1: Biocarbon Pellets with 10% HFC and 90% LFC

A first feedstock of mixed hardwood and softwood is pyrolyzed at a pyrolysis temperature of about 375° C. and a pyrolysis time of 15-30 minutes, thereby generating a low-fixed-carbon (LFC) material. A second feedstock of mixed hardwood and softwood is pyrolyzed at a pyrolysis temperature of 650° C. and a pyrolysis time of 15-30 minutes, thereby generating a high-fixed-carbon (HFC) material. The lower pyrolysis temperature for the first feedstock causes a relatively low fixed-carbon content. The pyrolysis pressure is about 1 bar (atmospheric pressure) under an inert gas consisting essentially of $N_2$. There is a solid output and a vapor output from each pyrolysis reactor. The solid output is a biogenic reagent comprising carbon. The vapor output is a pyrolysis off-gas that can be combusted to generate heat.

The low-fixed-carbon material and the high-fixed-carbon material are blended in a proportion of about 90 wt % low-fixed-carbon material and about 10 wt % of high-fixed-carbon material, forming a combined biocarbon material.

Figure 3:
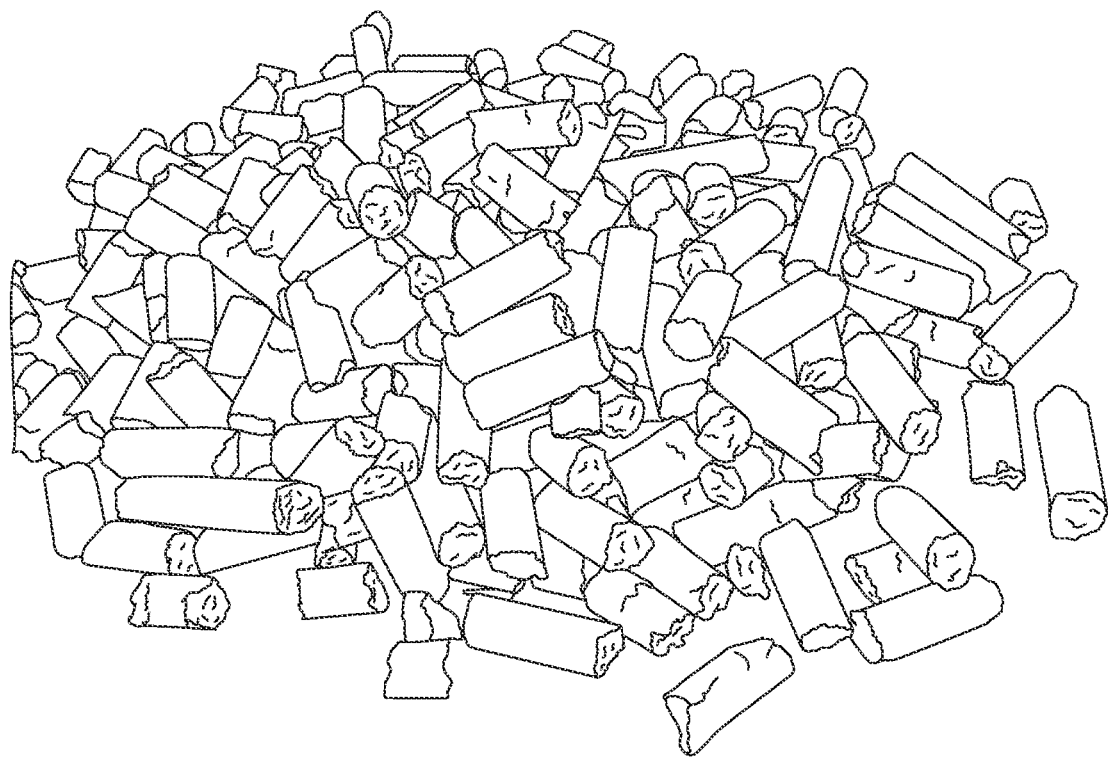
FIG. 3 is a photograph of a biocarbon composition in the form of pellets that contain a mixture of a high-fixed-carbon material and a low-fixed-carbon material, wherein the low-fixed-carbon material functions as a pellet binder.

The combined biocarbon material is mechanically treated using an extruder to form a powder. The powder is pelletized using a pelletizing apparatus consisting of a vertical ring die pelletizer, thereby generating cylindrical pellets with a diameter of about 8 mm. The low-fixed-carbon material functions as a binder for the pellets. In particular, and without limitation, it is believed that lignin or lignin derivatives contained in the low-fixed-carbon material are capable of binding the carbon in the pellet. No external pellet binder is added; only the self-generated lignin binder is utilized. The pellets are dried to about 8 wt % moisture. FIG. 3 is a photograph of the biocarbon pellets.

Example 2: Biocarbon Pellets with 57.5% HFC and 42.5% LFC

A first feedstock of mixed hardwood and softwood is pyrolyzed at a pyrolysis temperature of about 375° C. and a pyrolysis time of 15-30 minutes, thereby generating a low-fixed-carbon (LFC) material. A second feedstock of mixed hardwood and softwood is pyrolyzed at a pyrolysis temperature of 650° C. and a pyrolysis time of 15-30 minutes, thereby generating a high-fixed-carbon (HFC) material. The lower pyrolysis temperature for the first feedstock causes a relatively low fixed-carbon content. The pyrolysis pressure is about 1 bar (atmospheric pressure) under an inert gas consisting essentially of $N_2$. There is a solid output and a vapor output from each pyrolysis reactor. The solid output is a biogenic reagent comprising carbon. The vapor output is a pyrolysis off-gas that can be combusted to generate heat.

The low-fixed-carbon material and the high-fixed-carbon material are blended in a proportion of about 42.5 wt % low-fixed-carbon material and about 57.5 wt % of high-fixed-carbon material, forming a combined biocarbon material.

The combined biocarbon material is mechanically treated using an extruder to form a powder. The powder is pelletized using a pelletizing apparatus consisting of a vertical ring die pelletizer, thereby generating cylindrical pellets with a diameter of about 8 mm. The low-fixed-carbon material functions as a binder for the pellets. In particular, and without limitation, it is believed that lignin or lignin derivatives contained in the low-fixed-carbon material are capable of binding the carbon in the pellet. No external pellet binder is added; only the self-generated lignin binder is utilized. The biocarbon pellets are dried to about 7 wt % moisture.

The dried biocarbon pellets are then tested using a 24-hour soak at room temperature (about 25° C.) in excess water. After soaking, free water droplets are strained off using a sieve and then the sample is tested for total moisture by ASTM D3173. The result is about 13 wt % moisture, which is a net moisture uptake of about 6 wt % water.

Example 3: Biocarbon Pellets with 90% HFC and 10% LFC

A first feedstock of mixed hardwood and softwood is pyrolyzed at a pyrolysis temperature of about 375° C. and a pyrolysis time of 15-30 minutes, thereby generating a low-fixed-carbon (LFC) material. A second feedstock of mixed hardwood and softwood is pyrolyzed at a pyrolysis temperature of 650° C. and a pyrolysis time of 15-30 minutes, thereby generating a high-fixed-carbon (HFC) material. The lower pyrolysis temperature for the first feedstock causes a relatively low fixed-carbon content. The pyrolysis pressure is about 1 bar (atmospheric pressure) under an inert gas consisting essentially of N2. There is a solid output and a vapor output from each pyrolysis reactor. The solid output is a biogenic reagent comprising carbon. The vapor output is a pyrolysis off-gas that can be combusted to generate heat.

The low-fixed-carbon material and the high-fixed-carbon material are blended in a proportion of about 10 wt % low-fixed-carbon material and about 90 wt % of high-fixed-carbon material, forming a combined biocarbon material.

The combined biocarbon material is mechanically treated using an extruder to form a powder. The powder is pelletized using a pelletizing apparatus consisting of a vertical ring die pelletizer, thereby generating cylindrical pellets with a diameter of about 8 mm. The low-fixed-carbon material functions as a binder for the pellets. In particular, and without limitation, it is believed that lignin or lignin derivatives contained in the low-fixed-carbon material are capable of binding the carbon in the pellet. No external pellet binder is added; only the self-generated lignin binder is utilized. The biocarbon pellets are dried to about 7 wt % moisture.

The dried biocarbon pellets are then tested using a 24-hour soak at room temperature (about 25° C.) in excess water. After soaking, free water droplets are strained off using a sieve and then the sample is tested for total moisture by ASTM D3173. The result is about 28 wt % moisture, which is a net moisture uptake of about 21 wt % water.

We claim:

1. A process for producing a biocarbon composition, said process comprising:
    (a) pyrolyzing a first biomass-containing feedstock to generate a low-fixed-carbon material and a first pyrolysis off-gas, wherein said low-fixed-carbon material has a first fixed-carbon concentration from about 10 wt % to about 55 wt % fixed carbon on an ab solute basis;
    (b) separately from step (a), pyrolyzing a second biomass-containing feedstock to generate a high-fixed-carbon material and a second pyrolysis off-gas, wherein said high-fixed-carbon material has a second fixed-carbon concentration from about 50 wt % to about 100 wt % fixed carbon on an absolute basis, and wherein said second fixed-carbon concentration is higher than said first fixed-carbon concentration;
    (c) blending at least a portion of said low-fixed-carbon material with at least a portion of said high-fixed-carbon material, thereby generating an intermediate material;
    (d) optionally, blending one or more additives into said intermediate material;
    (e) optionally, drying said intermediate material; and
    (f) recovering a biocarbon composition containing said intermediate material or a thermally treated form thereof;
    wherein said low-fixed-carbon material is contained in a shell or coating around a core comprising said high-fixed-carbon material.

2. A process for producing a biocarbon composition, said process comprising:
    (a) pyrolyzing a first biomass-containing feedstock to generate a low-fixed-carbon material and a first pyrolysis off-gas, wherein said low-fixed-carbon material has a first fixed-carbon concentration from about 10 wt % to about 55 wt % fixed carbon on an ab solute basis;
    (b) separately from step (a), pyrolyzing a second biomass-containing feedstock to generate a high-fixed-carbon material and a second pyrolysis off-gas, wherein said high-fixed-carbon material has a second fixed-carbon concentration from about 50 wt % to about 100 wt % fixed carbon on an absolute basis, and wherein said second fixed-carbon concentration is higher than said first fixed-carbon concentration;
    (c) blending at least a portion of said low-fixed-carbon material with at least a portion of said high-fixed-carbon material, thereby generating an intermediate material;
    (d) optionally, blending one or more additives into said intermediate material;
    (e) optionally, drying said intermediate material; and
    (f) recovering a biocarbon composition containing said intermediate material or a thermally treated form thereof;
    wherein said high-fixed-carbon material is contained in a shell or coating around a core comprising said low-fixed-carbon material.

3. A process for producing a biocarbon composition, said process comprising:
    (a) pyrolyzing a first biomass-containing feedstock to generate a low-fixed-carbon material and a first pyrolysis off-gas, wherein said low-fixed-carbon material has a first fixed-carbon concentration from about 10 wt % to about 55 wt % fixed carbon on an ab solute basis;
    (b) separately from step (a), pyrolyzing a second biomass-containing feedstock to generate a high-fixed-carbon material and a second pyrolysis off-gas, wherein said high-fixed-carbon material has a second fixed-carbon concentration from about 50 wt % to about 100 wt % fixed carbon on an absolute basis, and wherein said second fixed-carbon concentration is higher than said first fixed-carbon concentration;
    (c) blending at least a portion of said low-fixed-carbon material with at least a portion of said high-fixed-carbon material, thereby generating an intermediate material;
    (d) optionally, blending one or more additives into said intermediate material;
    (e) optionally, drying said intermediate material; and
    (f) recovering a biocarbon composition containing said intermediate material or a thermally treated form thereof;
    wherein said high-fixed-carbon material is in the form of particulates in a continuous phase of said low-fixed-carbon material.

4. A process for producing a biocarbon composition, said process comprising:
    (a) pyrolyzing a first biomass-containing feedstock to generate a low-fixed-carbon material and a first pyrolysis off-gas, wherein said low-fixed-carbon material has a first fixed-carbon concentration from about 10 wt % to about 55 wt % fixed carbon on an ab solute basis;

(b) separately from step (a), pyrolyzing a second biomass-containing feedstock to generate a high-fixed-carbon material and a second pyrolysis off-gas, wherein said high-fixed-carbon material has a second fixed-carbon concentration from about 50 wt % to about 100 wt % fixed carbon on an absolute basis, and wherein said second fixed-carbon concentration is higher than said first fixed-carbon concentration;

(c) blending at least a portion of said low-fixed-carbon material with at least a portion of said high-fixed-carbon material, thereby generating an intermediate material;

(d) optionally, blending one or more additives into said intermediate material;

(e) optionally, drying said intermediate material; and (f) recovering a biocarbon composition containing said intermediate material or a thermally treated form thereof;

wherein said low-fixed-carbon material is in the form of particulates in a continuous phase of said high-fixed-carbon material.

* * * * *